United States Patent
Olson

(10) Patent No.: US 8,396,736 B2
(45) Date of Patent: Mar. 12, 2013

(54) SYSTEMS AND METHODS FOR PROVIDING DOCUMENTATION HAVING SUCCINCT COMMUNICATION WITH SCALABILITY

(75) Inventor: Timothy G. Olson, Carlsbad, CA (US)

(73) Assignee: Process Assets, LLC, Carlsbad, CA (US)

( * ) Notice: Subject to any disclaimer, the term of this patent is extended or adjusted under 35 U.S.C. 154(b) by 1711 days.

(21) Appl. No.: 11/409,522

(22) Filed: Apr. 21, 2006

(65) Prior Publication Data
US 2007/0250359 A1    Oct. 25, 2007

(51) Int. Cl.
*G06Q 10/00*   (2012.01)
(52) U.S. Cl. ...... 705/7.27; 705/7.15; 715/707; 715/764; 717/100; 717/106; 358/1.15
(58) Field of Classification Search ......... 705/7.11–7.42
See application file for complete search history.

(56) References Cited

U.S. PATENT DOCUMENTS

| | | | | |
|---|---|---|---|---|
| 5,018,082 | A | * | 5/1991 | Obata et al. .................. 715/707 |
| 5,107,332 | A | * | 4/1992 | Chan ............................. 358/518 |
| 5,257,363 | A | * | 10/1993 | Shapiro et al. ................. 703/13 |
| 5,493,321 | A | * | 2/1996 | Zwadlo ......................... 347/131 |
| 5,513,308 | A | * | 4/1996 | Mori ............................. 715/707 |
| 5,737,727 | A | | 4/1998 | Lehmann et al. |
| 5,774,118 | A | * | 6/1998 | Hatakama ..................... 715/707 |
| 5,774,661 | A | * | 6/1998 | Chatterjee et al. ............ 709/203 |
| 6,067,357 | A | * | 5/2000 | Kishinsky et al. ....... 379/265.02 |
| 6,256,598 | B1 | * | 7/2001 | Park et al. ........................ 703/2 |
| 6,304,259 | B1 | | 10/2001 | DeStefano |
| 6,308,224 | B1 | * | 10/2001 | Leymann et al. ............. 719/310 |
| 6,327,362 | B1 | * | 12/2001 | Hull et al. ..................... 379/243 |
| 6,349,238 | B1 | * | 2/2002 | Gabbita et al. ................ 700/101 |
| 6,546,364 | B1 | * | 4/2003 | Smirnov et al. ................. 703/22 |
| 6,755,659 | B2 | | 6/2004 | LoSasso et al. |
| 6,760,044 | B1 | | 7/2004 | Emrani |
| 6,768,500 | B1 | | 7/2004 | Emrani |
| 6,771,286 | B2 | | 8/2004 | Emrani |

(Continued)

OTHER PUBLICATIONS

Fontana, J. (1996). All on the SamePage—WebFlow's new version boasts enhanced features. CommunicationsWeek, , 39-39.*

(Continued)

*Primary Examiner* — Gurkanwaljit Singh
(74) *Attorney, Agent, or Firm* — Kirton McConkie; David B. Tingey

(57) ABSTRACT

Systems and methods for defining and documenting processes, procedures, standards and policies that are succinct and usable, and that are scalable to the complexity of the process and to abilities of the individual user. Steps of a particular process and a relationship of one or more of the steps are identified. Graphical representations of the steps and the relationship as a lean process are provided, wherein the lean process enhances and increases communication and minimizes documentation for providing the graphical representations, and wherein the representations comprise key process elements for the particular process, wherein the key process elements consist of one or more inputs, outputs, activities, process context, entry criteria, exit criteria, purposes, process flow, and roles, and wherein the representation is on a single page if a receiver of the non-verbal communication is an expert audience. If a receiver of the non-verbal communication is an intermediate audience, the non-verbal communication further comprises a process description table having the identified process steps that correspond to the representation of key process elements, wherein the process description table provides guidance and lessons learned relating to the particular process; and if a receiver of the non-verbal communication is a beginner audience, the non-verbal communication further comprises the process description table and training relating to the particular process.

30 Claims, 69 Drawing Sheets

U.S. PATENT DOCUMENTS

| | | | |
|---|---|---|---|
| 6,791,577 B2* | 9/2004 | Yoshioka | 715/705 |
| 6,795,098 B1 | 9/2004 | Emrani | |
| 6,876,894 B1* | 4/2005 | Chen et al. | 700/100 |
| 6,930,790 B1* | 8/2005 | Forthoffer | 358/1.15 |
| 6,937,993 B1* | 8/2005 | Gabbita et al. | 705/7.22 |
| 6,943,915 B1* | 9/2005 | Teraue | 358/1.9 |
| 6,957,418 B2* | 10/2005 | Batcha et al. | 717/124 |
| 7,120,699 B2* | 10/2006 | Stork et al. | 709/239 |
| 7,234,140 B2* | 6/2007 | Dortmans | 718/100 |
| 7,275,039 B2* | 9/2007 | Setteducati | 705/7.24 |
| 7,283,971 B1* | 10/2007 | Levine et al. | 705/7.13 |
| 7,327,481 B2* | 2/2008 | Such et al. | 358/1.15 |
| 7,369,918 B2* | 5/2008 | Cosgrove | 700/213 |
| 7,526,722 B2* | 4/2009 | Wadhwa | 715/707 |
| 7,580,911 B2* | 8/2009 | Sun et al. | 706/50 |
| 7,620,894 B1* | 11/2009 | Kahn | 715/707 |
| 7,640,548 B1* | 12/2009 | Yu et al. | 718/106 |
| 7,701,605 B2* | 4/2010 | Miyata | 358/1.15 |
| 7,830,441 B2* | 11/2010 | Tsukatani | 348/333.11 |
| 2001/0039002 A1 | 11/2001 | Delehanty | |
| 2001/0049615 A1* | 12/2001 | Wong et al. | 705/8 |
| 2002/0055793 A1* | 5/2002 | Yoshioka | 700/83 |
| 2002/0145750 A1* | 10/2002 | Honda et al. | 358/1.15 |
| 2002/0181017 A1* | 12/2002 | Such et al. | 358/1.15 |
| 2003/0018512 A1* | 1/2003 | Dortmans | 705/9 |
| 2003/0036940 A1* | 2/2003 | Leymann et al. | 705/8 |
| 2003/0050800 A1* | 3/2003 | Brandt et al. | 705/2 |
| 2003/0055811 A1* | 3/2003 | Stork et al. | 707/1 |
| 2003/0065613 A1* | 4/2003 | Smith | 705/38 |
| 2003/0072031 A1* | 4/2003 | Kuwata et al. | 358/1.15 |
| 2003/0144974 A1* | 7/2003 | Chang et al. | 706/25 |
| 2003/0172052 A1 | 9/2003 | Crandell et al. | |
| 2003/0189724 A1* | 10/2003 | Kloosterman et al. | 358/1.18 |
| 2004/0066527 A1* | 4/2004 | Kloosterman et al. | 358/1.15 |
| 2004/0078258 A1* | 4/2004 | Schulz et al. | 705/9 |
| 2004/0083448 A1* | 4/2004 | Schulz et al. | 717/101 |
| 2004/0153804 A1* | 8/2004 | Blevins et al. | 714/33 |
| 2004/0190057 A1* | 9/2004 | Takahashi et al. | 358/1.15 |
| 2004/0255234 A1 | 12/2004 | Methot | |
| 2005/0026129 A1* | 2/2005 | Rogers | 434/322 |
| 2005/0071752 A1* | 3/2005 | Marlatt | 715/506 |
| 2005/0159968 A1* | 7/2005 | Cozzolino | 705/1 |
| 2005/0288956 A1 | 12/2005 | Speicher | |
| 2006/0044597 A1* | 3/2006 | Dumitrescu et al. | 358/1.15 |
| 2006/0074730 A1* | 4/2006 | Shukla et al. | 705/8 |
| 2006/0074731 A1* | 4/2006 | Green et al. | 705/8 |
| 2006/0074732 A1* | 4/2006 | Shukla et al. | 705/8 |
| 2006/0074733 A1* | 4/2006 | Shukla et al. | 705/8 |
| 2006/0074734 A1* | 4/2006 | Shukla et al. | 705/8 |
| 2006/0074735 A1* | 4/2006 | Shukla et al. | 705/8 |
| 2006/0074736 A1* | 4/2006 | Shukla et al. | 705/8 |
| 2006/0088806 A1 | 4/2006 | Quinn | |
| 2006/0092467 A1* | 5/2006 | Dumitrescu et al. | 358/1.15 |
| 2006/0197977 A1* | 9/2006 | Miyata | 358/1.15 |
| 2006/0259871 A1 | 11/2006 | Washington et al. | |
| 2007/0168060 A1* | 7/2007 | Nixon et al. | 700/83 |
| 2007/0168065 A1* | 7/2007 | Nixon et al. | 700/97 |
| 2007/0203778 A1* | 8/2007 | Lowson et al. | 705/9 |

OTHER PUBLICATIONS

Sharples, H. (1998). CTP: Long wait for the inevitable. Graphic Arts Monthly, 70(2), 53-58.*

Bharadwaj, V. R. (2000). Web-based workflow in secure collaborative telemedicine. West Virginia University). ProQuest Dissertations and Theses, 120-120 p.*

* cited by examiner

Process WAR Template: Decision Process

Work Products   What work products are used and produced by this process?

| ID Code | Name and Description of Work Products |
|---|---|
| 1 | Decision Package (This work product includes the Decision Matrix Procedure and Decision Presentation) |
| 2 | Decision Matrix Procedure (includes Decision Matrix Form and DAR Info) |
| 3 | Decision Presentation |
| 4 | Decision State |
| 5 | Meeting Minutes |

Activities   What activities are performed?

| ID Code | Name and Description of Activities |
|---|---|
| 6.0 | Decision Process |
| 6.1 | Prepare for Decision |
| 6.1.1 | Identify Decision Maker(s) and Form Decision Team |
| 6.1.2 | Approve Team Participation |
| 6.1.3 | Confirm Decision Maker(s) |
| 6.1.4 | Perform Decision Matrix Procedure |
| 6.1.5 | Review and Approve Decision Package |
| 6.1.6 | Perform Evaluation(s) |
| 6.1.7 | Approve Decision Package |
| 6.1.8 | Review & Approve Decision Package |
| 6.1.9 | Schedule Decision meeting |
| 6.2 | Conduct Decision Meeting |
| 6.2.1 | Present Decision Package to Decision Maker(s) |
| 6.2.2 | Conduct open discussion of decision alternatives, criteria, ranking, issues, etc. |
| 6.2.3 | Make Decision |
| 6.2.4 | Record the Decision |
| 6.3 | Perform Decision Follow-Up |
| 6.3.1 | Update Decision Package |
| 6.3.2 | Communicate Decision |
| 6.3.3 | Address Action Items and Issues |
| 6.3.4 | Update Final Decision Package |
| 6.3.5 | Review, Approve, and Archive Decision Package and Meeting Minutes as records. |

Roles   Who is involved in this process?

| ID Code | Name and Description of Role |
|---|---|
| 1 | Decision Maker(s) |
| 2 | Decision Team |
| 3 | Decision Team Representative |
| 4 | Management |
| 5 | Recorder |

Fig. 10

Process Activity Template: 6.1 Prepare for Decision

Purpose  Why is this activity (i.e., process or sub-process) performed?

Ensure that preparation is performed to reach a good decision.

Inputs  What work products are used by this activity?

| Work product name or ID | Source activity name or ID |
|---|---|
| <Decision Package> | 6.2 Conduct Decision Meeting |

Entry Criteria  When can this activity begin?

| State or Condition | Process Flow: From Activity | [and] [or] |
|---|---|---|
| There is a need for a Major Decision | Calling Process | XOR |
| <Decision Package (Decision State = A: Need More Information)> | 6.2 Conduct Decision Meeting | |

Activities Performed by:  Who is responsible for performing this activity? List all process steps (activities) and roles performing activity (if known).

| ID of Role | ID of Activity |
|---|---|
| 2. Decision Team | 6.1.1 Identify Decision Maker(s) and Form Decision Team |
| 4. Management | 6.1.2 Approve Team Participation |
| 1. Decision Maker(s) | 6.1.3 Confirm Decision Maker(s) |
| 2. Decision Team | 6.1.4 Perform Decision Matrix Procedure |
| All Active Roles | 6.1.5 Review and Approve Decision Package |
| 2. Decision Team | 6.1.6 Perform Evaluation(s) |
| 4. Management | 6.1.7 Approve Decision Package |
| 1. Decision Maker(s) | 6.1.8 Review & Approve Decision Package |
| 2. Decision Team | 6.1.9 Schedule Decision Meeting |

Fig. 11

Process Activity Template: 6.1 Prepare for Decision, *continued*

Sub-Processes and Procedures

How is this activity implemented? (Only list procedures and sub-processes)

| ID | Sub-Processes and/or Procedures |
|---|---|
| 6.1.4 | Perform Decision Matrix Procedure |
| | |

Outputs

What work products are produced by this activity?

| Work product name or ID | Destination activity or ID |
|---|---|
| 1. Decision Package (includes Decision Matrix and Decision Presentation) | 6.2 Conduct Decision Meeting |
| | |

Exit Criteria

When is this activity completed? What activity is next?

| State or Condition | Process Flow: To Activity | [and] [or] |
|---|---|---|
| Decision Package reviewed by Decision Maker(s) and Management | 6.2 Conduct Decision Meeting | AND |
| Decision meeting scheduled with Decision Maker(s). | 6.2 Conduct Decision Meeting | |
| | | |

Process Context

Parent ID: 6.0 Decision Process
Sibling IDs: 6.2 and 6.3
Children ID's: None
Where is process performed? N/A
Who is Process Owner? Decision Team

Fig. 12

Process Activity Template: 6.2 Conduct Decision Meeting

Purpose

Why is this activity (i.e., process or sub-process) performed?

Make an informed decision by evaluating alternatives against ranked criteria using evaluation method(s).

Inputs

What work products are used by this activity?

| Work product name or ID | Source activity name or ID |
|---|---|
| 1. Decision Package | 6.1 Prepare for Decision |
| | |

Entry Criteria

When can this activity begin?

| State or Condition | Process Flow: From Activity | [and] [or] |
|---|---|---|
| Decision Package reviewed by Decision Maker(s) & Management | 6.1 Prepare for Decision | AND |
| Decision meeting scheduled with Decision Maker(s). | 6.1 Prepare for Decision | |
| | | |

Activities Performed by:

Who is responsible for performing this activity? List all process steps (activities) and roles performing activity (if known).

| ID of Role | ID of Activity |
|---|---|
| 3. Decision Team Representative | 6.2.1 Present Decision Package to Decision Maker(s) |
| All Active Roles | 6.2.2 Conduct open discussion of decision alternatives, criteria, ranking, issues, etc. |
| 1. Decision Maker(s) | 6.2.3 Make Decision |
| 5. Recorder | 6.2.4 Record the Decision |
| | |

Fig. 13

Process Activity Template: 6.2 Conduct Decision Meeting, continued

Sub-Processes and Procedures

How is this activity implemented? (Only list procedures and sub-processes)

| ID | Sub-Processes and/or Procedures |
|---|---|
| N/A | There are no procedures or sub-processes for this process. |
| | |

Outputs

What work products are produced by this activity?

| Work product name or ID | Destination activity or ID |
|---|---|
| 1. Decision Package (includes Decision Matrix and Decision Presentation) | 6.3 Perform Decision Follow-Up |
| 5. Meeting Minutes | 6.3 Perform Decision Follow-Up |
| | |

Exit Criteria

When is this activity completed? What activity is next?

| State or Condition | Process Flow: To Activity | [and] [or] |
|---|---|---|
| Decision Package documented | | AND |
| Meeting Minutes documented | | AND |
| If Decision State = C "Final Decision" | 6.3 Perform Decision Follow-Up | |
| | | XOR |
| If Decision State = A "No Decision" | 6.1 Prepare for Decision | |
| | | XOR |
| If Decision State = B "No Decision Needed" | Complete documentation and Exit Process (Return to calling process) | |
| | | |

Process Context

Parent ID: 6.0 Decision Process
Sibling IDs: 6.1 and 6.3
Children ID's: None
Where is process performed? N/A
Who is Process Owner? Decision Team

Fig. 14

Process Activity Template: 6.3 Perform Decision Follow-Up

Purpose

Why is this activity (i.e., process or sub-process) performed?

Address action items, issues, and archive records.

Inputs

What work products are used by this activity?

| Work product name or ID | Source activity name or ID |
|---|---|
| 1. Decision Package | 6.2 Conduct Decision Meeting |
| 5. Meeting Minutes | 6.2 Conduct Decision Meeting |

Entry Criteria

When can this activity begin?

| State or Condition | Process Flow: From Activity | [and] [or] |
|---|---|---|
| Decision Package and Meeting Minutes are documented | 6.2 Conduct Decision Meeting | AND |
| Decision State = C (Final Decision) | 6.2 Conduct Decision Meeting | |

Activities Performed by:

Who is responsible for performing this activity? List all process steps (activities) and roles performing activity (if known).

| ID of Role | ID of Activity |
|---|---|
| 3. Decision Team | 6.3.1 Update Decision Package |
| 1. Decision Maker(s) | 6.3.2 Communicate Decision |
| All Active Roles | 6.3.3 Address Action Items and Issues |
| 3. Decision Team | 6.3.4 Update Final Decision Package |
| 1. Decision Maker(s) | 6.3.5 Review, Approve, and Archive Decision Package and Meeting Minutes as records |

Fig. 15

Process Activity Template: 6.3 Perform Decision Follow-Up, *continued*

Sub-Processes and Procedures

How is this activity implemented? (Only list procedures and sub-processes)

| ID | Sub-Processes and/or Procedures |
|---|---|
| N/A | There are no procedures or sub-processes for this process. |
| | |

Outputs

What work products are produced by this activity?

| Work product name or ID | Destination activity or ID |
|---|---|
| 1. Decision Package | Calling Process or 3. Project Management |
| 5. Meeting Minutes | Calling Process or 3. Project Management |
| | |

Exit Criteria

When is this activity completed? What activity is next?

| State or Condition | Process Flow: To Activity | [and] [or] |
|---|---|---|
| Decision Package is Completed, Reviewed, and Approved by Decision Maker(s) | Calling Process or 3. Project Management | AND |
| Decision Package and Meeting Minutes are completed and archived. | Calling Process or 3. Project Management | |
| | | |

Process Context

Parent ID: 6.0 Decision Process
Sibling IDs: 6.1 and 6.2
Children ID's: None
Where is process performed? N/A
Who is Process Owner? Decision Team

Fig. 16

1.0 PURPOSE
The purpose of the decision process is to document how major decisions are made. The objectives of the Decision Process are:
    Standardize information given to Decision Maker(s)
    Guide decision making
    Identify and consider decision criteria, ranking of criteria, and decision alternatives
    Get the right information to the right people at the right time for a decision
    Provide for records of decisions
    Identify decision process metrics (e.g., for decision effectiveness)

2.0 SCOPE AND DECISION POLICY
Decision Policy: The Decision Process applies to all major decisions.

A major decision is defined as:
    Any decisions that affect business strategy, more than one customer, have legal consequences, or affect anything over $100,000.00.
    All high-risk related decisions.
    All major purchases over $50,000.00

The Decision Process Guide will also be used when a senior manager requires it.

3.0 AUDIENCE
The primary audiences for the Decision Process Guide are:
    All management
    Decision Maker(s)
    Decision Teams
    Engineers making design decisions
    All purchasers
    Anyone who wants to make a decision and uses this process 4.0 USAGE
The primary usage scenarios for the Decision Process Guide are all major decisions made by:
    Senior managers or Decision Maker(s)
    Teams
    New information becomes available after a decision has been made requiring another decision.
    Real-time/operational decisions or emergency decisions.

5.0 DEFINITIONS, ACRONYMS AND REFERENCES

Definitions
5 W's    Who, What, Where, When, and Why.

Consensus:    A decision where every team member can support it, and no team member is or board member is opposed to it (i.e., although it may not be a team or board members first choice, the team or board member can support it). Consensus is not voting.

Fig. 17

Definitions, continued
Decision Package: Decision Matrix Procedure and Decision Presentation.

Acronyms
AND — Default relationship of Entry and Exit criteria is all of them (AND)
CMMI[SM] — Capability Maturity Model Integrated
DAR — Decision Analysis and Resolution (a process area from the CMMI[SM])
XOR — Exclusive OR (must chose one alternative or the other, but not both)

6.0 BLOCK DIAGRAM OF DECISION PROCESS
The Decision Process (Figure 7.0) consists of 3 phases and 3 Decision States: 80

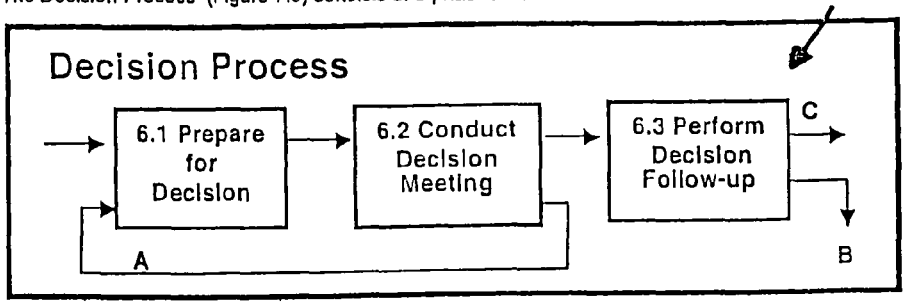

FIGURE 6.0 DECISION PROCESS

| State | State Name | State Description |
|---|---|---|
| A | More Information Needed | New Information (e.g., a new option, criteria, criteria rank, or evaluation method) is required or becomes available and the decision analysis and evaluation needs to be repeated. |
| B | No Decision Needed | It is determined by the Decision Maker(s) that a decision is no longer needed or necessary. This state exits the Decision Process. |
| C | Final Decision | The Decision Maker(s) reach a decision with consensus. The decision is final (unless new information becomes available later where the need for a new decision will be determined). |

Fig. 18

6.1 PREPARE FOR DECISION PROCESS (INTERMEDIATE MODE)

| Step | Role | Action |
|---|---|---|
| 6.1.1 | Decision Team | Identify Decision Maker(s) and Form Decision Team<br>GUIDANCE: Identify the Senior Manager(s), Sponsor(s), or Management Group(s) that will make the decision. Use established management where appropriate. Select the most knowledge team members for making a recommendation to the Decision Maker(s). |
| 6.1.2 | Management | Approve Team Participation<br>GUIDANCE: Management should support staff participating on Decision Teams. Management should select the most qualified person for the team (based on existing priorities). |
| 6.1.3 | Decision Team | Confirm Decision Maker(s)<br>GUIDANCE: Decision Maker(s) need to confirm whether they are the responsible party for making the decision (please respond in a timely manner). |
| 6.1.4 | Decision Team | Perform Decision Matrix Procedure<br>GUIDANCE: Perform the Decision Matrix Procedure located in the Excel spreadsheet (the procedure is a tab in the workbook). Be sure to update the Decision Form and the Decision Advantages and Disadvantages tabs. Also update the Decision Matrix Procedure as information becomes available. |
| 6.1.5 | All Roles, Facilitated by Decision Team | Review and Approve Decision Package<br>GUIDANCE: If the decision analysis and evaluation is complex or is going to cost considerable time and money, all roles should be meet and approve the decision options, decision criteria, ranking of criteria, and evaluation methods. |
| 6.1.6 | Decision Team | Perform Evaluation(s)<br>Perform evaluation(s), conduct analysis, and document Decision Package<br>GUIDANCE: Complete the Decision Matrix and document all evaluation methods. The default evaluation method is the Decision Matrix Procedure. Use the Decision Matrix Form to analyze and document the results. The Decision Package consists of the Decision Matrix Procedure results and the Decision Presentation. |
| 6.1.7 | Management. | Approve Decision Package<br>GUIDANCE: The goal is to reach consensus on the decision (please see the definition of consensus in Section 5). |
| 6.1.8 | Decision Maker(s) | Review and Approve Decision Package<br>GUIDANCE: The goal is to reach consensus on the decision. |
| 6.1.9 | Decision Team | Schedule Decision Meeting.<br>GUIDANCE: It is best if the Decision Maker(s), relevant management, and the Decision Team are present at the Decision Meeting. However, if there are too many people than a representative of the Decision Team my present the Decision Team's recommendation using the Decision Presentation Standard. |

Fig. 20

6.2 CONDUCT DECISION MEETING (INTERMEDIATE MODE)

| Step | Role | Action |
|---|---|---|
| 6.2.1 | Decision Team | Decision Team representative presents Decision Package to Decision Maker(s)<br><br>GUIDANCE: Decision Team Representative presents the decision package to the Decision Maker(s) using the Decision Presentation template. If possible, it is best to have the entire Decision Team at the Decision Meeting. At a minimum, the Decision Team Representative represents the team. |
| 6.2.2 | All Roles | Conduct open discussion of decision alternatives, criteria, ranking, issues, etc.<br><br>GUIDANCE: Encourage open discussion to mitigate the risk of not reaching consensus. |
| 6.2.3 | Decision Maker(s) | Make Decision<br><br>GUIDANCE: Make a decision that falls into one of the defined 3 states. |
| 6.2.4 | Recorder | Record the Decision<br>    Record the decision in the Decision Matrix. Distribute the Decision Package and meeting minutes to the Decision Team, Decision Makers, management, and other relevant stakeholders.<br><br>GUIDANCE: Decision Records are very important. The Decision Matrix as well as meeting minutes should be documented. |

Fig. 22

| 6.3 DECISION FOLLOW-UP (INTERMEDIATE MODE) |||
|---|---|---|
| Step | Role | Action |
| 6.3.1 | Decision Team | Update Decision Package.<br>    If necessary, update decision package.<br><br>GUIDANCE: Decision Package consists of Decision Matrix Procedure and Decision Presentation. |
| 6.3.2 | Decision Maker(s) | Communicate Decision.<br>    If necessary, communicate decision to affected parties.<br><br>GUIDANCE: Ensure all affected parties are informed of decison, |
| 6.3.3 | All Roles | Address Action Items and Issues<br><br>GUIDANCE: Address all action items and issues from Decision Meeting. |
| 6.3.4 | Decision Team | Updated Final Decision Package.<br>    Complete final Decision Package and ensure meeting minutes are finalized.<br><br>GUIDANCE: Decison Package must be finalized at this point. |
| 6.3.5 | Decision Team | Review, Approve, and Archive Decision Package and Meeting Minutes as records.<br><br>GUIDANCE: Decision Maker(s) must approve decision package and decide where to archive the documents as records. |

Fig. 24

6.1 PREPARE FOR DECISION PROCESS (INTERMEDIATE MODE)

| Step | Role | Action |
|---|---|---|
| 6.1.1 | Decision Team | Identify Decision Maker(s) and Form Decision Team<br>GUIDANCE: Identify the Senior Manager(s), Sponsor(s), or Management Group(s) that will make the decision. Use established management where appropriate. Select the most knowledge team members for making a recommendation to the Decision Maker(s). |
| 6.1.2 | Management | Approve Team Participation<br>GUIDANCE: Management should support staff participating on Decision Teams. Management should select the most qualified person for the team (based on existing priorities). |
| 6.1.3 | Decision Team | Confirm Decision Maker(s)<br>GUIDANCE: Decision Maker(s) need to confirm whether they are the responsible party for making the decision (please respond in a timely manner). |
| 6.1.4 | Decision Team | Perform Decision Matrix Procedure<br>GUIDANCE: Perform the Decision Matrix Procedure located in the Excel spreadsheet (the procedure is a tab in the workbook). Be sure to update the Decision Form and the Decision Advantages and Disadvantages tabs. Also update the Decision Matrix Procedure as information becomes available. |
| 6.1.5 | All Roles, Facilitated by Decision Team | Review and Approve Decision Package<br>GUIDANCE: If the decision analysis and evaluation is complex or is going to cost considerable time and money, all roles should be meet and approve the decision options, decision criteria, ranking of criteria, and evaluation methods. |
| 6.1.6 | Decision Team | Perform Evaluation(s)<br>Perform evaluation(s), conduct analysis, and document Decision Package<br>GUIDANCE: Complete the Decision Matrix and document all evaluation methods. The default evaluation method is the Decision Matrix Procedure. Use the Decision Matrix Form to analyze and document the results. The Decision Package consists of the Decision Matrix Procedure results and the Decision Presentation. |
| 6.1.7 | Management. | Approve Decision Package<br>GUIDANCE: The goal is to reach consensus on the decision (please see the definition of consensus in Section 5). |
| 6.1.8 | Decision Maker(s) | Review and Approve Decision Package<br>GUIDANCE: The goal is to reach consensus on the decision. |
| 6.1.9 | Decision Team | Schedule Decision Meeting.<br>GUIDANCE: It is best if the Decision Maker(s), relevant management, and the Decision Team are present at the Decision Meeting. However, if there are too many people than a representative of the Decision Team my present the Decision Team's recommendation using the Decision Presentation Standard. |

Fig. 26

6.2 CONDUCT DECISION MEETING (INTERMEDIATE MODE)

| Step | Role | Action |
|------|------|--------|
| 6.2.1 | Decision Team | Decision Team representative presents Decision Package to Decision Maker(s)<br><br>GUIDANCE: Decision Team Representative presents the decision package to the Decision Maker(s) using the Decision Presentation template. If possible, it is best to have the entire Decision Team at the Decision Meeting. At a minimum, the Decision Team Representative represents the team. |
| 6.2.2 | All Roles | Conduct open discussion of decision alternatives, criteria, ranking, issues, etc.<br><br>GUIDANCE: Encourage open discussion to mitgate the risk of not reaching consensus. |
| 6.2.3 | Decision Maker(s) | Make Decision<br><br>GUIDANCE: Make a decision that falls into one of the defined 3 states. |
| 6.2.4 | Recorder | Record the Decision<br>    Record the decision in the Decision Matrix. Distribute the Decision Package and meeting minutes to the Decision Team, Decision Makers, management, and other relevant stakeholders.<br><br>GUIDANCE: Decision Records are very important. The Decision Matrix as well as meeting minutes should be documented. |

Fig. 28

| 6.3 DECISION FOLLOW-UP (INTERMEDIATE MODE) | | |
|---|---|---|
| Step | Role | Action |
| 6.3.1 | Decision Team | Update Decision Package.<br>If necessary, update decision package.<br><br>GUIDANCE: Decision Package consists of Decision Matrix Procedure and Decision Presentation. |
| 6.3.2 | Decision Maker(s) | Communicate Decision.<br>If necessary, communicate decision to affected parties.<br><br>GUIDANCE: Ensure all affected parties are informed of decison. |
| 6.3.3 | All Roles | Address Action Items and Issues<br><br>GUIDANCE: Address all action items and issues from Decision Meeting. |
| 6.3.4 | Decision Team | Updated Final Decision Package.<br>Complete final Decision Package and ensure meeting minutes are finalized.<br><br>GUIDANCE: Decison Package must be finalized at this point. |
| 6.3.5 | Decision Team | Review, Approve, and Archive Decision Package and Meeting Minutes as records.<br><br>GUIDANCE: Decision Maker(s) must approve decision package and decide where to archive the documents as records. |

Fig. 30

7.0 RECORDS

| RECORD IDENTIFICATION | OWNER | LOCATION | RECORD MEDIA: ELECTRONIC OR HARD COPY | CM NUMBER | RETENTION/ DISPOSITION |
|---|---|---|---|---|---|
| Decision Matrix Procedure | Decision Maker(s) | Project Library | Electronic | D1 | 7 years |
| Decision Presentation | Decision Maker(s) | Project Library | Electronic | D2 | 7 years |
| Meeting Minutes | Decision Maker(s) | Project Library | Electronic | D3 | 7 years |

8.0 INTERFACES
The Decision Process interfaces with any process that requires a major decision. Examples of processes that have a major interface to the Decision Process are:
    Design Process
    Risk Management Process
    Issue Management Process
    Program and Project Management Processes
    Purchasing Processes 9.0 METRICS
The metrics for the Decision Process are:
    Total number of decisions (based on states)
    Total effort per decision (i.e., total hours per decision)
    Total cost per decision
These metrics can be calculated from the Decision Matrix Procedure.

10.0 FORMS AND TEMPLATES
The Decision Process has the following forms and templates:
    Presentation Template
    Decision Matrix Procedure (includes forms)
    Meeting Minutes Template 11.0 TRAINING
Training is required on the Decision Process.

12.0 EMERGENCY DECISIONS
For an emergency decision, the following Decision Process modifications are allowed:
    Activities may be combined
    Meetings may be combined
    The meeting minutes may be completed at the end of the process (i.e., after the decision is made)
    The Decision Presentation is optional.
However, the Decision Matrix must be completed and used during the decision. All Decision Process activities must be completed, and records must be archived within 30 days after the decision.

Fig. 31

Appendix A: Decision Presentation Standard

| Section | Section Description |
|---|---|
| Introduction | Describe the purpose of the decision, and any relevant background. |
| Decision Options | Describe the options available to decide from. |
| Advantages | Describe the advantages for each decision option. |
| Disadvantages | Describe the disadvantages for each decision option. |
| Decision Matrix Form Information | Cut and paste the Decision Matrix Form from the Decision Matrix Procedure in MS Excel into a slide in MS PowerPoint, or communicate the information in the Decision Matrix Form any way. |
| Decision Information | Optionally, include the Decision information from the forms in the Decision Matrix Procedure in the Decision Presentation. |
| Recommendation | Based on the Decision Matrix Form, make a recommendation of a decision option to the Decision Maker(s). |

Please see online Decision Presentation Template in MS PowerPoint.

Fig. 32

Appendix B: Decision Matrix Procedure

DAR Procedure

| Step | Action |
|---|---|
| 1 | Perform a literature search to consider applicable historical data, historical decisions, previous dissent, lessons learned, etc. |
| 2 | Document the decision criteria in the DAR Matrix (in this DAR Workbook) |
| 3 | Rank the decision criteria by using the weights (e.g., use team consensus for weights) |
| 4 | Complete the decision options in the DAR Matrix |
| 5 | If there are other evaluation methods besides the DAR Matrix, document them in the DAR Form (in this DAR Workbook) |
| 6 | Complete DAR Matrix Form by filling in scores (e.g., select a number on a scale 1-5 using team consensus) |
| 7 | Use the DAR Matrix weighted total scores to help make a recommendation for a decision |
| 8 | Complete the DAR Form and DAR Advantages/Disadvantages (in this DAR Workbook) |
| 9 | meets the ecision Presentation Standard. |
| 10 | Continue to follow the DAR Process. |

NOTE: Completing the DAR Workbook is iterative in nature. Use versions to keep track of iterations

Fig. 33

| Decision Matrix | | ENTER SCORES | Option 1 | Option 2 | Option 3 | Option N |
|---|---|---|---|---|---|---|
| EXAMPLE CRITERIA | Weight | SCALE | | | | |
| Supports Mission Objectives | 25 | 5 = Most Supportive / 1 = Least Supportive | 5 | 3 | 5 | 1 |
| Return on Investment (ROI) | 20 | 5 = Most ROI / 1 = Least ROI | 2 | 3 | 5 | 1 |
| Cost | 15 | 5 = Least Expensive / 1 = Most Expensive | 5 | 3 | 5 | 1 |
| Schedule | 15 | 5 = Shortest Schedule / 1 = Longest Schedule | 4 | 3 | 5 | 1 |
| Measure of Potential Impact | 8 | 5 = Positive Impact / 1 = Negative Impact | 4 | 3 | 5 | 1 |
| Risk | 7 | 5 = Least Risk / 1 = Most Risk | 3 | 3 | 5 | 1 |
| Safety | 5 | 5 = Most Safe / 1 = Least Safe | 3 | 3 | 5 | 1 |
| Supportability | 5 | 5 = Most Supportive / 1 = Least Supportive | 1 | 3 | 5 | 1 |
| Etc. | 0 | 5 = Most Supportive / 1 = Least Supportive | 0 | 0 | 0 | 0 |
| WEIGHTED TOTALS in % | 100.00% | SCALE 1-5 | 74.60% | 60.00% | ##### | 20.00% |

CRITICAL DECISION MATRIX USAGE NOTES:

- Sum of Weights (Column B) must add up to 100 in order for percentage to work
- Highest score is 100%
- Can have add or delete selection criteria
- Default scale is 1-5 (can change scale in total row-automatically referenced in formulas). Column C text must be manually changed.
- Can use highest score instead of percentage by removing dividing by 100 in weighted totals and by removing percentages format in totals (Column B can then add up to anything)

Fig. 34

Lean Process Documentation Design Procedure

Lean Process Documentation Design Procedure

The following procedure documents the Design Phase for defining a process or sub-process on a one-page in a diagram (i.e., process model).

| Step # | Procedure Step |
|---|---|
| 1 | Brainstorm the WAR Process Template for the scope of the process to be defined. Brainstorm all Work products, all Activities, and all Roles<br><br>Guidance: "Roles" usually has the least in number, and "Activities" usually has the most in number. |
| 2 | If any list in the WAR template has more than 10 (max is 12), then perform an affinity exercise (i.e., group like things together in "chunks" of 2-10 things).<br><br>Guidance:<br>• Roles, Work Products, and Activities may all need to be chunked. Usually, activities will need to be chunked. If all lists are 10 items or less, the process may be defined in one Activity Process Template.<br>• Duplicates should be consolidated in all lists.<br>• Activities are the most important to chunk. Look for process chunks such as "planning", "control", and "improvement". If there is a meeting or an event, look for "pre", "during", and "after" chunks.<br>• Name the "chunks" descriptively. The chunks may or may not exist in reality. For example, a role called "Team" may be new chunk label that describes 4 other roles together. This team may not exist in an organization, but is created only for the process. |
| 3 | Update the Initial Process Model (i.e., block diagram) to match the activity chunks. Draw one box for each activity chunk.<br><br>Guidance:<br>• Draw a block diagram, using one box for each activity chunk, understanding the relationships among the chunks. For example, they all may be sequential (draw an arrow between the boxes). Or they all may be concurrent (draw a dotted line between all the boxes). |
| 4 | Complete a Process Activity Template for each activity chunk. By completing a Process Activity Template, all nine-process elements are identified for each activity chunk.<br><br>Guidance:<br>Each Process Activity Template is represented by a box in the Initial Process Model. |
| 5 | Select a process model representation, or decide to represent the processes with informal diagrams.<br><br>Guidance:<br>The three most popular process modeling approaches are ETVX, SADT, and Role/Flow. Because of flow charts, Role/Flow is currently the most popular approach. ETMX is a variation of ETVX. |
| 6 | Document all Design Decisions. |

Fig. 35

Lean Process Modeling and Documentation Procedure

Lean Process Modeling and Documentation Procedure

The following procedure documents the Lean Process Modeling and Documentation Procedure for the Modeling Stage for defining a process or sub-process on a one-page in a diagram (i.e., process model).

| Step # | Procedure Step |
|---|---|
| 1 | The goal of this step is to define the 5 W's (9 process elements) on one page in a process model or diagram (expert mode) for each Process Activity Template.<br>• Using one Process Activity Template at a time, map the nine elements on to the one page process model diagram (using the process modeling representation selected in the Design Stage).<br>Alternative Step:<br>• If the Process Activity templates were not used, using the process chunk identified in the process design stage, define the nine process elements on one page in the representation selected in design.<br><br>Guidance:<br>• It can be extremely difficult to get the nine process elements on one page. Sometimes process elements may need to be combined to make room (e.g., "Inputs/Entry Criteria" or "Outputs/Exit Criteria" or "Roles/Activities").<br>• The entire process is usually represented by a Block Diagram. Each Process Activity Template is represented by a box in the Initial Process Model. |
| 2 | Repeat step one for each Process Activity Template.<br><br>Guidance:<br>Each Process Activity Template is a sub-process, and needs a expert mode diagram or process model. |
| 3 | For intermediate mode, create an ordered process table. Each step must map back to an activity in the process model.<br><br>Guidance:<br>Each step in the process model diagram is in expert mode. Each expert mode step usually needs more sub-steps or more detailed explanation for an intermediate mode. |
| 4 | For each step in the Intermediate Mode Process Table, think of guidance or lessons learned. Use a "Guidance" label to document guidance and lessons learned. Guidance is not required for every step. |
| 5 | Once the expert mode process models or diagrams and the intermediate mode tables are completed, verify and validate them. Once this is completed, perform the following procedures for each policy, standard, and procedure:<br>• Procedure for Developing a Lean Policy<br>• Procedure for Developing a Lean Standard<br>• Procedure for Developing a Lean Procedure<br>• Procedure for Developing a Lean Process Guide |

Fig. 36

Procedure for Developing a Lean Procedure

| | |
|---|---|
| Procedure Purpose | The purpose of a procedure is to describe step-by-step instructions or "how-to" information. |
| Definition of a Procedure | The definition of a procedure is "a process document that is a set of activities or steps that describe 'how to' information, and is represented in a Checklist, Form, or Ordered Table. |
| Procedure for a Lean Procedure | This procedure documents the steps for the Process Modeling Stage for defining procedures on one-page. |

| Step # | Procedure Step |
|---|---|
| 1 | Title the procedure starting with an action verb, and focus the title on the main output of the procedure. Use descriptive language to name the procedure.<br><br>Example: A procedure for estimating the cost of a project could be called: "Estimate Project Cost Procedure".<br><br>Guidance:<br>Try to use action verbs in their simplest form for the first word of a procedure (e.g., use "Estimate" over "Estimated" or "Estimating"). |
| 2 | Decide whether to use a Checklist, Form, or Ordered Table. Use the following guidelines to make a decision:<br><br>If the primary purpose of the procedure is to:<br>• Collect data and/or information: Use a Form<br>• Perform activities in a certain order: Use an Ordered Table<br>• Perform a collection of activities in most any order: Use a Checklist<br><br>Guidance:<br>• The primary purpose of a procedure should guide the selection of procedure type. A checklist may have some order imposed on it. An ordered table may have a un-ordered checklist in it. Some data may be collected on a checklist or ordered table. However, the primary purpose makes the choosing the procedure type repeatable. |
| 3 | All Procedures:<br>• Use the procedure templates for a Checklist or an Ordered Table.<br>• Use descriptive language when documenting procedure steps.<br>• Keep procedures focused on a single usage scenario.<br>• If possible, order the information in a logical flow or presentation.<br>• Keep procedures to one page.<br>• If appropriate, chunk the procedure into logical groups and label the chunks.<br>Order Tables: Develop the procedure steps starting using action verbs for the first word.<br>Checklists: Checklists should have labeled categories of one or two words. Write the checklist items as questions.<br>Forms: If developing a form, focus on the precise data and information to be collected. Provide operational definitions for complex data. |

Fig. 37

Meeting Minutes Template

Meeting Agenda   Use the table below to document meeting information.

| Item | Information |
|---|---|
| Meeting Title (what) | |
| Meeting Purpose (why) | |
| Attendance (who) | • <br> • |
| Date and Time (when) | |
| Location (where) | |

Meeting Agenda   Use the table below to document the meeting agenda:

| # | Agenda Item Description |
|---|---|
| 1 | |
| 2 | |
| 3 | |
| 4 | |

Action Items   Use the table below to document action items:

| # | Action Item Description |
|---|---|
| 1 | |
| 2 | |
| 3 | |

Issues   Use the table below to document issues:

| # | Issue Description |
|---|---|
| 1 | |
| 2 | |
| 3 | |

Decision/ Agreements   Use the table below to document decisions and agreements:

| # | Decision/Agreement Description |
|---|---|
| 1 | |
| 2 | |
| 3 | |

Fig. 38

Checklist Template

Checklist Title   The following checklist provides requirements for...

| √ | Item | Item Description |
|---|------|------------------|
|   | 1    |                  |
|   | 2    |                  |
|   | 3    |                  |
|   | 4    |                  |
|   | 5    |                  |
|   | 6    |                  |
|   | 7    |                  |
|   | 8    |                  |
|   | 9    |                  |
|   | 10   |                  |
|   | 11   |                  |
|   | 12   |                  |
|   | 13   |                  |
|   | 14   |                  |
|   | 15   |                  |

Fig. 39

Procedure (Ordered Table) Template

Procedure   The following procedure provides requirements for .... This procedure is intended to be performed in the order of the steps.

| Item | Procedure Step |
|------|----------------|
| 1    |                |
| 2    |                |
| 3    |                |
| 4    |                |
| 5    |                |
| 6    |                |
| 7    |                |
| 8    |                |

Fig. 40

| Procedure for Developing a Lean Standard | |
|---|---|
| Purpose of a Standard | The purpose of a standard is to make work products more repeatable. Standards should identify a section number, a name of a section, and the description of what goes into each section. Required and optional sections should be labeled as such. |
| Definition of a Standard | The definition of a standard is "a process document that is comprised of sections numbers, section names, and textual descriptions of what goes into each section." Standards usually focus on work products, but there also can be standards for any type of document. |
| Procedure for a Lean Standard | This procedure documents the steps for the Process Modeling Stage for defining standards on one-page. |

| Step # | Procedure Step |
|---|---|
| 1 | Title the standard "<Name of Work Product> Standard". For example, if the work product name is "Project Plan", then title the standard "Project Planning Standard".<br><br>Guidance:<br>You may name the standard whatever you want, but a descriptive name is best for people to understand what the standard is for. |
| 2 | List the sections that the work product should have. This can be done in a table, or by listing the sections using section numbers. If you use a table, then the sections can be numbered, or a column can be added for the number.<br><br>Example for Project Plan:<br>Section 1: Introduction<br>Section 2: Project Overview<br>Section 3: Risk Management<br>Etc.<br><br>Guidance:<br>• Although section numbers are optional, standards should have section numbers that actually become section numbers in the work products. |
| 3 | For each section, describe what goes into that section. Be as concise as possible, providing a repeatable definition for each section.<br><br>Example: Section 2: Project Overview:<br>Describe the purpose and objectives of the project. Describe why the project exists, and what the project is trying to accomplish. Provide a brief over of the project.<br><br>Guidance:<br>• Use industry standards and books to help you.<br>• Be as precise and concise as possible. |
| 4 | Although each standard should be on one page, standards may be combined together into a standards document. Another option is to define the standard in the process guide along with the other process documentation (e.g., policies, standards, processes, and procedures in one document for a given process). |

Fig. 41

Procedure for Developing a Lean Policy

| | |
|---|---|
| Purpose of a Policy | The purpose of a policy for an organization is for senior management to provide guiding principles and direction for the way the organization does business. |
| Policy Definition | The definition of a policy is "a process document that is based upon principles that guide and constrain an organization with respect to a specific process or topic." Polices can have definitions and/or operational definitions. |
| Procedure for a Lean Policy | This procedure documents the steps for the Process Modeling Stage for defining policies on one-page. |

| Step # | Procedure Step |
|---|---|
| 1 | Title the policy "<Name of Process> Policy". For example, if the process name is Project Planning, then title the Policy "Project Planning Policy". <br><br> Guidance: <br> You may name the policy whatever you want, but a descriptive name is best for people to understand what the policy is for. |
| 2 | Regarding the process, define the vital few principles that you want the organization to follow (e.g., 7 plus or minus two principles), and management to enforce. This can be done in a table, or by listing the principles using numbers or bullets. <br><br> Example for Project Planning: <br> Project Plans: "All projects will develop project plans following the approved Project Plan Standard". <br><br> Guidance: <br> • Good sources for process principles come from industry standards and good books. <br> • Optionally, each principle may be labeled for summary purposes and ease of reading. If tables are used, a third column may be added. |
| 3 | Since senior management owns policies, an "Authorization" or "Approval" section should be added (optional section). <br><br> Guidance: <br> • Senior management should review, approve, and own the policies. <br> • The "Authorization" or "Approval" section is optional, but is highly recommended to show sponsorship of the policy. |
| 4 | If needed, policies may have definitions and operational definitions. <br><br> Guidance: <br> An operational definition should be repeatable and measurable. |
| 5 | Although each process policy should be on one page, policies may be combined together into a policy document. Another option is to define the policy in the process guide along with the other process documentation (e.g., policies, standards, processes, and procedures defined together for a given process). |

Fig. 42

Procedure for Developing a Lean Process Guide

Procedure for a Lean Process Guide
This procedure documents the steps for the Process Modeling Stage for defining a lean process guide.

| Step # | Procedure Step |
|---|---|
| 1 | Title the process guide descriptive language to name the process.<br><br>Example: The title of a process guide for planning a project could be: "Project Planning Process Guide". |
| 2 | Develop the process guide following the Process Guide Standard.<br><br>Guidance:<br>• Try to keep the process guide short and usable.<br>• The process guide is like a user guide. It is the primary package that the user/customer will see and use.<br>• Make the process guide as professional and well written as possible.<br>• The user/customer may add and delete sections. Try to be as flexible as possible regarding sections. |
| 3 | Use the following checklist to check the process guide:<br><br>• Does the process guide match the process models?<br><br>• Does the process guide match the process description tables?<br><br>• Does the customer/user want the policies, standards and procedures combined in the process guide? Or in separate documents (e.g., a policy manual, a standards manual, or procedures manual).<br><br>• Have the policies, standards, and procedures been kept to 1 page each?<br><br>• Has the process guide been verified?<br><br>• Has the process guide been validated?<br><br>• Has the process guide been grammar checked?<br><br>• Is the process guide spell checked?<br><br>• Have the process guide been edited (e.g., by a professional editor)?<br><br>• Has the process guide been backed up? |

Fig. 43

Process Guide Standard

Process Guide Goal  The goal of the Process Guide is to keep it as short and usable as possible. Guidelines are 2 pages per sub-process, and 1 page per policy, standard, or procedure. A good goal is less than 20 pages per process (e.g., with about 4 sub-processes).

Process Guide Standard  The following standard provides required sections of a Process Guide.

| # | Section | Description |
|---|---|---|
| 1 | Purpose | Describe the purpose of the process guide. |
| 2 | Scope | Describe the scope of the process guide. Scope should include the process scope, technical scope, when process is used, time (e.g., schedule), and organizational scope. Sometimes policies can be added to scope. |
| 3 | Audience | Describe the audience of the process guide. There can a primary audiences and secondary audiences. |
| 4 | Usage | Describe the usage scenarios for the primary audiences (secondary audiences are optional). |
| 5 | Definitions and References | Define process terminology and provide any references. |
| 6 | Process Models | Describe the overall process model. Each subsection (i.e., sub-process) of this section should be a process model in expert mode (answering the 5 W's) and a process description table in intermediate mode. Each sub-process should be 2 pages (1 page expert mode and 1 page intermediate mode). |
| 7 | Records | List the documents of the process and how they will be stored (e.g., for ISSO purposes). |
| 8 | Interfaces | Describe the interfaces to other activities (i.e., functions, processes, sub-processes, and procedures). |
| 9 | Metrics | Describe any metrics (e.g., process effort, process cost, schedule, quality, etc.) |
| 10 | Forms and Templates | Document any process forms and templates. |
| 11 | Training | Describe the requirements for training the process. |
| 12 | Miscellaneous | Feel free to tailor the standard and any sections. |
| 13 | Appendixes | Feel free to add appendices such as policies, standards, procedures, etc. |

Fig. 44

Process WAR Template: CM Process

Work Products  What work products are used and produced by this process?

| ID Code | Name and Description of Work Products |
|---|---|
| 1 | Baseline |
| 2 | CCB Meeting Minutes |
| 3 | Change Request (CR) |
| 4 | CM System |
| 5 | Configuration Audit Report |
| 6 | Configuration Identification Report |
| 7 | Configuration Item (CI) |
| 8 | CR/PR Trend Report |
| 9 | Organizational CM Plan |
| 10 | Problem Report (PR) |
| 11 | Project CM Plan |
| 12 | Project Plan |

Activities  What activities are performed?

| ID Code | Name and Description of Activities |
|---|---|
| 7.0 | CM Process |
| 7.1 | Perform CM Planning |
| 7.1.1 | Assign Project CM Plan to CM Lead |
| 7.1.2 | Develop Project CM Plan according to CM Plan Standard |
| 7.1.3 | Review Project CM Plan |
| 7.1.4 | Perform Establish CM System Procedure |
| 7.1.5 | Approve Project CM Plan |
| 7.2 | Perform Configuration Control |
| 7.2.1 | Establish and Approve Baselines |
| 7.2.2 | Submit CR/PR |
| 7.2.3 | Perform Check-in/Check-out Procedure |
| 7.2.4 | Perform CM Administration |
| 7.2.5 | Perform Conduct CCB Meeting Procedure |
| 7.2.6 | Perform Change Control Procedure |
| 7.2.7 | Approve Release |
| 7.2.8 | Perform Release Procedure |
| 7.3 | Perform Configuration Status Accounting |
| 7.3.1 | Request CM Reports |
| 7.3.2 | Produce CCB Meeting Minutes |
| 7.3.3 | Produce CM Report(s) according to CM Report Standards |
| 7.3.4 | If Applicable, Review CM Report(s) |
| 7.3.5 | Approve and Communicate CM Report(s) |
| 7.3.6 | Confirm CM Report(s) |
| 7.4 | Perform CM Audits |
| 7.4.1 | Request CM Audit |
| 7.4.2 | Conduct CM Audit According to Appropriate CM Checklist |
| 7.4.3 | Produce CM Audit Report According to CM Audit Report Standard |
| 7.4.4 | If Applicable, Review CM Audit Report |
| 7.4.5 | Approve and Communicate CM Audit Report |
| 7.4.6 | Confirm CM Audit Report |

Fig. 45

Process WAR Template: CM Process, Continued

Roles    Who is involved in this process?

| ID Code | Name and Description of Role |
|---|---|
| 1 | Configuration Control Board (CCB) |
| 2 | Configuration Management (CM) Auditor |
| 3 | Configuration Management (CM) Lead |
| 4 | Developers |
| 5 | Project Manager (PM) |
| 6 | Quality Assurance (QA) |
| 7 | Requester |

Fig. 46

Process Activity Template: 7.1 Perform CM Planning

Purpose  Why is this activity (i.e., process or sub-process) performed?

Define a complete Project CM Plan that meets project needs.

Inputs  What work products are used by this activity?

| Work product name or ID | Source activity name or ID |
|---|---|
| 9. Organizational CM Plan | 2. Organizational Planning Process |
| 12. Project Plan | 3. Project Planning Process |
| | |

Entry Criteria  When can this activity begin?

| State or Condition | Process Flow: From Activity | [and] [or] |
|---|---|---|
| Project initiated | 3. Project Planning Process | AND |
| Draft Project Plan | 3. Project Planning Process | AND |
| Organizational CM Plan is approved and meets CM Standard. | 2. Organizational Planning Process | |
| | | |

Activities Performed by:  Who is responsible for performing this activity? List all process steps (activities) and roles performing activity (if known).

| ID of Role | ID of Activity |
|---|---|
| 5. PM | 7.1.1 Assign Project CM Plan to CM Lead |
| 3. CM Lead | 7.1.2 Develop Project CM Plan according to CM Plan Standard |
| All Active Roles | 7.1.3 Review Project CM Plan |
| 3. CM Lead | 7.1.4 Perform Establish Project CM System Procedure |
| 6. QA | 7.1.5 Approve Project CM Plan |

Fig. 47

Process Activity Template: 7.1 Perform CM Planning, *continued*

Sub-Processes and Procedures

How is this activity implemented? (Only list procedures and sub-processes)

| ID | Sub-Processes) and/or Procedures |
|---|---|
| 7.1.4 | Perform Establish Project CM System Procedure. |
| | |

Outputs

What work products are produced by this activity?

| Work product name or ID | Destination activity or ID |
|---|---|
| 11. Project CM Plan | 7.2 – 7.4 of CM Process |
| 4. CM System | 7.2 – 7.4 of CM Process |
| | |

Exit Criteria

When is this activity completed? What activity is next?

| State or Condition | Process Flow: To Activity | [and] [or] |
|---|---|---|
| Project CM Plan is reviewed, approved, and matches CM standard | 7.2 – 7.4 of CM Process | AND |
| CM System set-up correctly | 7.2 – 7.4 of CM Process | AND |
| | | |

Process Context

Parent ID: 7.0 CM Process
Sibling IDs: 7.2 – 7.4
Children ID's: None
Where is process performed? N/A
Who is Process Owner? CM Lead

Fig. 48

Process Activity Template: 7.2 Perform Configuration Control

Purpose — Why is this activity (i.e., process or sub-process) performed?

Conduct CCB Meetings, control baselines, CI's and CR/PRs.

Inputs — What work products are used by this activity?

| Work product name or ID | Source activity name or ID |
|---|---|
| 9. Organizational CM Plan | 3. Project Planning Process |
| 12. Project CM Plan | 7.1 Perform CM Planning |
| 4. CM System | 7.1 Perform CM Planning |

Entry Criteria — When can this activity begin?

| State or Condition | Process Flow: From Activity | [and] [or] |
|---|---|---|
| Approved Organizational CM Plan | 2. Organizational Planning Process | AND |
| Approved Project CM Plan | 7.1 Perform CM Planning | AND |
| CM System set-up correctly | 7.1 Perform CM Planning | |

Activities Performed by: — Who is responsible for performing this activity? List all process steps (activities) and roles performing activity (if known).

| ID of Role | ID of Activity |
|---|---|
| 1. CCB | 7.2.1 Establish and Approve Baselines |
| 7. Requester | 7.2.2 Submit CR/PR |
| 4. Developers | 7.2.3 Perform Check-In/ Check-Out Procedure |
| 3. CM Lead | 7.2.4 Perform CM Administration |
| 1. CCB | 7.2.5 Perform Conduct CCB Meeting Procedure |
| All Active Roles | 7.2.6 Perform Change Control Procedure |
| 1. CCB | 7.2.7 Approve Release |
| 3. CM Lead | 7.2.8 Perform Release Procedure |

Fig. 49

Process Activity Template: 7.2 Perform Configuration Control, *cont.*

Sub-Processes and Procedures

How is this activity implemented? (Only list procedures and sub-processes)

| ID | Sub-Processes) and/or Procedures |
|---|---|
| 7.2.3 | Perform Check-In/ Check-Out Procedure |
| 7.2.5 | Perform Conduct CCB Meeting Procedure |
| 7.2.6 | Perform Change Control Procedure |
| 7.2.8 | Perform Release Procedure |

Outputs

What work products are produced by this activity?

| Work product name or ID | Destination activity or ID |
|---|---|
| 1. Baselines | 7.2 – 7.4 of CM Process (Default process is 7.2 Perform Configuration Control) |
| 3. CRs | 7.2 – 7.4 of CM Process (Default process is 7.2 Perform Configuration Control) |
| 7. CIs | 7:2 – 7.4 of CM Process (Default process is 7.2 Perform Configuration Control) |
| 10. PRs | 7.2 – 7.4 of CM Process (Default process is 7.2 Perform Configuration Control) |

Exit Criteria

When is this activity completed? What activity is next?

| State or Condition | Process Flow: To Activity | [and] [or] |
|---|---|---|
| Baselines, CI's, CR/PR's are controlled | 7.2 – 7.4 of CM Process (Default process is 7.2 Perform Configuration Control) | AND |
| CCB Meetings Conducted | 7.2 – 7.4 of CM Process (Default process is 7.2 Perform Configuration Control) | AND |
| CM Performed according to CM Procedures | 7.2 – 7.4 of CM Process (Default process is 7.2 Perform Configuration Control) | |

Process Context

Parent ID: 7.0 CM Process
Sibling IDs: 7.2 – 7.4
Children ID's: None
Where is process performed? N/A
Who is Process Owner? CM Lead

Fig. 50

Process Activity Template: 7.3 Perform CSA

Purpose

Why is this activity (i.e., process or sub-process) performed?

Produce CM reports and provide CM status to requesters.

Inputs

What work products are used by this activity?

| Work product name or ID | Source activity name or ID |
|---|---|
| 9. Organizational CM Plan | 2. Organizational Planning Process |
| 12. Project CM Plan | 7.1 Perform CM Planning |
| 4. CM System | 7.1 Perform CM Planning |

Entry Criteria

When can this activity begin?

| State or Condition | Process Flow: From Activity | [and] [or] |
|---|---|---|
| Approved Organizational CM Plan | 2. Organizational Planning Process | AND |
| Approved Project CM Plan | 7.1 Perform CM Planning | AND |
| CM System set-up correctly | 7.1 Perform CM Planning | |

Activities Performed by:

Who is responsible for performing this activity? List all process steps (activities) and roles performing activity (if known).

| ID of Role | ID of Activity |
|---|---|
| 7. Requester | 7.3.1 Request CM Report(s) |
| 1. CCB | 7.3.2 Produce CCB Meeting Minutes |
| 3. CM Lead | 7.3.3 Produce CM Report(s) according to CM Report Standards |
| All Active Roles | 7.3.4 If Applicable, Review CM Report(s) |
| 1. CCB | 7.3.5 Approve and Communicate CM Report(s) |
| 7. Requester | 7.3.6 Confirm CM Report(s) |

Fig. 51

Process Activity Template: 7.3 Perform CSA, *continued*

Sub-Processes and Procedures

How is this activity implemented? (Only list procedures and sub-processes)

| ID | Sub-Processes) and/or Procedures |
|---|---|
| | N/A |
| | |

Outputs

What work products are produced by this activity?

| Work product name or ID | Destination activity or ID |
|---|---|
| CM Reports (2, 3, 5, 6, 7, 8, 10) | 7.2 Perform Configuration Control OR Requesting Process |
| | |

Exit Criteria

When is this activity completed? What activity is next?

| State or Condition | Process Flow: To Activity | [and] [or] |
|---|---|---|
| CM Reports meet CM Standards and are Reviewed, Approved, and Confirmed (If Applicable) | 7.2 Perform Configuration Control OR Requesting Process | |
| | | |

Process Context

Parent ID: 7.0 CM Process
Sibling IDs: 7.2 – 7.4
Children ID's: None
*Where is process performed?* N/A
Who is Process Owner? CM Lead

Fig. 52

Process Activity Template: 7.4 Perform CM Audits

Purpose  Why is this activity (i.e., process or sub-process) performed?

Perform a CM Audit to ensure product integrity.

Inputs  What work products are used by this activity?

| Work product name or ID | Source activity name or ID |
|---|---|
| 1. Baseline | 7.2 Perform Configuration Control |
| 4. CM System | 7.1 Perform CM Planning |
| 9. Organizational CM Plan | 2. Organizational Planning Process |
| 12. Project CM Plan | 7.1 Perform CM Planning |

Entry Criteria  When can this activity begin?

| State or Condition | Process Flow: From Activity | [and] [or] |
|---|---|---|
| Approved Organizational CM Plan | 2. Organizational Planning Process | AND |
| Approved Project CM Plan | 7.1 Perform CM Planning | AND |
| CM System set-up correctly | 7.1 Perform CM Planning | AND |
| Baseline | 7.2 Perform Configuration Control | AND |
| Request for CM Audit | Requesting Process | |

Activities Performed by:  Who is responsible for performing this activity? List all process steps (activities) and roles performing activity (if known).

| ID of Role | ID of Activity |
|---|---|
| 7. Requester | 7.4.1 Request CM Audit |
| 2. CM Auditor | 7.4.2 Conduct CM Audit According to Appropriate CM Audit Checklist |
| 2. CM Auditor | 7.4.3 Produce CM Audit Report According to CM Audit Report Standard |
| All Active Roles | 7.4.4 If Applicable, Review CM Audit Report |
| 2. CM Auditor | 7.4.5 Approve and Communicate CM Audit Report |
| 7. Requester | 7.4.6 Confirm CM Audit Report |

Fig. 53

Process Activity Template: 7.4 Perform CM Audits, *continued*

Sub-Processes and Procedures

How is this activity implemented? (Only list procedures and sub-processes)

| ID | Sub-Processes and/or Procedures |
|---|---|
| 7.4.2 | Conduct CM Audit According to Appropriate CM Audit Checklist |
|  |  |

Outputs

What work products are produced by this activity?

| Work product name or ID | Destination activity or ID |
|---|---|
| CM Reports (2, 3, 5, 6, 7, 8, 10) | 7.2 Perform Configuration Control OR Requesting Process |
|  |  |

Exit Criteria

When is this activity completed? What activity is next?

| State or Condition | Process Flow: To Activity | [and] [or] |
|---|---|---|
| CM Audit Report meets Standard AND Reviewed, Approved, and Confirmed (If Applicable) | 7.2 Perform Configuration Control OR Requesting Process |  |
|  |  |  |

Process Context

Parent ID: 7.0 CM Process
Sibling IDs: 7.2 – 7.4
Children ID's: None
Where is process performed? N/A
Who is Process Owner? CM Auditor

Fig. 54

1.0 PURPOSE
The purpose of the Configuration Management (CM) process is to help organizations, programs, projects, and maintenance projects to achieve product integrity.

2.0 SCOPE
CM is implemented throughout the product life cycle, and CM is implemented for externally deliverable products, designated internal work products, and designated support tools.

3.0 AUDIENCE
The primary audiences for this process are:
- Configuration Control Board (CCB)
- CM Lead
- Developer
- Tester/Quality Assurance The secondary audiences for this process are:
- Engineering Process Group (EPG)
- Project Manager (PM) or Manager
- Requester (e.g., CR/PR)
- Senior Management

4.0 USAGE
The primary uses of this process are:
- Develop Project CM Plan
- Conduct CCB meetings
- Establish baselines
- Manage changes to CI's
- Manage CRs/PRs to baselines
- Perform CM status accounting and produce CM reports
- Conduct CM baseline audits

5.0 ACRONYMS

| | |
|---|---|
| CCB | Configuration Control Board |
| CI | Configuration Item |
| CM | Configuration Management |
| CR | Change Request |
| CSA | Configuration Status Accounting |
| EPG | Engineering Process Group |
| PM | Project Manager |
| PR | Problem Report |
| QA | Quality Assurance |

6.0 REFERENCES

Fig. 55

7.0 BLOCK DIAGRAM OF THE CM PROCESS

Configuration Management Process

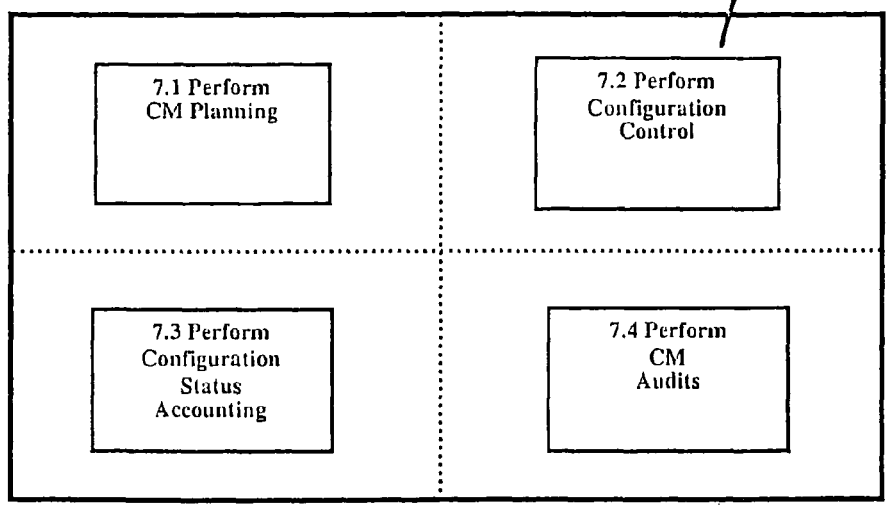

120

This block diagram describes the CM process stages (NOTE: The dashed lines in the block diagram above represent concurrency. For example, Perform Configuration Control, Configuration Status Accounting, and CM Audits could all be happening at one time).

Perform CM Planning (7.1): This process describes how to develop, review, and approve a CM Plan, as well as providing a procedure for establishing a CM system.

Perform Configuration Control (7.2): This process describes controlling changes to baselines and configuration items. The process also contains the procedures for change control, conducting CCB meetings, and release.

Perform Configuration Status Accounting (7.3): This process describes the required reports for configuration identification, configuration control, and configuration audits.

Perform CM Audits (7.4): This process describes how to perform a CM audit for the requirements, code, and product baselines.

General Entry Criteria for CM Process:
- Establish an organizational policy for planning and performing the CM process.
- Provide adequate resources for performing the CM process
- Assign responsibility and authority for performing the CM process.
- Train the people performing or supporting the CM process as needed.
- Relevant stakeholders of the CM process have been identified.

Fig. 56

7.1 Perform CM Planning

| Step # | Process Step |
|---|---|
| 7.1.1 | PM: Assign Project CM Plan to CM Lead<br>• At the appropriate time in the project (typically during project planning), the PM assigns the Project's CM Plan development to the CM Lead.<br>GUIDANCE:<br>A CM Lead should have expereince in setting up CM systems and performing CM. |
| 7.1.2 | CM Lead: Develop Project CM Plan according to CM Plan Standard<br>• The CM Lead can define the CM Plan 2 ways:<br>  • Use the Organizational CM Plan and Project Plan:CM Section (recommended) OR<br>  • Produce a new Project CM Plan based on the CM Plan Standard in Appendix B.<br>GUIDANCE:<br>• Reusing the Organizational CM Plan is recommended.<br>• When new CM tools are used, or a customer CM process is imposed, a separate Project CM Plan may be required. The separate Project CM Plan must follow the CM Plan Standard in Appendix B.<br>• There are example completed Project CM plans on the Organizational Process Asset Website. |
| 7.1.3 | All Roles: Review Project CM Plan<br>• The PM, CM Lead, and QA are required to review the CM Plan.<br>• QA should review the all CM Plans against the CM Plan Standard.<br>GUIDANCE:<br>It is recommended to include the Project Team in the review. |
| 7.1.4 | CM Lead: Perform Establish CM System Procedure<br>• The CM Lead sets up the CM system for the project according to the Establish CM System Procedure in Appendix E.<br>GUIDANCE:<br>This task is performed concurrently with 7.1.5 and 7.1.6. |
| 7.1.5 | QA: Approve Project CM Plan<br>• QA approves the Project's CM Plan and ensures the approved plan is placed on the Project's official website.<br>• The Cm Lead should perform any rework the QA identiifes.<br>• If the Project and QA disagree, follow the escalation procedure in the QA Process.<br>GUIDANCE:<br>QA should ensure the CM Process and CM Plan Standard are followed. |

Fig. 58

7.2 Perform Configuration Control

| Step # | Process Step |
|---|---|
| 7.2.1 | CCB: Establish and Approve Baselines<br>• At the appropriate time, the CCB establishes and approves baselines (e.g., Requirements, Code, and Product Baselines).<br>GUIDANCE:<br>Baselines should not be established too early when there is too much change, or too late when there is little or no benefit of the baseline. Baselines should be established when most CI's become stable. |
| 7.2.2 | Requester: Submit CR/PR<br>• The Requester submits a CR or PR against a CI or Baseline.<br>GUIDANCE:<br>Anyone who has access to the CM tool can be a Requester. |
| 7.2.3 | Developer: Perform Check-In/Check-Out Procedure<br>• The Developer should perform the appropriate Check-In/Check-Out Procedure for the CM tool used each time a CI is checked in or out.<br>GUIDANCE:<br>Please see the Organizational CM Plan appendices for proper Check-in/Check-Out Procedure for the CM version management tool used on your project. |
| 7.2.4 | CM Lead: Perform CM Administration<br>GUIDANCE:<br>The CM Lead performs appropriate CM administration for the project such as back-ups, disaster recovery, cold starts, warm starts, etc. |
| 7.2.5 | CCB: Perform Conduct CCB Meeting Procedure<br>• The CCB performs the Conduct CCB Meeting Procedure in Appendix G.<br>GUIDANCE:<br>CCB should document CCB Meeting Minutes after each meeting. |
| 7.2.6 | All Roles: Perform Change Control Procedure<br>GUIDANCE:<br>• The Perform Change Control Procedure can be tailored to each CM defect tracking tool and to each project.<br>• Although the CM defect tracking tool usually manages change control states, the CCB is primarily responsible for the Perform Change Control Procedure. |
| 7.2.7 | CCB: Approve Release<br>• Only the CCB can authorize and approve release(s).<br>• Releases should be documented (e.g., in CCB Meeting Minutes). |
| 7.2.8 | CM Lead: Perform Release Procedure<br>• Releases must be performed according to the Release Procedure.<br>• Releases must consist only of controlled baselines and CI's.<br>GUIDANCE:<br>• Releases can be performed by other professionals besides the CM Lead.<br>• Please see the Organizational CM Plan appendices for tailored Release Procedures. The project may also tailor the Release Procedure (but it must be approved by QA). |

Fig. 60

7.3 Perform Configuration Status Accounting

| Step # | Process Step |
|---|---|
| 7.3.1 | Requester: Request CM Report(s)<br>• Anyone can request a CM Report (e.g., CCB, CM Auditor, Manager).<br>GUIDANCE:<br>Anyone can be a requester. Generally CM Leads produce CM reports, but other roles can produce CM reports. |
| 7.3.2 | CCB: Produce CCB Meeting Minutes<br>• The CCB is required to produce CCB Meeting Minutes.<br>GUIDANCE:<br>Anyone on the CCB can produce the CCB Meeting Minutes. The minutes should be filed in the appropriate file. |
| 7.3.3 | CM Lead: Produce CM Report(s) according to CM Report Standards<br>• CM Reports must contain the minimum content as required by the appropriate CM Report Standards.<br>• The required reports are:<br>    • Configuration Identification Report for Baselines<br>    • CCB Meeting Minutes<br>    • CM Audit Report<br>• CM Reports are due according to CM Plan. CM Reports are due periodically (e.g., CCB Meeting Minutes), event driven (CM Audit Reports), and ad hoc (management requests).<br>GUIDANCE:<br>Please see the appropriate CM Report Standards in Appendix C. |
| 7.3.4 | All Roles: If Applicable, Review CM Report(s)<br>• If the CM report needs to be reviewed, have the appropriate reviewers (e.g., CCB) review the report for quality and accuracy.<br>GUIDANCE:<br>This step is optional. For important reports (e.g., the Configuration Identification Report), have the report reviewed for quality and accuracy (e.g., by the CM Lead and/or CM Auditor). |
| 7.3.5 | CCB: Approve and Communicate CM Report(s)<br>• If a CM report needs to be approved, the CCB should approve them (e.g., CCB Meeting Minutes).<br>• The CCB should ensure that CM Reports are communicated and made available to relevant stakeholders.<br>GUIDANCE:<br>• CCB should document, review, and approve CCB Meeting Minutes after each meeting.<br>• Distribution can just be communicating the location of reports or information. |
| 7.3.6 | Requester: Confirm CM Report(s)<br>• After requesting a CM Report, the Requester should confirm that the report is received and meets the Requester's needs.<br>GUIDANCE:<br>The Requester should acknowledge that a report meets his or her needs. |

Fig. 62

7.4 Perform CM Audits

| Step # | Process Step |
|---|---|
| 7.4.1 | Requester: Request CM Audit<br>• CM Audits are usually scheduled in the CM Plan around baselines, but can be requested ad hoc by a manager or a CCB.<br>• A Requester can be a CCB, a manager, the CM Lead, or even the CM Auditor.<br>GUIDANCE:<br>CM Audits should be scheduled and performed around major baselines. Recommended baselines are Requirements Baseline (before coding is done); Code Baseline (before testing is done); and Product Baseline (before delivery to customer or before put into operations). |
| 7.4.2 | CM Auditor: Conduct CM Audit According to Appropriate CM Audit Checklist<br>• Conduct the CM Audit (e.g., of the CM Baseline) according to the appropriate CM Audit Checklist in Appendix D.<br>• The CM Auditor must have product knowledge in order to know what versions of what CI's belong in a baseline.<br>GUIDANCE:<br>• The CM Auditor is usually the CM Lead.<br>• CM audits can also be partially automated by using audit reports from a CM version management tool. Simply attach the automated CM Audit report from the tool to the audit checklist. The automated CM audit reports should also be defined in the Organizational CM Plan. |
| 7.4.3 | CM Auditor: Produce CM Audit Report According to CM Audit Report Standard<br>• CM Audit Report must contain the minimum content as required by the CM Audit Report Standard.<br>• The CM Audit Report is required.<br>GUIDANCE:<br>Please see the appropriate CM Report Standards in Appendix C. |
| 7.4.4 | All Roles: If Applicable, Review CM Audit Report<br>• If the audit report needs to be reviewed, have the appropriate reviewers (e.g., CCB) review the audit report for quality and accuracy.<br>GUIDANCE:<br>This step is optional but recommended. |
| 7.4.5 | CM Auditor: Approve and Communicate CM Audit Report<br>• The CM Auditor has the authority in this sub-process. The CM Auditor can also disagree with the CCB.<br>• Communicate CM Audit Report to Relevant Stakeholders.<br>GUIDANCE:<br>If the CM Auditor disagrees with the CCB; then an independent assurance function should be called in to independently facilitate the disagreement. |
| 7.4.6 | Requester: Confirm CM Audit Report<br>• After requesting a CM Report, the Requester should confirm that the report is received and meets the Requester's needs.<br>• If the requester is the CM Lead, and the CM Lead is the CM Auditor, this step is optional.<br>GUIDANCE:<br>The Requester should acknowledge that a report meets or does not meet his or her needs. |

Fig. 64

General Exit Criteria for CM Process:
- The CM plan is documented and maintained for performing the CM process.
- Relevant stakeholders are involved in the CM process as planned.
- Designated work products of the CM process are placed under appropriate levels of CM.
- The CM process is monitored and controlled against the CM plan and corrective action is taken as appropriate.
- The CM process is objectively audited (e.g., process audit) and noncompliance is addressed.
- The CM process (i.e., the activities, status, and results) is reviewed with higher level management and issues are resolved.

8.0 RECORDS RETENTION

| RECORD IDENTIFICATION | OWNER | LOCATION | RECORD MEDIA ELECTRONIC OR HARD COPY | SCHEDULE NUMBER AND ITEM NUMBER | RETENTION / DISPOSITION |
|---|---|---|---|---|---|
| Baselines | | | Electronic | | 3 Years, then archived. |
| CCB Meeting Minutes | | | Electronic | | 3 Years, then archived. |
| Configuration ID Reports | | | Electronic | | 3 Years, then archived. |
| CR/PR Trend Reports | | | Electronic | | 3 Years, then archived. |
| CM Audit Reports | | | Electronic | | 3 Years, then archived. |

9.0 INTERFACES
The process interfaces to CM are:
1. Defects not closed out in inspections or peer reviews are entered as PRs in CM.
2. PRs in CM are inputs to the Casual Analysis & Resolution Process (CAR).
3. The analysis of large CRs can interface with the Project Planning Process (estimating).
4. The Peer Review Process is used to review CM Plans.
5. The QA Audit Process is used to audit the CM Process.

10.0 METRICS
CM has the following metrics:
- Total number of CRs and PRs (together and separately)
- Total number of hours for CM
- Trend Chart of open and closed CRs/PRs over time
- Total number of CM Audits
- Total number of hours per CM Audit

11.0 STANDARDS
- CM Plan Standard (See Appendix B - Based on IEEE Standard for SCM Plans)
- CM Report Standards (See Appendix C)
    - Configuration Identification Report Standard
    - CR/PR Standard
    - CCB Meeting Minute Standard
    - CM Audit Report Standard

12.0 TRAINING
All primary roles must take CM Training.

13.0 MAINTAINING THIS PROCESS
At a minimum, this process will be updated annually by the EPG. The controlled version of the process is available on the Shared Server. By definition, any printed version of this document is uncontrolled.

Fig. 65

Appendix A: CM POLICY

CM Purpose The purpose of Configuration Management (CM) is to establish and maintain the integrity of the products of the project throughout the project's life cycle.

Policy Scope CM is implemented throughout the project's life cycle, and CM is implemented for externally deliverable products, designated internal work products, and designated support tools used inside the project.

CM Policies The table below describes the required CM policies for this organization:

| # | Title | Policy |
|---|---|---|
| 1 | Responsibility | Responsibility for CM for each project is explicitly assigned to the Project Manager, applicable Configuration Control Boards (CCBs), and the CM Lead. |
| 2 | CM Plan | A CM Plan will be produced for each project according to the CM Standard. |
| 3 | CM Repository/ CM System | Projects will establish and maintain a CM repository/CM system for storing and controlling configuration items (CIs) and the associated CM records. |
| 4 | Configuration Identification | Selected work products (i.e., CIs) that will be placed under configuration management are identified as well as the project's configuration identification scheme. |
| 5 | Configuration Control | Every project will have a CCB, baselines will be established, and changes (i.e., change requests and problem reports) to identified work products and baselines will be controlled. |
| 6 | Configuration Status Accounting | Relevant stakeholders will be informed of the status and content of baselines. The required reports are Configuration Identification reports, CCB meeting minutes, and CM audit reports. |
| 7 | Configuration Audits | The baselines and CM activities are audited on a periodic or event driven basis. |
| 8 | Release Procedures | Releases will be created from official baselines for internal use and for delivery to the customer using documented procedures. |

Management Authorization The policy has been approved by senior management.

Fig. 66

Appendix B: CM PLAN STANDARD

| # | Section | Description |
|---|---------|-------------|
| 1 | Introduction | Provide an introduction to the CM Plan. |
| 2 | CM Management and Responsibility | Describe CM roles including management, organizations, the Change Control Board (CCB), and technical CM roles (e.g., CM Lead). Also describe responsibilities of the configuration management organization and CM roles. |
| 3 | Configuration Identification | Identify configuration items (e.g., software documents, code, data, scripts) and their versions to be controlled. Describe the identification scheme for identifying and labeling baselines, configurations items (CIs), change requests (CRs), and problems reports (PRs). |
| 4 | Configuration Control | Describe the required baselines, and how baselines are approved and released. Document procedures designating the levels of control each identified configuration item must pass through; the persons or groups with authority to authorize changes and to make changes at each level; and the steps to be followed to request authorization for changes, process Change Requests, track changes, distribute changes, and maintain past versions. |
| 5 | Configuration Status Accounting | Describe the reports for Configuration Identification, Configuration Control, and Configuration Audits and Reviews. |
| 6 | Configuration Audits and Reviews | Describe the required baseline audits and reviews. Also describe the baseline audit procedure. |
| 7 | Interface Control | Describe how interfaces will be managed under CM. |
| 8 | Subcontractor/ Vendor Control | If applicable, describe how Subcontractors and Vendors will be managed. Also describe what CM requirements will be required in contracts. |
| 9 | CM Schedules | Document the CM project schedule in this section. The CM schedule can be a subset or part of the overall project schedule. |
| 10 | CM Resources | Document all CM resources (e.g., CM management, CCBs, CM Leads, etc). For example, CM can range from 4-10% of a project. |
| 11 | CM Plan Maintenance | Describe how this plan will be maintained and kept up to date. |
| 12 | Tailoring the CM Plan | Describe any tailoring from this standard or from the CM processes and procedures. |
| 13 | Release | The project shall establish and implement procedures for the storage, handling, delivery, release, and maintenance of deliverable software products. |
| 14 | Backups and Disaster Recovery Plan | Describe the backup strategy and disaster recovery plan. Can also point to a separate plan or document. |
| 15 | Appendices | Describe CM Version Management Tools for each hardware configuration (e.g., Mainframe, PC, etc.). Describe the procedures for check-in and check-out. Also describe the Defect Tracking CM Tools for CRs/PRs. |

Fig. 67

Appendix C: CM REPORT STANDARDS (REQUIRED REPORTS)

1. Configuration Identification Report Standard (Can be Automated)

| # | Section | Description |
|---|---|---|
| 1 | Baseline | Version Label or Baseline ID. |
| 2 | CI's | Each baseline must uniquely identify each CI |
| 3 | CI Versions | The CI version/revision used in the baseline must be identified. |

2. Change Request (CR) & Problem Report (PR) Standard (Can be Automated)

| # | Section | Description |
|---|---|---|
| 1 | CR/PR ID | Unique identification of the CR/PR |
| 2 | CR/PR Date | Date CR/PR discovered. |
| 3 | CR/PR Originator | Originator of CR/PR and originator's assessment of priority/severity. |
| 4 | Life Cycle Phase | Life cycle phase in which problem was discovered or in which change was requested. |
| 5 | CR/PR Description | Description of the problem or change to enable problem resolution or justification for the nature of the change, including: assumptions/constraints and change to correct error. |
| 6 | CR/PR Analysis and Modification Description | Description of the corrective action taken to resolve the reported problem or analysis and evaluation of change, including impact to safety, schedules, cost, products, and test. |
| 7 | CI(s) ID | Unique identification of the CI(s) that are being deleted, modified, or added. |
| 8 | Verification Description | Verification of the implementation and release of modified system. |
| 9 | CR/PR State | Status of CR/PR, including approval or disapproval. |

3. CCB Meeting Minutes Standard

| # | Section | Description |
|---|---|---|
| 1 | Meeting Description | Document the meeting why, when, where, who, and what. |
| 2 | Agenda | Document the agenda of the meeting. |
| 3 | Action Items | Document any action items |
| 4 | Issues | Document any issues. |
| 5 | Any PR/CR's | Document the CR's and PR's discussed at the meeting. |
| 6 | Any CI's? | Document if any CI's were approved. |
| 7 | Any Baselines? | Document if there were any baselines approved. |
| 8 | Any Releases? | Document if any releases were approved. |

4. CM Audit Report Standard

| # | Section | Description |
|---|---|---|
| 1 | Baseline Audited | Document which baseline audited. |
| 2 | Audit Checklist | Document which checklist items are satisfied and not satisfied. |
| 3 | Automated Report | If a CM tool provides an automated report or reports, attach them to the Audit Checklist or Report. |

Fig. 68

Appendix D: CM AUDIT CHECKLISTS

1. Requirements Baseline Audit Checklist

| √ | Item | Item Description |
|---|---|---|
|   | 1 | Does a documented software requirements specification (SRS) exist? |
|   | 2 | Does the SRS follow the required standards? |
|   | 3 | Does the SRS completely implement system requirements? |
|   | 4 | Are the software requirements uniquely numbered? |
|   | 5 | Is there a traceability from the system requirements to the software requirements? |
|   | 6 | Do the software requirements specify all interfaces? |
|   | 7 | If applicable, is a software CI hierarchy defined? |
|   | 8 | Is there a version number for each configuration item? |
|   | 9 | Does the Requirements Baseline have a version or revision number? |
|   | 10 | Are the software requirements consistent with the system requirements? |
|   | 11 | Do the user, buyer, and seller agree on the SRS and the interpretation thereof? |
|   | 12 | Has the SRS been reviewed? |
|   | 13 | Are any outstanding issues and observations documented in the audit report? |
|   | 14 | Are any outstanding problems or changes documented as problem reports or change requests? |
|   | 15 | Does the QA function agree that the Requirements baseline is completed? |

2. Code Baseline Audit Checklist

| √ | Item | Item Description |
|---|---|---|
|   | 1 | Does a documented source code listing exist? |
|   | 2 | Does all code compile without any errors? Are warnings documented with rationale? |
|   | 3 | Does the Code Baseline follow the required coding standards? |
|   | 4 | Are the requirements of the SRS completely covered by the Code Baseline? |
|   | 5 | Is there a traceability between the Code Baseline and the SRS? |
|   | 6 | Are the source code and data structures a direct translation of the design of the software CI hierarchy? |
|   | 7 | Are all 'carriers' of the Code Baseline adequately and consistently identified? <u>Definition</u>: A 'carrier' is defined to be tapes, disks, etc. upon which software resides. |
|   | 8 | Is the Code Baseline stable enough to be 'frozen' as SCI's? |
|   | 9 | Is there a version number for each configuration item? |
|   | 10 | Does the Code Baseline have a revision or version number? |
|   | 11 | Are any outstanding issues and observations documented in the audit report? |
|   | 12 | Are any outstanding problems or changes documented as problem reports or change requests? |
|   | 13 | Does the QA function agree that the Code Baseline is completed? |

Fig. 69

Appendix D: CM AUDIT CHECKLISTS, Continued

3. Product Baseline Audit Checklist

| √ | Item | Item Description |
|---|---|---|
|  | 1 | Does a documented source code listing exist and compile without any errors? Are warnings documented with rationale? |
|  | 2 | Does the Product Baseline follow all the required standards? |
|  | 3 | Has the Product Baseline been thoroughly tested? |
|  | 4 | Are the requirements completely implemented by the Product Baseline? |
|  | 5 | Is there traceability from the Product Baseline to the requirements? |
|  | 6 | Are all the CI's in the Product Baseline consistent with one another? |
|  | 7 | Are all CI's identified in the Product Baseline? |
|  | 8 | Is the Product Baseline ready to be frozen and released? |
|  | 9 | Is the Product Baseline reproducible? (Has a "cold start" been performed?) |
|  | 10 | Have backup procedures been followed? |
|  | 11 | Has the release process and standards for placing the Product Baseline on the carrier been followed? |
|  | 12 | Do the user, buyer, and seller agree on the integrity (completeness, quality, etc.) of the Product Baseline? |
|  | 13 | Does the Product Baseline have a revision or version number? |
|  | 14 | Is there a version number for each configuration item? |
|  | 15 | Are any outstanding issues and observations documented in the audit report? |
|  | 16 | Are any outstanding problems or changes documented as problem reports or change requests? |
|  | 17 | Does the QA function agree that the Product Baseline is completed? |

Fig. 70

Appendix E: ETABLISH CM SYSTEM PROCEDURE

| Step # | Description |
|---|---|
| 1 | If not already done, establish, document, and maintain a CM system for controlling baselines, work products, and the development and test environment. |
| 2 | Identify the baselines to be established and document in Project CM Plan. The required baselines are:<br>• Requirements<br>• Code (i.e., what code is to be tested)<br>• Production (e.g., what is delivered to customer or to operations)<br>Baselines must be approved by the CCB and can only be changed by change requests or problem reports. |
| 3 | Identify work products to be put under version control. At a minimum, version control must identify (e.g., in a version history table in the document):<br>• Date changed<br>• Who made the change<br>• What changed<br>• Version/Revision of change<br>The owner of the document must also be identified. |
| 4 | Identify CM tools, define access rights, and create CM directory: Three major functions must be defined:<br>• Version management (e.g., PVCS, Source Safe, ClearCase)<br>• Check-in/Check-out<br>• Change/problem tracking (e.g., PVCS Tracker, TeamTrack, etc.)<br>These three major CM functions can be performed by a combination of software tools and manual procedures. If a CM tool is identified, then describe its functions and the resources required for the tool. This information should be described in the Organizational CM Plan and the Project Plan: CM Section, or in the Project's CM Plan.<br><br>Access Rights: At the initial stage of the Project, the CM Lead sets access rights. In every project, there should be at least two areas, one area with limited access rights to the PM and the Work in Progress (WIP) area with full access rights to the project team.<br><br>CM Directory: Describe the storage location and directory structure for storage of all baselines as they are developed. If the CM directories are spread across different machines and use different tools for configuration control, mention them.<br><br>Document Build Procedure(s) and Release Procedure(s): The build and release procedure(s) should be specified at the project level. These will differ from project to project. |
| 5 | Establish Backup and Disaster Recovery Mechanisms:<br>Backup:<br>• Plan the backup and recovery mechanism, which the project will follow. Make sure that important files and directories of individual project team members come under the default configuration for automatic backup.<br>• If a special backup requirement is needed (which may be event-driven), identify the media, location, frequency, and associated owner for backup and recovery.<br>Disaster Recovery:<br>• Prepare Disaster Recovery Plan (DRP) for your project in the CM Plan. DRP is needed for important customer deliverables for continuous accessibility in case of disaster such as earthquake or fire. This includes backups being stored in a location away from the present location.<br>• For some projects where the product baseline backups are taken care of elsewhere, DRP may not be required, but there should be a backup plan for all work products being produced. |

Fig. 71

Appendix F: CHANGE CONTROL PROCEDURE

Change Control Procedure

The following diagram illustrates the required change control states for change requests (CRs) and problem reports (PRs). CR/PR states may be automated in a CM tool (e.g., defect tracking tool), and the states may be called different names (but must be synonymous with the state definitions below). However, only the CCB may authorize CR/PR state changes.

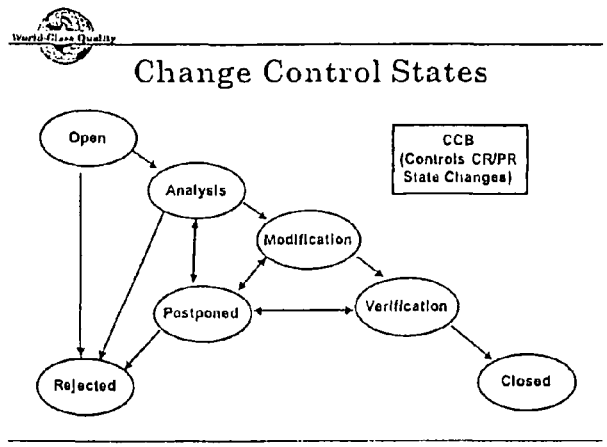

Change Control States

Definitions

The following table provides definitions for change control states:

| State | Definition |
|---|---|
| Open | A new CR/PR enters the change control system. The CCB or designee should assign the CR/PR to be analyzed. |
| Analysis | Analysis or estimating is performed on the CR/PR to determine the cost, effort, and technical impact (e.g., modules affected) of the CR/PR. The CCB determines (sometimes along with customer or sponsor) if the CR/PR can be addressed (e.g., paid for) in this release or postponed to a future release. |
| Modification | The CR/PR is implemented. When completed, the CR/PR is tagged for Verification. |
| Verification | The CR/PR is tested or verified (best if someone independent of the person performing Modification performs Verification). Verification should not only verify the CR/PR, but all interfaces and interdependencies (e.g., timing). |
| Closed | The CCB should ensure and authorize that the CR/PR was fully Implemented and Verified before closing the CR/PR. |
| Postponed | Postponed CR/PR's are not implemented in the current release, but postponed to a future release. |
| Rejected | A rejected CR/PR can be for many reasons: a PR is not a defect; a CR can be too expensive to implement; a CR/PR may be a duplicate; etc. |

Fig. 72

Appendix G: CONDUCT CCB MEETING PROCEDURE

Conduct CCB Meeting Procedure  The following procedure provides requirements for a Configuration Control Board (CCB) meeting. This procedure is intended to performed in order of the agenda.

| Agenda Item | Procedure Step |
|---|---|
| 1 | Review and agree to the Agenda. |
| 2 | Review the meeting minutes from the last CCB meeting. |
| 3 | Review open change requests and problem reports. |
| 4 | Review applicable CM status accounting reports. Also make requests for needed CM Reports. |
| 5 | Do any configuration items or baselines need to be approved? |
| 6 | Are there any releases to be approved? (Use Release Procedure) |
| 7 | Document action items, decisions/agreements, and issues in the CCB Meeting Minutes. |
| 8 | Schedule next CCB meeting. |

Fig. 73

Appendix H: RELEASE PROCEDURE

Procedure   The following checklist provides requirements before performing a release.
Each project should tailor this checklist to its specific project needs.

| √ | Checklist Item | Description |
|---|---|---|
|  | 1 | Has the release passed formal testing (e.g., all regression testing)? Is the release sable? |
|  | 2 | Has a Product Baseline Audit been performed? |
|  | 3 | Are there any open CR/PR's that need to be dispositioned by the CCB? |
|  | 4 | Are all CI's identified in the Product Baseline (i.e., Configuration Identification Report)? Has the release been properly labeled and identified? |
|  | 5 | Are all the CRs/PRs listed for this release? |
|  | 6 | What is the delivery media for the release? |
|  | 7 | Is there a backup of the release? |
|  | 8 | Can the release be reproduced from scratch (i.e., cold-start)? |
|  | 9 | What does the PR Trend report look like? What is the probability there are major defects left in the Release? |
|  | 10 | Has the CCB approved the release? |
|  | 11 | Has all the accompanying documentation been completed (e.g., requirements, design, test, user guides, release notes, etc.)? |
|  | 12 | Have all of the delivery customers and locations been identified? |
|  | 13 | Are there any open audit observations/nonconformance? |
|  | 14 | Is the release ready to be supported? |

Fig. 74

SYSTEMS AND METHODS FOR PROVIDING DOCUMENTATION HAVING SUCCINCT COMMUNICATION WITH SCALABILITY

BACKGROUND OF THE INVENTION

1. Field of the Invention

The present invention relates to providing documentation having succinct communication with scalability. In particular, the present invention relates to systems and methods for defining and documenting processes, procedures, standards and policies that are succinct and usable, and that are scalable to the complexity of the process and to abilities of the individual user.

2. Background and Related Art

While a variety of techniques are currently used to document processes, a variety of challenges exist. For example, process documentations are typically too large and bulky, and as a result are difficult to use. Processes and procedures can violate documentation design and writing principles, and are not designed with customers and users in mind. Process documentation typically mixes different types of information into the same paragraphs as if they were all used the same way. Current techniques make it difficult for users to find information quickly, and can cause frustration and prevent procedures from being followed.

Thus, while techniques are currently available to document processes, challenges still exist with such techniques. Accordingly, it would be an improvement in the art to augment or even replace current techniques with other techniques.

SUMMARY OF THE INVENTION

The present invention relates to providing documentation having succinct communication with scalability. In particular, the present invention relates to systems and methods for defining and documenting processes, procedures, standards and policies that are succinct and usable, and that are scalable to the complexity of the process and to abilities of the individual user.

At least some implementations of the present invention take place in association with generating a lean or otherwise succinct and usable process comprising identifying steps of a particular process and a relationship of one or more of the steps; providing non-verbal communication of the steps and the relationship as a lean process, wherein the lean process enhances and increases communication and minimizes documentation for providing the non-verbal communication, and wherein the non-verbal communication comprises a representation of key process elements for the particular process, wherein the key process elements comprise one or more inputs, outputs, activities, process context, entry criteria, exit criteria, purposes, process flow, and roles, and wherein the representation is on a single page if a receiver of the non-verbal communication is an expert audience; if a receiver of the non-verbal communication is an intermediate audience, the non-verbal communication further comprises a process description table having the identified process steps that correspond to the representation of key process elements, wherein the process description table provides guidance and lessons learned relating to the particular process; and if a receiver of the non-verbal communication is a beginner audience, the non-verbal communication further comprises the process description table and training relating to the particular process.

Those skilled in the art will appreciate that while some embodiments include nine process elements, other embodiments include less than nine or more than nine.

While the methods and processes of the present invention have proven to be particularly useful in the area of succinct and usable processes that have scalability, those skilled in the art will appreciate that the methods and processes can further be used in association with procedures, standards and policies.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 10 illustrates a representative process work product, activities and rules ("WAR") template for a representative decision process;

FIGS. 11-12 illustrate a representative process activity template for the chunked activity 6.1 entitled "Prepare for Decision" of FIG. 10;

FIGS. 13-14 illustrate a representative process activity template for the chunked activity 6.2 entitled "Conduct Decision Meeting" of FIG. 10;

FIGS. 15-16 illustrate a representative process activity template for the chunked activity 6.3 entitled "Perform Decision Follow-Up" of FIG. 10;

FIGS. 17-34 illustrate a representative decision process guide, wherein FIGS. 18-24 illustrate chunked activities of the decision process in a representative ETMX process model format and FIGS. 25-30 illustrate chunked activities of the decision process in a swim lane process model format;

FIG. 35 illustrates a representative process documentation design procedure in accordance with a representative embodiment of the present invention;

FIG. 36 illustrates a representative process modeling and documentation procedure in accordance with a representative embodiment of the present invention;

FIG. 37 illustrates a representative procedure for developing a procedure in accordance with a representative embodiment of the present invention;

FIG. 38 illustrates a representative form template;

FIG. 39 illustrates a representative checklist template;

FIG. 40 illustrates a representative ordered table template;

FIG. 41 illustrates a representative procedure for developing a standard in accordance with a representative embodiment of the present invention;

FIG. 42 illustrates a representative procedure for developing a policy in accordance with a representative embodiment of the present invention;

FIG. 43 illustrates a representative procedure for developing a process guide in accordance with a representative embodiment of the present invention;

FIG. 44 illustrates a representative process guide standard in accordance with a representative embodiment of the present invention;

FIGS. 45-46 illustrate a representative process work product, activities and rules ("WAR") template for a representative configuration management ("CM") process;

FIGS. 47-48 illustrate a representative process activity template for the chunked activity 7.1 entitled "Perform CM Planning" of FIG. 45;

FIGS. 49-50 illustrate a representative process activity template for the chunked activity 7.2 entitled "Perform Configuration Control" of FIG. 45;

FIGS. 51-52 illustrate a representative process activity template for the chunked activity 7.3 entitled "Perform CSA" of FIG. 45;

FIGS. 53-54 illustrate a representative process activity template for the chunked activity 7.4 entitled "Perform CM Audits" of FIG. 45; and FIGS. 55-74 illustrate a representative CM process guide.

DETAILED DESCRIPTION OF THE INVENTION

Figure 1:
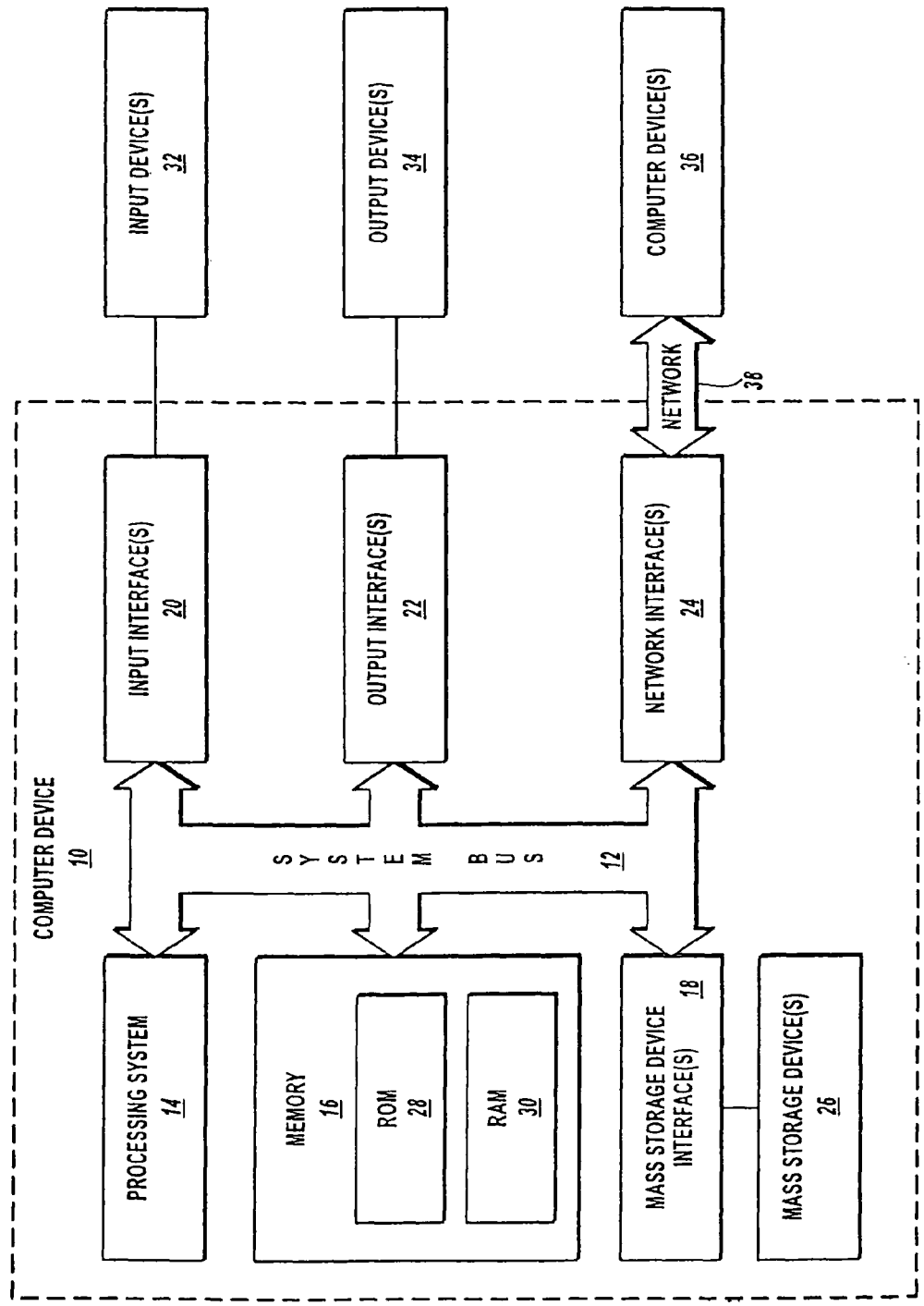
FIG. 1 illustrates a representative system that provides a suitable operating environment for use of the present invention.

The present invention relates to providing documentation having succinct communication with scalability. In particular, the present invention relates to systems and methods for defining and documenting processes, procedures, standards and policies that are succinct and usable, and that are scalable to the complexity of the process and to abilities of the individual user.

In the disclosure and in the claims the term "activity" shall refer to a process building block and a process element that addresses the "what". An activity is an action or task that is taken to use or consume work products (e.g., inputs), to add value, and to produce work products (e.g., outputs) and services. An activity is any action, and can be as broad as organizational functions (e.g., accounting, legal, etc.), processes (e.g., configuration management, project planning, reviews, etc.), procedures (e.g., a checklist), or as specific as particular steps (e.g., sign your name and approve a document).

In the disclosure and in the claims the phrase "activity performed by" shall refer to a relationship between an activity and a role, and is a role or roles performing or participating in an activity or activities.

In the disclosure and in the claims the term "beginner mode" shall refer to a process documentation that is defined for a beginner user or audience. Beginners are individual users who are not familiar with a particular process.

In the disclosure and in the claims the term "entry criteria" shall refer to a process element that addresses the "when". Entry criteria define the conditions under which an activity can be started, and are preconditions about the state of a work product, role, and/or activity.

In the disclosure and in the claims the term "exit criteria" shall refer to a process element that addresses the "when". Exit criteria define the conditions under which an activity can be declared complete, and determine the next activity. The exit criteria are post conditions about the state of a work product, role, and/or an activity.

In the disclosure and in the claims the term "expert mode" shall refer to process documentation that is defined for an expert audience or user. Experts are individuals or users who are intimately familiar with a particular process.

In the disclosure and in the claims the term "input" shall refer a process element that addresses the "what". The input represents a relationship between an activity and a work product. Inputs are results of one or more prior activities, and are used or consumed by the activity being defined.

In the disclosure and in the claims the term "intermediate mode" shall refer to process documentation that is defined for an intermediate audience or user. Intermediates are individuals or users who are somewhat familiar with a particular process, but are not experts in that process.

In the disclosure and in the claims the term "lean" shall refer to being concise/succinct and usable.

In the disclosure and in the claims the term "output" shall refer to a process element that addresses the "what". The output represents a relationship between an activity and a work product. Outputs are the results that are produced or used by the activity being described.

In the disclosure and in the claims the term "policy" shall refer to a process document based upon principles that guide and constrain an organization.

In the disclosure and in the claims the term "procedure" shall refer to a process document that is a set of activities that describe the "how to". There are three types of procedures, namely (i) a checklist, (ii) a form, and (iii) an ordered table. A procedure provides step-by-step instructions or "how-to" information.

In the disclosure and in the claims the term "process" shall refer to an activity that is modeled by answering who, what, when, where and why (the five "W's"). Moreover, a process is a set of parallel or sequential activities that use and transform inputs, add value, and produce outputs and results that are directed towards achieving a purpose and a set of objectives.

In the disclosure and in the claims the term "process context" shall refer to answering "where", and is usually represented by a block diagram or picture with the current process highlighted (e.g., "you are here diagram"). Process context is based on process identification along with sibling processes, as well as parent and children activities as appropriate, as well as any other contextual information (e.g., process owner). In at least some embodiments, if an activity must be performed in a specific location, that information is documented.

In the disclosure and in the claims the term "process building block" shall refer to one or more of the three process building blocks, namely activities, work products, and roles (collectively "WAR").

In the disclosure and in the claims the term "process documentation" shall refer to polices, standards, processes and procedures.

In the disclosure and in the claims the term "process element" shall refer to a component of a process that answers who, what, when, where or why (the five "W's"). The nine process elements are purpose (why), activities (what), inputs (what), outputs (what), entry criteria (when), exit criteria (when), roles (who), process context (where), and process flow (where).

In the disclosure and in the claims the term "process flow" shall refer to answering the "where". Process flow is a conditional relationship between activities, work products, and roles. Flow defines the control and ordering of activities, timing of activities, and determines "where" inputs and outputs flow (e.g., the next process). Flow is represented in process models, block diagrams, or pictures, and controlled by entry and exit criteria. Control flow focuses on the entry and exit criteria control the states of work products, roles, and activities, and also determine the next process. Data flow relates to inputs and outputs (the data), and the flow of data among processes and is controlled by entry and exit criteria. Timing flow relates to when activities happen (e.g., daily, monthly, annually, etc.) and is also controlled by entry and exit criteria.

In the disclosure and in the claims the term "process model" shall refer to an abstraction of a process typically characterized by formal notations for representing roles, activities, and/or work products, and the relationships (e.g., events, transformations) among them. Types of process models include: descriptive models (as-is), which describe what is actually done or practiced; prescriptive models (to-be), which prescribes what to do (e.g., by new policies, standards, process guidelines, etc); and mixed models (both as-is and to-be), which are a combination of prescriptive and descriptive processes. A large number of process models are a mixture of prescriptive and descriptive processes.

In the disclosure and in the claims the term "purpose" shall refer to a process element that describes the rationale for an activity or process (i.e., the "why").

In the disclosure and in the claims the term "role" shall refer to a process building block and a process element that can be manual or automated, and roles perform the activities in a process (i.e., the "who").

In the disclosure and in the claims the term "sub-process" shall refer to a process that is modeled by answering who, what, when, where and why (the five "W's"). One or more sub-processes make up a process. Sub-processes are also referred to as "chunks", and can be made up of one or more sub-processes.

In the disclosure and in the claims the term "template" shall refer to a process document that comprises sections or parts. An "annotated template" is a standard (see also the definition of standard).

In the disclosure and in the claims the term "standard" shall refer to a process document that comprises sections or parts, and descriptions of those parts or descriptions of what goes into those sections. Standards usually describe what goes into a work product, but there can also be standards for policies, processes, and procedures. A list of just sections or parts is not a standard, but is a template. An "annotated template" is a standard because it also comprises sections or parts, and descriptions of those parts or descriptions of what goes into those sections.

In the disclosure and in the claims the term "work product" shall refer to a process building block that consist of any draft or final product (i.e., inputs and outputs) or service used or produced by a process or activity (i.e., the "what").

The following disclosure of the present invention is grouped into two subheadings, namely "Exemplary Operating Environment" and "Providing Documentation Having Succinct Communication with Scalability." The utilization of the subheadings is for convenience of the reader only and is not to be construed as limiting in any sense.

Exemplary Operating Environment

While some embodiments of the present invention embrace the utilization of no computer device, other embodiments embrace the utilization of one or more computer devices in providing documentation (as a hardcopy and/or as an electronic copy) having succinct communication with scalability. Accordingly, FIG. 1 and the corresponding discussion are intended to provide a general description of a suitable operating environment in which some embodiments of the present invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component (e.g., DVD) that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
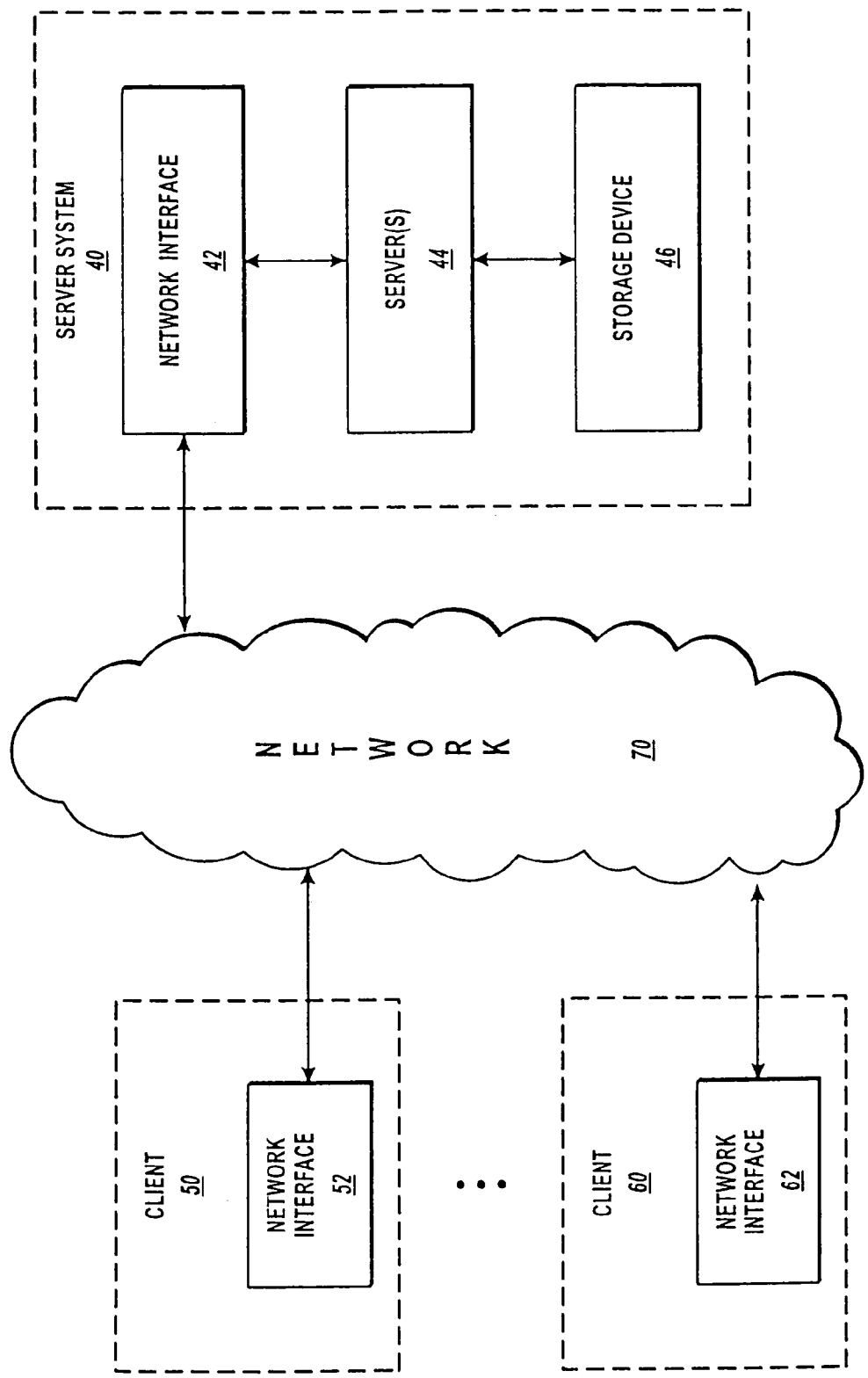
FIG. 2 illustrates a representative networked configuration.

While those skilled in the art will appreciate that the invention may be practiced in a variety of environments, including computing environments having any of a variety of computer system configurations, including networked environments, FIG. 2 represents an embodiment of the present invention in a networked environment that includes a variety of clients connected to a server system via a network. While FIG. 2 illustrates an embodiment that includes multiple clients connected to the network, alternative embodiments include one client connected to a network, one server connected to a network, or a multitude of clients throughout the world-connected to a network, where the network is a wide area network, such as the Internet. Moreover, embodiments of the present invention embrace non-networked environments, such as where at least a portion of defining and documenting processes, procedures, standards and policies is generated utilizing a single computer device. At least some embodiments of the present invention further embrace defining and documenting processes, procedures, standards and policies that are succinct, usable and scalable, wherein at least a portion does not require a computer device.

In FIG. 2, a representative networked configuration is provided for defining and documenting processes, procedures, standards and policies. Server system 40 represents a system configuration that includes one or more servers. Server system 40 includes a network interface 42, one or more servers 44, and a storage device 46. A plurality of clients, illustrated as clients 50 and 60, communicate with server system 40 via network 70, which may include a wireless network, a local area network, and/or a wide area network. Network interfaces 52 and 62 are communication mechanisms that respectfully allow clients 50 and 60 to communicate with server system 40 via network 70. For example, network interfaces 52 and 62 may be a web browser or other network interface. A browser allows for a uniform resource locator ("URL") or an electronic link to be used to access a web page sponsored by a server 44. Therefore, clients 50 and 60 may independently access or exchange information with server system 40.

As provided above, server system 40 includes network interface 42, servers 44, and storage device 46. Network interface 42 is a communication mechanism that allows server system 40 to communicate with one or more clients via network 70. Servers 44 include one or more servers for processing and/or preserving information. Storage device 46 includes one or more storage devices for preserving information, such as a particular record of data. Storage device 46 may be internal or external to servers 44.

In the illustrated embodiment of FIG. 2, the networked system is used to define and document processes, procedures, standards and/or policies. In particular, processes and procedures are defined and communicated in such a way that is more succinct and usable to document, measure and improve business, as will be further discussed below. Those skilled in the art will appreciate that the networked system of FIG. 2 is a representative system in accordance with the present invention. Accordingly, embodiments of the present invention embrace other computer system configurations for performing methods disclosed herein.

Providing Documentation Having Succinct Communication with Scalability

As provided herein, embodiments of the present invention relate to providing documentation having succinct communication with scalability. In particular, embodiments of the present invention relate to systems and methods for defining and documenting processes, procedures, standards and policies that are succinct and usable, and that are scalable to the complexity of the process and to abilities of the individual user.

Organizations have the need to define their processes and procedures in order to document, measure, and improve how they do business. A common example of this process documentation relates to organizations that are ISO certified (e.g., a Quality Manual). A lean process is a business method or technique that allows processes and procedures to be defined in, for example, 25-50% of their usual size. A lean process helps organizations define processes and procedures that are shorter and more usable.

A lean process addresses the common problems with process documentation and is based on such principles as process documentation types (i.e., policies, standards, processes, and procedures), process documentation usage modes (e.g., Expert Mode), lean policies (one page policies per process area), lean standards (one page standards), lean processes (e.g., addressing the 5 W's of who, what, when, where and why in a diagram on one page per process or sub-process), lean procedures (e.g., addresses the "how" in a checklist, form, or ordered table on one page), and lean documentation (one page) that can be used on websites.

Figure 3:
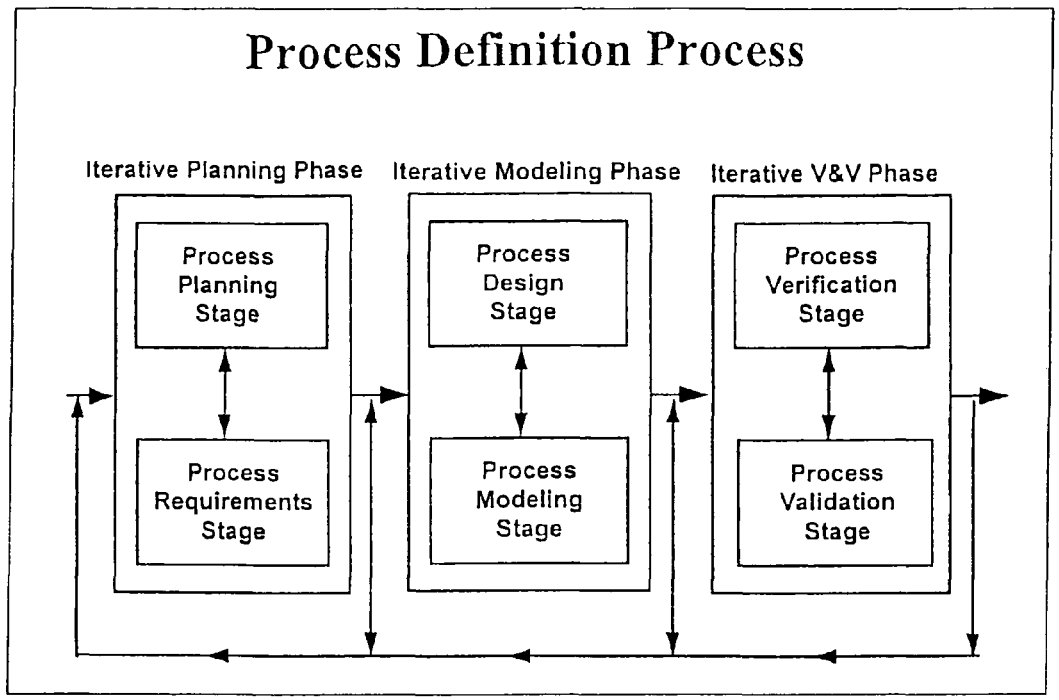
FIG. 3 illustrates a representative process definition process in accordance with an embodiment of the present invention.

With reference now to FIG. 3, a representative block diagram is illustrated to provide a representative embodiment for generating a lean process. In FIG. 3, there exists an iterative planning phase, an iterative modeling phase, and an iterative verification and validation ("V&V") phase. The iterative planning phase includes a process planning stage and a process requirements stage. The process planning stage comprises the following sub-processes: (i) product plan, which comprises the purpose, scope, audience, and usage; and (ii) work plan, which comprises the charter, schedule, and resources. The process requirements stage comprises identifying the following four types of requirements: (i) organizational requirements; (ii) industry model requirements (e.g., ISO, Baldrige, CMMI, etc.); (iii) representation requirements; and/or (iv) other requirements.

The iterative modeling phase comprises a process design stage and a process modeling stage. The process design stage comprises (i) documenting design decisions (e.g., selecting a process model representation), (ii) documenting the initial process model, (iii) identifying activities, work products, and roles for each process and sub-process, (iv) grouping the activities into "chunks" or sub-processes with no more than ten activities (i.e., the seven plus or minus two rule), and optionally (v) completing the process activity templates for each process and sub-process. The process implementation stage comprises (i) modeling the process using the selected process modeling approach; (ii) modeling who, what, when, where and why (the five W's) on a single page for each process or sub-process (e.g., for expert mode); (iii) iterating for each level of the process model (can iterate the process definition phase or the entire lean process); (iv) developing process description tables (e.g., for intermediate mode), wherein the goal is one page for each process model; (v) developing the procedure(s) on a single page in expert mode; (vi) developing the policies on one page in expert mode; (vii) developing the standards on a single page in expert mode; and (viii) developing the process guide to put all of the pieces together.

The iterative verification and validation phase includes a process verification stage and a process validation stage. The process verification stage comprises (i) verifying the process against the planning, requirements, and design; (ii) verifying the correctness, consistency, and completeness (the three Cs); and (iii) removing defects from the process. The Process Validation Stage comprises (i) validating the process with the process experts and users (e.g., using a walkthrough); and (ii) Pilot testing the process (this can also be a separate process).

One way to address common problems with process documentation is to recognize that not all documentation is used the same way. Process documentation refers to policies, standards, processes and procedures. By way of example, policies are typically used by senior management to set direction in an organization, state principles that organizations should follow, and provide requirements for processes, procedures, and training. Standards, on the other hand, typically specify the parts of a document, provide a description of what is to be included, make the content of documents repeatable, and provide requirements for processes, procedures, and training. Processes refer to what happens over time to produce a desired result, add value, answer the five W's of who, what, where, when, and why, and are supported by procedures, training, and tools. Procedures provide step-by-step information that implements at least part of a process. Training is used by beginners and taught by instructors (e.g., experts), and provides the necessary knowledge and skills. Training can be voluminous.

Processes and procedures have different levels of users. Some users have never used the process (e.g., beginner users). Some users have used the process a few times, but need guidance and lessons learned (e.g., intermediate users). Some users have used the process many times and may even be responsible for running the process (e.g., experts). The following describes the three levels of documentation: expert, intermediate, and beginner.

"Expert Mode" documentation is short and concise. When a pilot flies an airplane, he or she does not pull out training manuals. Instead, pilots use expert checklists for take off and landing. Expert mode documentation is made for experts and it does not contain any training material. An advantage of expert mode documentation is that it is short, however not everybody is an expert. Thus, for example, not everyone can read a checklist for a rocket scientist (i.e., sometimes you really need to be an rocket scientist). Experts can utilize documentation because people can forget things. This is why checklists are so powerful. Experts can also leave your organization, taking precious organizational knowledge with them. This is why expert knowledge should be documented.

"Intermediate Mode" documentation uses the expert mode documentation, but builds and adds to it by providing guidance and lessons learned. For example, guidance is very useful to people that don't have to follow a process or procedure very often. Even experts forget guidance and lessons learned for an annual process or an infrequently used process. Having guidance available to those who want it is very useful.

Typically guidance and lessons learned are not "auditable". Process phases and procedure steps are required and auditable, but the supporting guidance and lessons learned are there for support only. One best practice is to distinguish between required steps and optional guidance. "Beginner Mode" documentation uses the intermediate mode documentation, but adds training to it. Beginners should feel free to use the training manuals until they become familiar with the process. Beginners should also be mentored as appropriate. Processes can vary from simple to complex. Complex processes should have formal training and be followed up by mentoring.

A process should address who, what, when, where and why, answer key process questions, include both pictures and words, be short, usable, chunked, labeled, and well written. A lean process addresses the five W's (who, what, when, where and why) in a diagram or process model on a single page (Expert Mode), is chunked (e.g., having 10 or less activities), and fits on one page in a process description table (Intermediate Mode).

The following provides a representative relationship between the five W's, key process questions to be answered by a process, and process elements identified by a process.

| 5 W's & How | Key Process Question | Process Element |
|---|---|---|
| Why? | Why is the process performed? | 1. Purpose |
| Who? | Who performs the process? | 2. Role(s) |
| When? | When does the process begin? | 3. Entry Criteria |
|  | When does the process end? | 4. Exit Criteria |
| Where? | Where am I in the process? | 5. Process Context (Optional: Physical Location) |
|  |  | 6. Process Flow |
| What? | What work products are used? | 7. Inputs |
|  | What work products are produced? | 8. Outputs |
|  | What happens to produce results? | 9. Activities |
| How? | How is the process implemented? | Procedures |

A lean procedure includes "how to, step-by-step" information that may come in three forms: checklists, forms, and/or ordered tables, and is a single page long. Checklists are very powerful, repeatable representations of activities that need to be completed in order to declare a something completed. What makes checklists so powerful is that it usually doesn't matter what order the checklist is completed. This is why checklists are very useful for concurrent activities (e.g., versus flowcharts which are very poor at representing concurrency). Good checklists are kept to 1 page long.

Forms, along with instructions for completing the forms, are repeatable mechanisms for supporting processes. Forms are powerful mechanisms for collecting data in a repeatable way. If possible, keep forms to one page long (Form instructions may be on the back of a page (e.g., hardcopy), or by clicking for more information (e.g., online)).

One effective way to represent a procedure is using an ordered procedure table. Ordered procedure tables are very useful when sequence or order matters. For example, if a person needs to track his or her time, starting to track time should not be the last step. The following is an example of an ordered procedure table:

| Step | Action |
|---|---|
| 1 | Begin to track time (e.g., write down the start time). |
| 2 | Look for defects in the selected work product by using the appropriate data driven checklist. |
| 3 | Log the defects of the Defect Form. Continue logging defects until the work product is completely inspected using the checklist. |
| 4 | End tracking time (e.g., write down the end time). Calculate the total time spent looking for and logging defects, and record the total time on the Defect Form. |

Process modeling processes in accordance with embodiments of the present invention can generate processes that are clear, concise, precise, model-based, and repeatable. FIG. 3 provides a representative process definition process. The following provides a discussion relating to each of the process stages.

Figure 4:
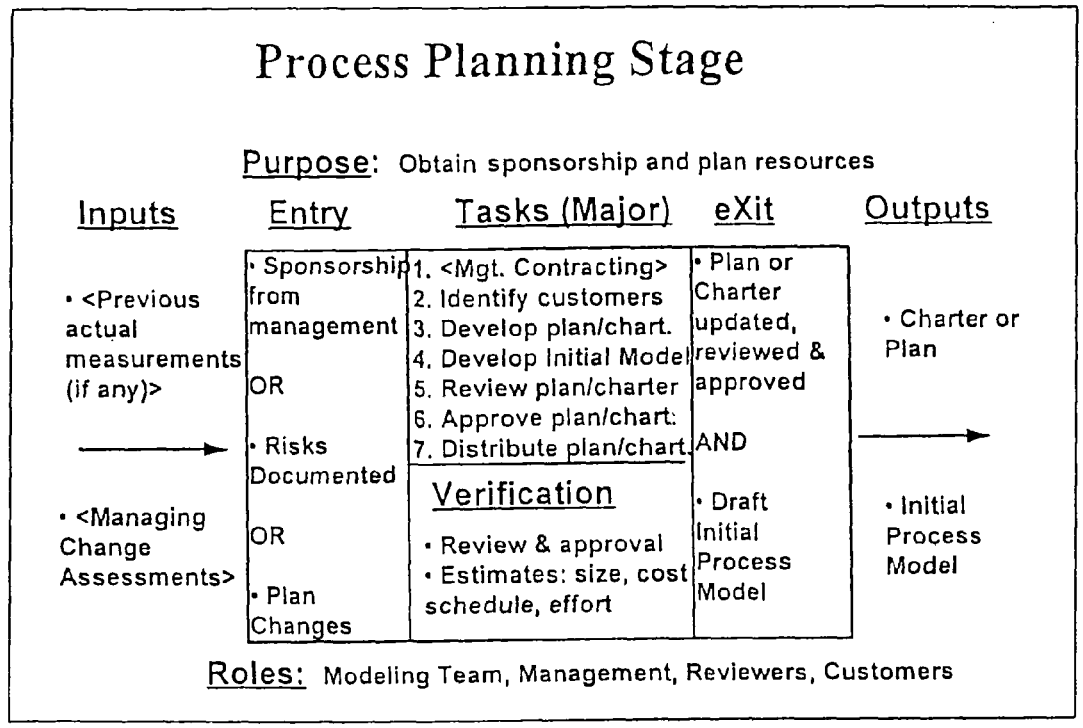
FIG. 4 illustrates a representative process model corresponding to the process definition process of FIG. 3, wherein the illustrated process model is a process planning stage.

With reference now to FIG. 4, a representative embodiment is provided relating to the process planning stage of FIG. 3. The purpose of the process planning stage is to ensure process satisfies the customer's needs, to establish criteria to verify and validate process, and to obtain sponsorship and plan resources.

Benefits of process planning are that (i) the customers/users of the process are identified, (ii) the scope and boundaries of the process are defined, (iii) how the customers/users will use the process is understood, (iv) there is buy-in and consensus on the process, (v) the process assumptions are documented and can be communicated to others, (vi) The process modeling team understands what process they are developing, (vii) the resources are planned so the lean process has a better chance to be on schedule and on budget.

Measurable objectives for process planning includes that (i) process purpose, scope, customers, and usage are documented and understood, (ii) there is consensus on purpose, scope, customers, and usage for the process, (iii) the purpose, scope, customers, and usage assumptions are used to guide process development, and (iv) there is a process plan or charter that documents i-iii, and documents the necessary resources (i.e., time and money).

Figure 5:
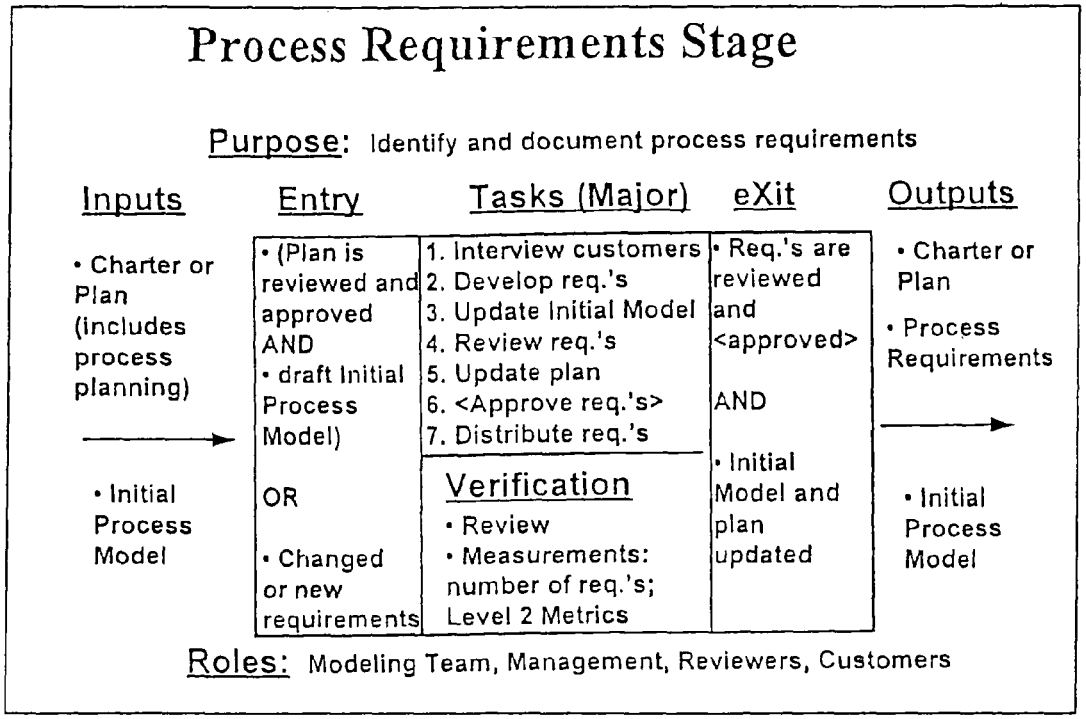
FIG. 5 illustrates a representative process model corresponding to the process definition process of FIG. 3, wherein the illustrated process model is a process requirements stage.

With reference now to FIG. 5, a representative embodiment is provided relating to the process requirement stage of FIG. 3. The purpose of the process requirements stage is to identify and document process requirements (e.g., SEI CMMI, ISO, organizational, etc.) The benefits of process requirements are that (i) documenting process requirements helps ensure that they are implemented and (ii) process requirements (e.g., ISO. CMMI, other industry process standards) can also be documented and met.

Measurable objectives of process requirements include (i) Organizational requirements, (ii) industry process requirements, (iii) process representation requirements, and (iv) other process requirements are documented and reviewed.

Figure 6:
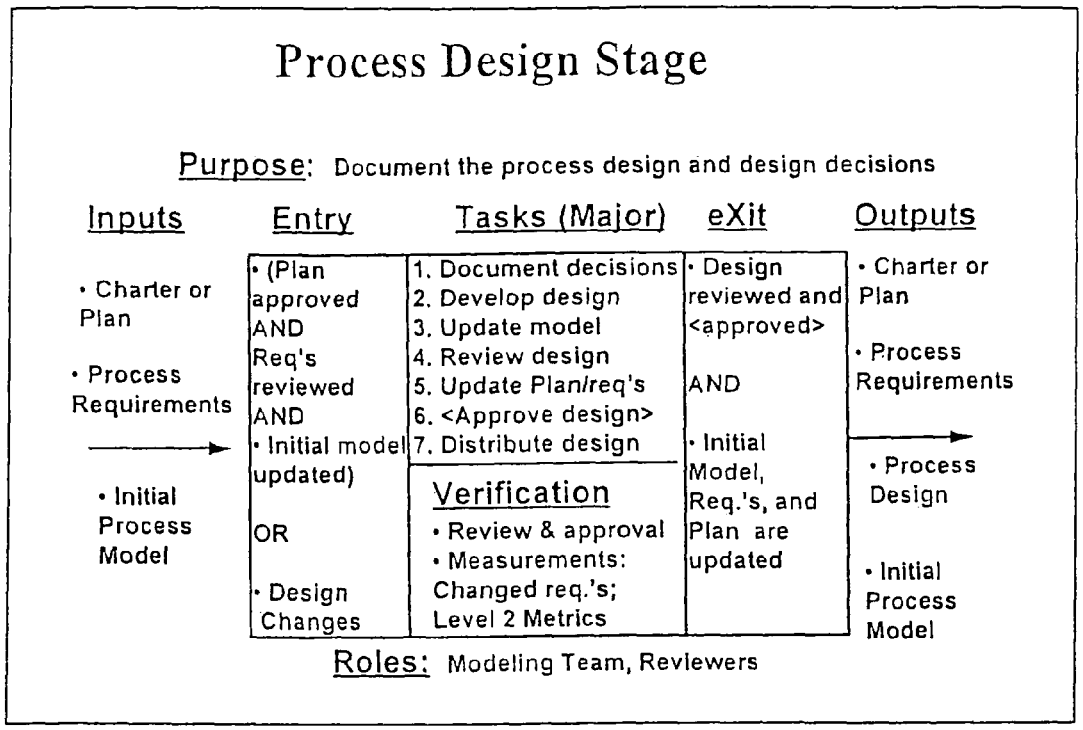
FIG. 6 illustrates a representative process model corresponding to the process definition process of FIG. 3, wherein the illustrated process model is a process design stage.

With reference now to FIG. 6, a representative embodiment is provided relating to the process design stage of FIG. 3. The purpose of the process design stage is to document the process design and design decisions. Through process design, one may acquire the necessary process knowledge, answer the "how to" design questions (e.g., process representation, process tools, etc), document process design and key decisions, use initial model as a "frame of reference" for any process interviews (e.g., descriptive models), and translate organizational process documentation, interview data, leading-edge process documentation, etc., into the process templates and update initial process model.

Benefits of process design include that it (i) increases understanding of the process (both prescriptive and descriptive), (ii) documents the design (e.g., process templates), critical design decisions, and why they were made, (iii) establishes a common "frame of reference" for communication, (iv) helps identify organizations, process experts, and users of the process, and (v) identify defects, missing information, or inconsistent information.

Measurable objectives of the process design stage include that (i) all relevant process documentation has been identified and reviewed, (ii) that the process design and critical design decisions have been documented (e.g., process templates), (iii) that the process templates have been completed, (iv) that the initial process model has been updated (e.g., 3-10 activities, inputs, outputs, roles, etc., have been identified), and (v) that the initial process model defines the scope and perspective of the process.

In at least some embodiments, a successful process design includes listing all the process building blocks of work products, activities, and roles (i.e., Process WAR templates). For a given process, these WAR process templates are then "chunked" (i.e., 7 plus or minus 2). Activities are the most complex building block on the Process WAR Template, and are chunked into sub-processes. Reference is made to FIG. 10, which illustrates a representative Process War Template for Configuration Management (CM). Please note the activity "chunks" (7.1, 7.2, 7.3, 7.4). Each chunk is a sub-process of the CM Process example.

Figure 7:
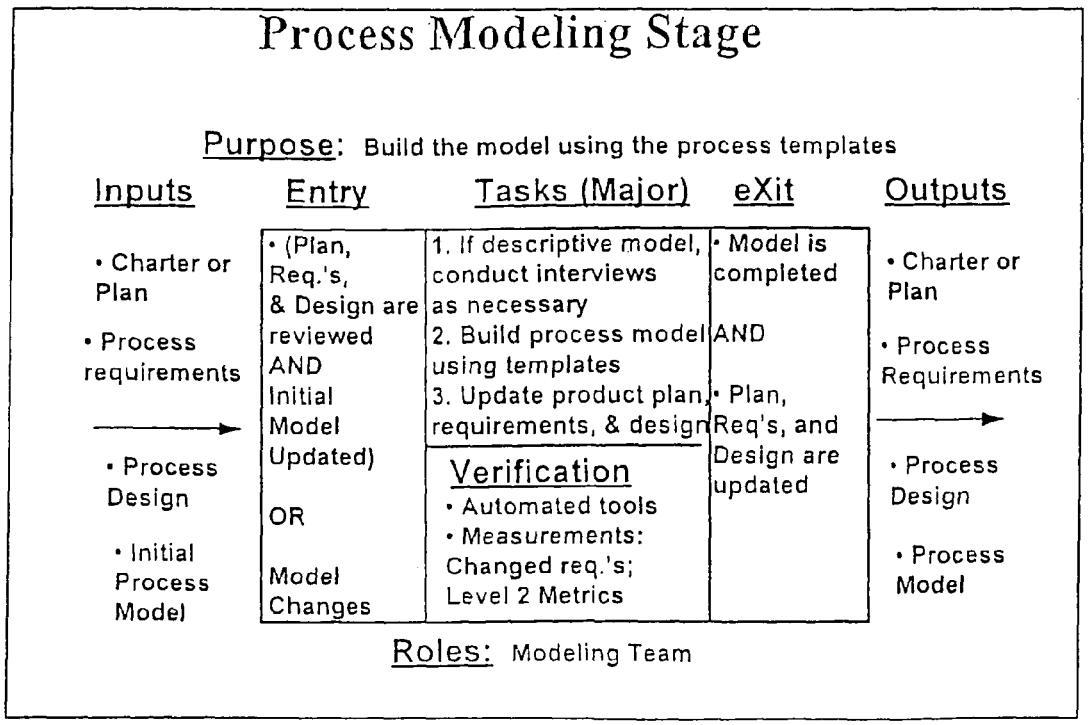
FIG. 7 illustrates a representative process model corresponding to the process definition process of FIG. 3, wherein the illustrated process model is a process modeling stage.

With reference now to FIG. 7, a representative embodiment is provided relating to the process modeling stage of FIG. 3. The purpose of the process modeling stage is to build the model using the process templates. Through process modeling, one can translate the data from the design (i.e., process templates) into a more useful representation, and assist in process engineering, data analysis, measurement, planning, control, improvement, process simulation, etc.

Benefits of process modeling include that (i) modeling leads to a detailed understanding of the process, and the many process relationships, (ii) models improve communication of the process to others, (iii) models can help identify missing requirements, design, inputs, outputs, etc., and (iv) models help identify defects in the process itself, and reduce defects when the processes used.

Measurable objectives of process modeling include that (i) all data from the process templates are captured in the process model, (ii) the model accurately represents the process (i.e., the 5 W's) on one page in expert mode, and (iii) the model satisfies the process plan, the requirements, and the design.

Once the expert mode process models are completed, the intermediate mode process tables can be developed. For each step in the process model (i.e., activity), more detail is given (e.g., guidance, lessons learned, etc.). Policies, standards, and procedures also should be written to be 1 page (can be written either expert or intermediate mode).

Figure 8:
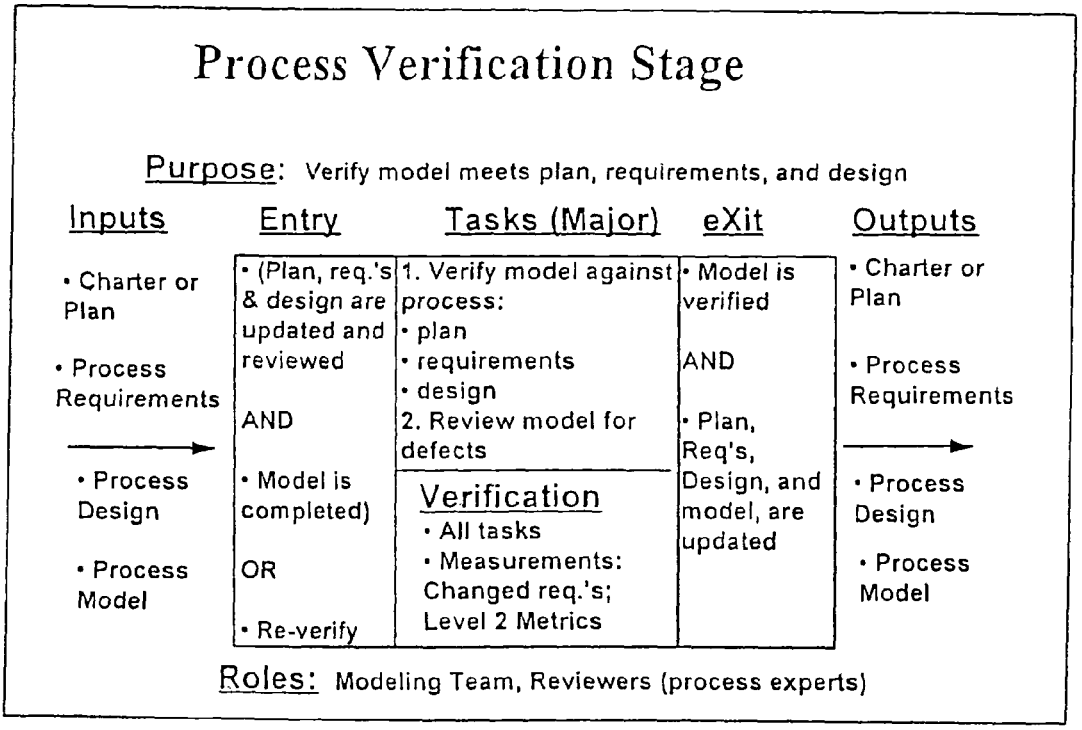
FIG. 8 illustrates a representative process model corresponding to the process definition process of FIG. 3, wherein the illustrated process model is a process verification stage.

With reference now to FIG. 8, a representative embodiment is provided relating to the process verification stage of FIG. 3. The purpose of the process verification stage is to verify that the process meets the plan, requirements, design, and the process is free from defects. Through process verification, one can ensure the process plan, requirements, and design are satisfied in the model and the process guide, and eliminate defects.

Benefits of process verification are that (i) the process meets the process planning, requirements, and design, (ii) verifying the process eliminates defects (mismatching inputs and outputs, inconsistencies, etc), (iii) verification reduces rework in subsequent iterations of building the process model (if using a top-down approach), and (iv) verification helps the process to be the three C's (correct, consistent, and complete).

Measurable objectives of process verification includes that it is able to verify that the process (i.e., model and guide) (i) meets the process plan, requirements, and design, (ii) accurately represents the process templates, and (iii) has been inspected/reviewed to remove defects.

One approach to successfully verifying a process model is to recognize that there are 6 relationships among the 3 process building blocks of work products, activities, and roles (i.e., N*(N−1)). One verification objective is to verify these 6 relationships and ensure that they are correct.

Figure 9:
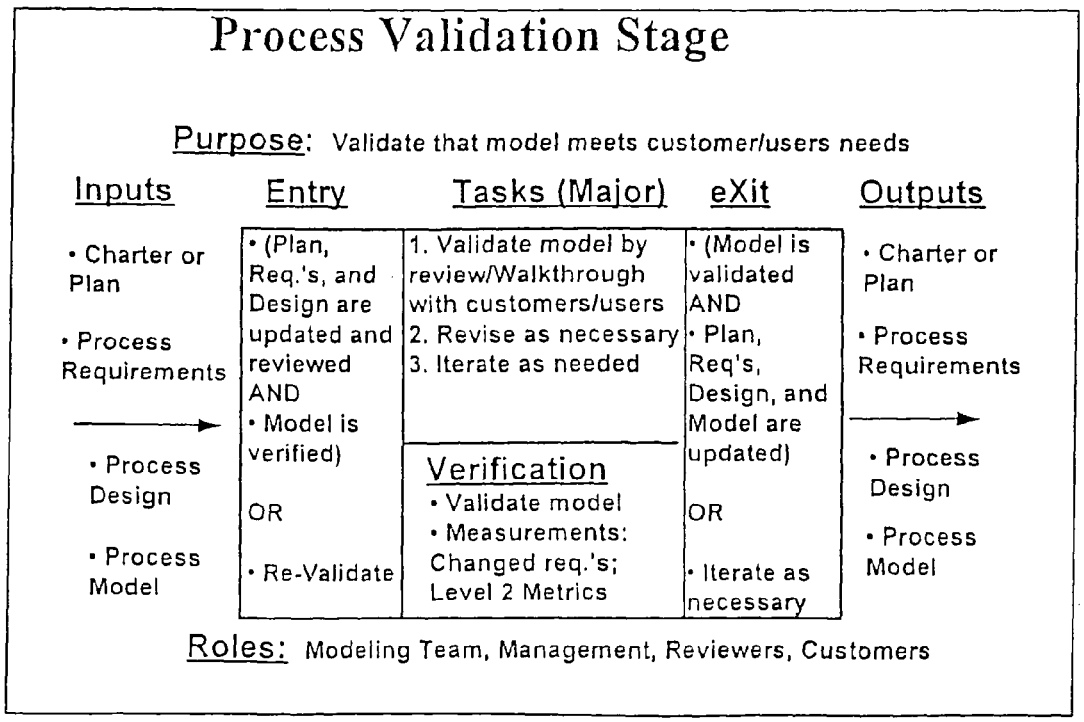
FIG. 9 illustrates a representative process model corresponding to the process definition process of FIG. 3, wherein the illustrated process model is a process validation stage.

With reference now to FIG. 9, a representative embodiment is provided relating to the process validation stage of FIG. 3. The purpose of the process validation stage is to validate that the process meets the customers/users needs. Through process validation, one is able to ensure that the customers and users needs are met, and ensure that the customers and users agree that the process planning, requirements, and design are met.

Benefits of process validation include that (i) process experts reach agreement and consensus on the process, (ii) you know that the process successfully meets the customer(s) and user(s) needs, (iii) you know when you are done, and (iv) it reduces rework in subsequent iterations—adds quality.

Measurable objectives include that (i) customers and users reach consensus that the process meets their needs, (ii) customers and users reach consensus that the process meets the process plan, requirements, and design, and (iii) the process model effectively communicates the process it represents.

A best practice to validate process models is to perform a walkthrough of the process models with the customers and users. The customers/users provide feedback on whether or not the process model meets their needs. They raise process issues and make suggestions for improvement.

As provided herein, embodiments of the present invention embrace providing documentation having succinct communication with scalability. In particular, embodiments of the present invention relate to systems and methods for defining and documenting processes, procedures, standards and policies that are succinct and usable, and that are scalable to the complexity of the process and to abilities of the individual user.

The following provides a representative example for defining and documenting a succinct and usable decision process that is scalable to the complexity of the process and to abilities of an individual user, wherein FIG. 10 illustrates a representative process work product, activities and roles ("WAR") template for the representative decision process. The WAR template is utilized in the process design stage, which enables the documentation and process design and design decisions, as referenced and discussed above in relation to FIGS. 3 and 6.

A WAR template focuses on a high level design prior to expanding out into specific details, which are eventually chunked and used to provide the succinct, usable and scalable documentation. In other words, a WAR template can be used as a basic building block as it defines the work products, activities and roles of the process.

With reference to FIG. 10, the illustrated WAR template identifies the work products that are used and produced by the decision process as being (i) a decision package, (ii) a decision matrix procedure, (iii) a decision presentation, (iv) a decision state, and (v) meeting minutes.

As provided herein, the term "work product" refers to a process building block that consist of any draft or final product (i.e., inputs and outputs) or service used or produced by a process or activity (i.e., the "what"). As illustrated, each work product is assigned an identification code. In the representative embodiment, the decision package includes the decision matrix procedure and decision presentation.

The decision matrix procedure includes document information, such as the document version information (e.g., program name and identification, document title, document version number and/or date, program manager, name of preparer, preparation date, name of reviewer, review date, and/or other relevant information) and the document version history (e.g., identifying the version number, version date, name of the preparer, name of reviewer, description, and/or other information) that gather and organize information. The decision matrix procedure further includes a decision form that enables the gathering of information, such as relating to the decision team, decision makers, search results (e.g., historical data, decisions, lessons learned, etc.), alternative evaluation methods (e.g., simulation), decisions (e.g., recommendations), decision rationale, decision risks, decision benefits, and the like. The decision matrix procedure further includes a Decision Analysis Resolution ("DAR") procedure. The DAR procedure identifies a particular sequence of actions that are to be performed. In the representative embodiment, the DAR procedure includes the following sequence of actions (ordered table):

1. Perform a literature search to consider applicable historical data, historical decisions, previous dissent, lessons learned, etc.
2. Document the decision criteria in the DAR Matrix.
3. Rank the decision criteria by using the weights (e.g., use team consensus for weights)
4. Complete the decision options in the DAR Matrix.
5. If there are other evaluation methods besides the DAR Matrix, document them in the DAR Form.
6. Complete DAR Matrix Form by filling in scores (e.g., select a number on a scale 1-5 using team consensus).
7. Use the DAR Matrix weighted total scores to help make a recommendation for a decision.
8. Complete the DAR Form and DAR Advantages/Disadvantages.
9. Develop/Update the Decision Presentation following the Decision Presentation Standard.
10. Continue to follow the DAR Process.

Completing a DAR Workbook is iterative in nature. Accordingly, in some embodiments versions are used to keep track of iterations.

A decision matrix procedure further includes a decision matrix (A representative decision matrix is illustrated as FIG. 34, and will be discussed below) and an advantage/disadvantage form that gathers information relating to the pros and cons of the process. By way of example, particular options are identified in a form that identifies and gathers information relating to advantages and/or disadvantages of each option.

A decision presentation includes, for example, an outline of the presentation and then provides specifics relating to the (i) introduction, (ii) decision options, (iii) decision matrix form, (iv) DAR information, and (v) recommendations.

The decision states are: (i) A—more information needed, (ii) B—no decision needed, and (iii) C—final decision. Decision state A is new information (e.g., a new option, criteria, criteria rank, or evaluation method) that is required or becomes available and the decision analysis and evaluation is to be repeated. Decision state B is determined by the decision maker(s) that a decision is no longer needed or necessary. This state exits the decision process. Decision state C is the decision of the decision maker(s) with consensus. The decision is final (unless new information becomes available later where the need for a new decision is be determined).

The meeting minutes is, for example, a form that gathers and identifies information such as the meeting agenda (e.g., attendance, meeting title, date/time, location, purpose—respectively, who, what, when, where, and why). Tables may be provided to gather and/or document agenda item descriptions, action item descriptions, issue descriptions, and decision/agreement descriptions.

As provided herein, the WAR Template of FIG. 10 identifies the activities that are to be performed. The term "activity" refers to a process building block and a process element that addresses the "what". An activity is an action or task that is taken to use or consume work products (e.g., inputs), to add value, and to produce work products (e.g., outputs) and services. An activity is any action, and can be as broad as organizational functions (e.g., accounting, legal, etc.), processes (e.g., configuration management, project planning, reviews, etc.), procedures (e.g., a checklist), or as specific as particular steps (e.g., sign your name and approve a document).

As will be shown, the activities are identified, chunked and a process activity template is created for each chunk. In the present embodiment, each chunk includes a maximum of 7±2 activities. However, those skilled in the art will appreciate that embodiments of the present invention embrace chunking that includes more or less activities.

In the illustrated embodiment, the particular decision process is identified as identification code 6.0. The particular activities are identified as identification codes 6.1-6.3.5. The activities have been chunked into three chunks, specifically "Prepare for Decision" (6.1), "Conduct Decision Meeting" (6.2), and "Perform Decision Follow-Up" (6.3). Each activity chunk includes a corresponding process activity template, as illustrated in FIGS. 11-16. Each chunk is a sub-process. Those skilled in the art will appreciate that embodiments of the present invention may include sub-processes having their own sub-processes.

As illustrated, the WAR Template of FIG. 10 further includes the particular roles. The term "role" refers to a process building block and a process element that can be manual or automated, and roles perform the activities in a process (i.e., the "who"). Specifically, the illustrated roles are the decision makers, decision team, decision team representative, management and recorder.

With reference now to FIGS. 11-12 a representative process activity template for the chunked activity 6.1 entitled "Prepare for Decision" of FIG. 10 is illustrated. The process activity template of FIGS. 11-12 identifies the purpose, inputs, entry criteria, activities and who performs each activity, sub-processes and procedures, outputs, exit criteria, process flow, and process context of chunked activity 6.1.

FIGS. 13-14 illustrate a representative process activity template for the chunked activity 6.2 entitled "Conduct Decision Meeting" of FIG. 10. The process activity template of FIGS. 13-14 identifies the purpose, inputs, entry criteria, activities and who performs each activity, sub-processes and procedures, outputs, exit criteria, process flow, and process conext of chunked activity 6.2.

FIGS. 15-16 illustrate a representative process activity template for the chunked activity 6.3 entitled "Perform Decision Follow-Up" of FIG. 10. The process activity template of FIGS. 15-16 identifies the purpose, inputs, entry criteria, activities and who performs each activity, sub-processes and procedures, outputs, exit criteria, process flow, and process context of chunked activity 6.3.

FIGS. 17-34 illustrate a representative decision process guide for the present decision process, wherein FIGS. 18-24 illustrate chunked activities of the decision process in a representative ETMX format and FIGS. 25-30 illustrate chunked activities of the decision process in a swim lane format. The decision process guide enables a user to perform a particular process and includes corresponding procedures, standards and policies. While examples of manners for obtaining the process guide will be provided below, the following process guide is provided to illustrate the particular aspects of a representative process guide.

In FIG. 17, the process guide includes the purpose, the scope and decision policy, the audience, usage, and particular definitions, acronyms and references. In FIG. 18, a graphical representation of the decision process 80 is illustrated, which includes a phase for each chunked activity, namely 6.1 Prepare for Decision, 6.2 Conduct Decision Meeting, and Perform Decision Follow-up. Additionally the particular arrows of the graphical representation of the decision process 80 illustrate the various outputs, namely more information needed (A), no decision needed (B), and final decision (C).

Figure 19:
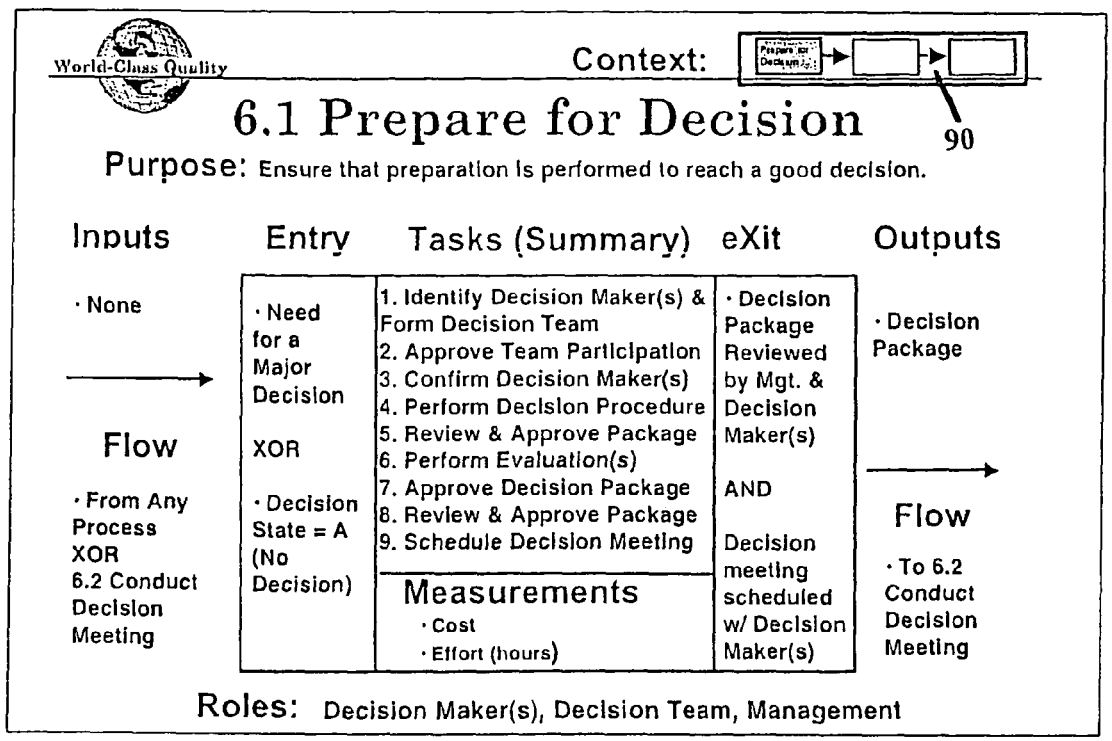

With reference to FIG. 19, an expert mode of activity 6.1 Prepare for Decision is provided in an ETMX process model format. FIG. 20 illustrates an intermediate mode of activity 6.1 Prepare for Decision. FIGS. 19-20 further include all of the activities that have been chunked. It is noted that in FIG. 19, representation 90 is similar to representation 80 (FIG. 18) and identifies to the user the location of activity 6.1 in the overall decision process.

Figure 21:
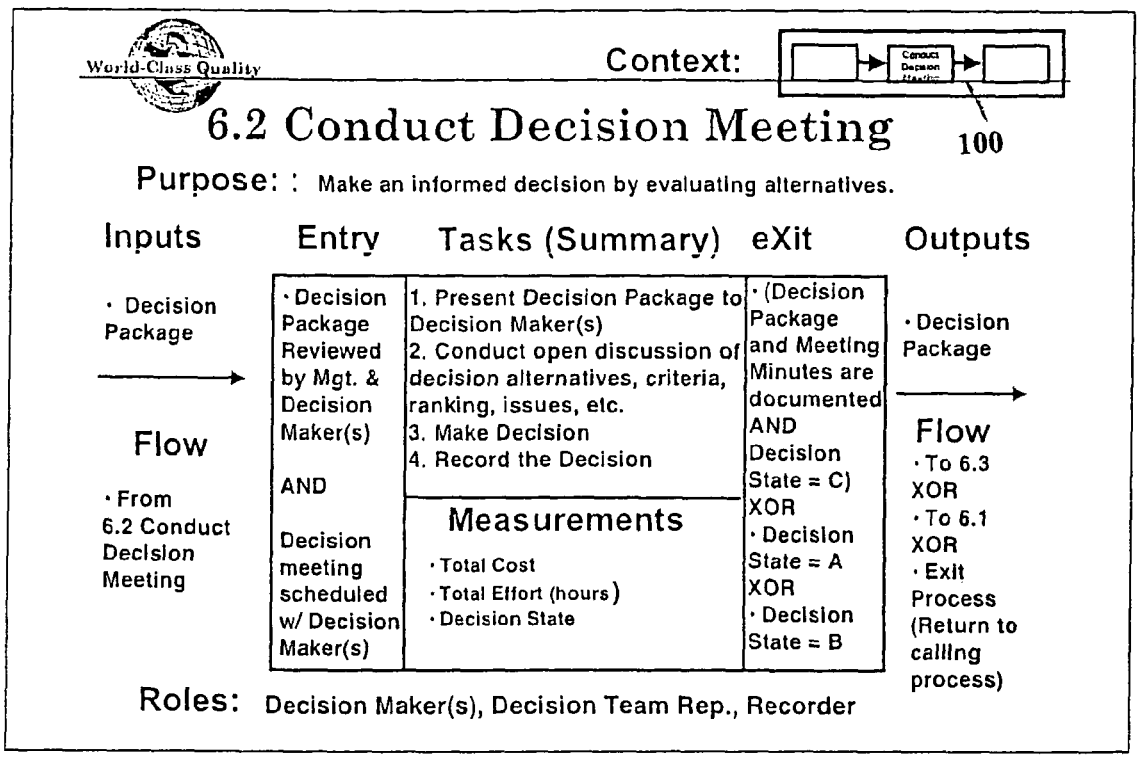

With reference to FIG. 21, an expert mode of activity 6.2 Conduct Decision Meeting is provided in an ETMX process model format. FIG. 22 illustrates an intermediate mode of activity 6.2 Conduct Decision Meeting. FIGS. 21-22 further include all of the activities that have been chunked. It is noted that in FIG. 21, representation 100 is similar to representation 80 (FIG. 18) and identifies to the user the location of activity 6.2 in the overall decision process.

Figure 23:
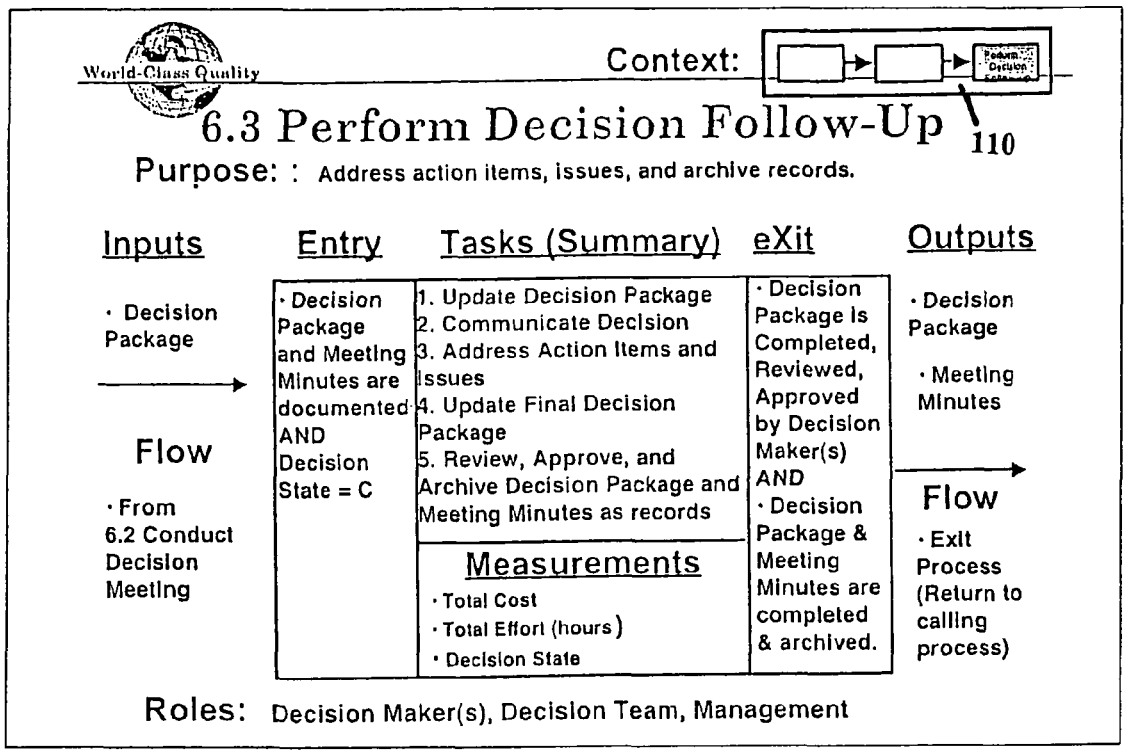

With reference to FIG. 23, an expert mode of activity 6.3 Perform Decision Follow-Up is provided in an ETMX process model format. FIG. 24 illustrates an intermediate mode of activity 6.3 Perform Decision Follow-Up. FIGS. 23-24 further include all of the activities that have been chunked. It is noted that in FIG. 23, representation 110 is similar to representation 80 (FIG. 18) and identifies to the user the location of activity 6.3 in the overall decision process.

As provided above, FIGS. 18-24 illustrate chunked activities of the decision process in a representative ETMX process model format. Embodiments of the present invention embrace documenting in a variety of formats or manners to communicate in a succinct and understandable manner that is usable by a particular user and is scalable to the complexity of the process and to abilities of the individual user. Thus, for example, FIGS. 25-30 illustrate same chunked activities of the decision process as are illustrated in FIGS. 18-24, however FIGS. 25-30 illustrate the chunked activities of the decision process in a swim lane format.

Figure 25:
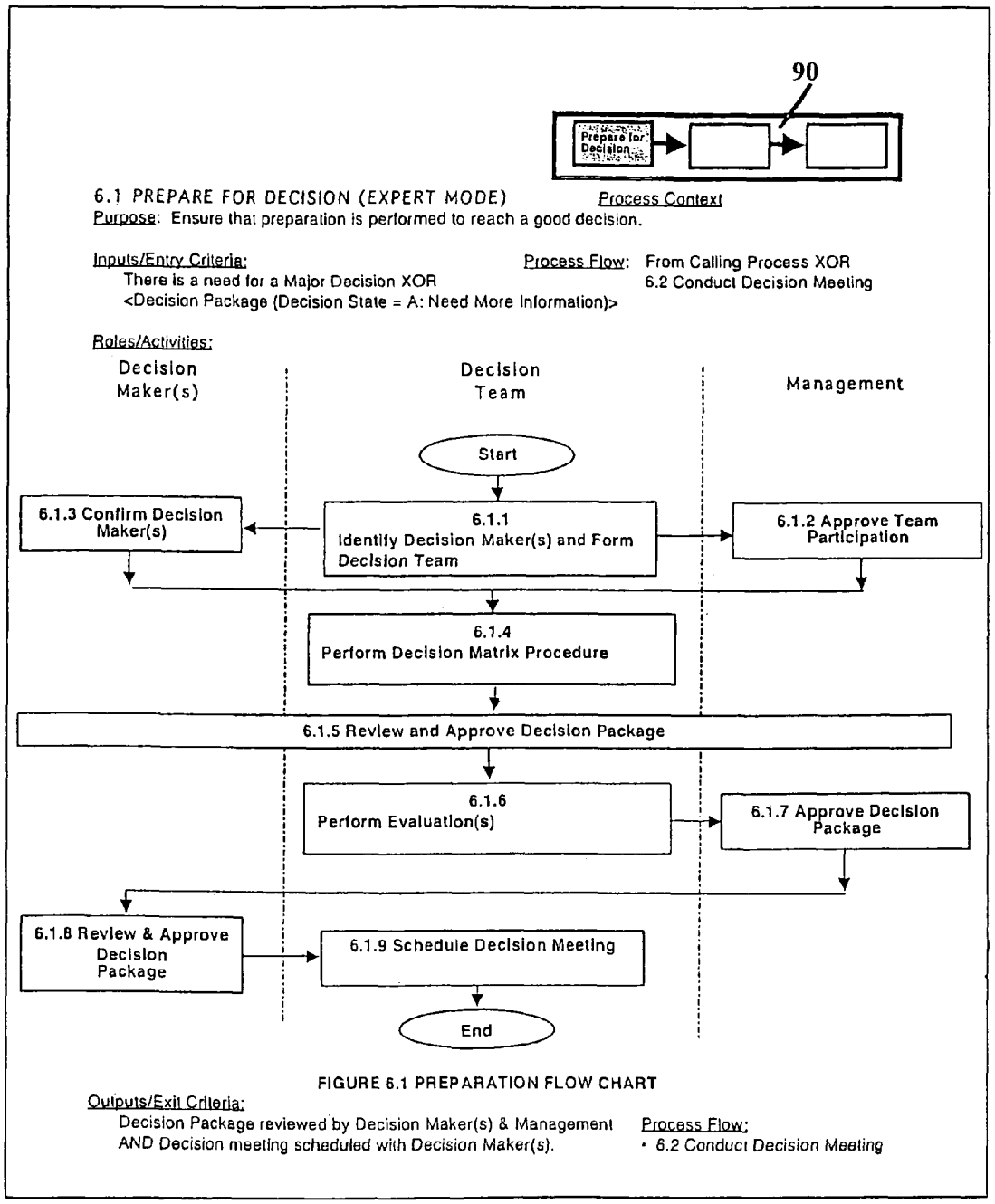

Thus, with reference to FIG. 25, an expert mode of activity 6.1 Prepare for Decision is provided in a swim lane process model format. Similar to FIG. 20, FIG. 26 illustrates an intermediate mode of activity 6.1 Prepare for Decision. FIGS. 25-26 further include all of the activities that have been chunked. It is noted that in FIG. 25, representation 90 is similar to representation 80 (FIG. 18) and identifies to the user the location of activity 6.1 in the overall decision process.

Figure 27:
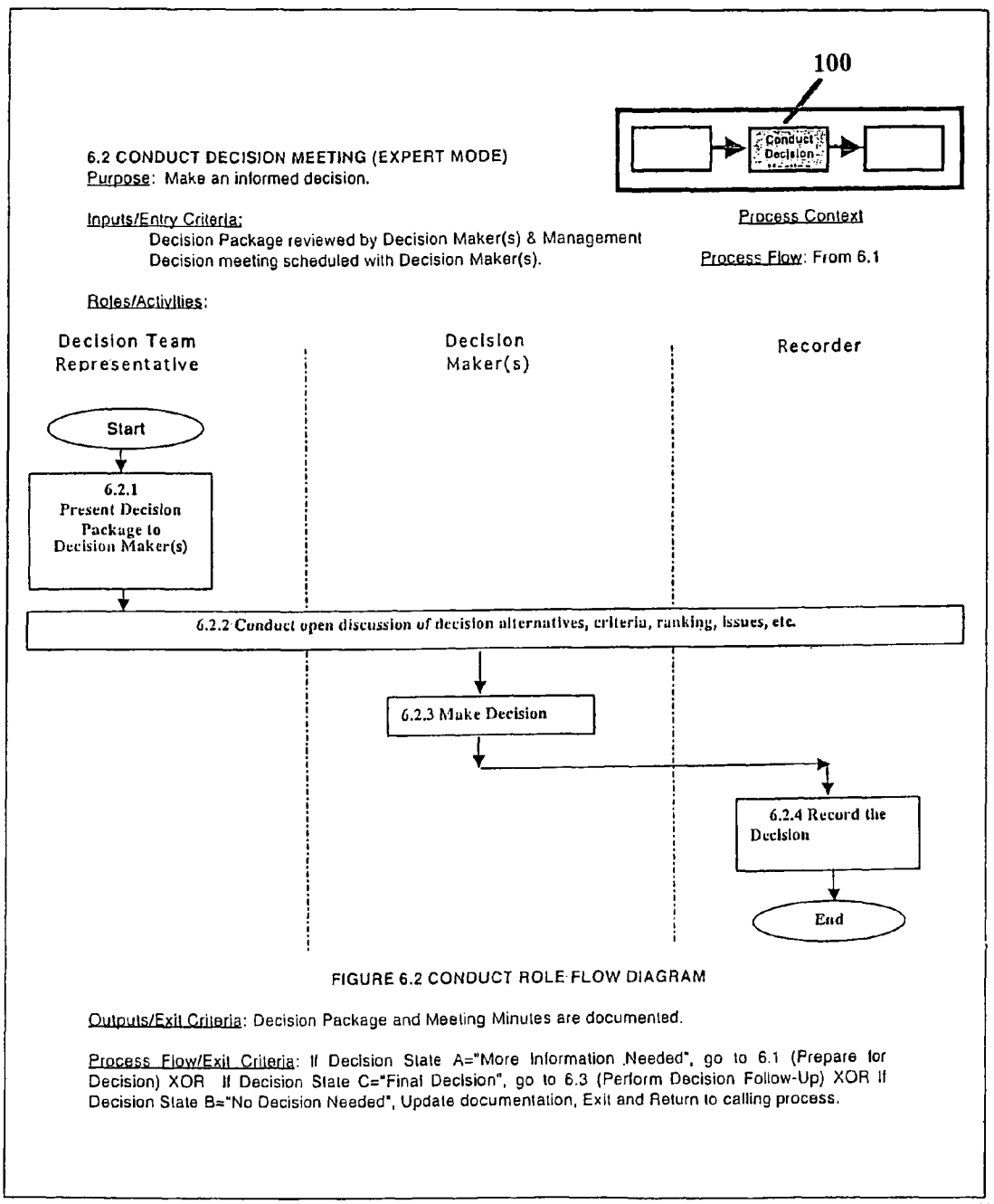

With reference to FIG. 27, an expert mode of activity 6.2 Conduct Decision Meeting is provided in a swim lane process model format. Similar to FIG. 22, FIG. 28 illustrates an intermediate mode of activity 6.2 Conduct Decision Meeting. FIGS. 27-28 further include all of the activities that have been chunked. It is noted that in FIG. 27, representation 100 is similar to representation 80 (FIG. 18) and identifies to the user the location of activity 6.2 in the overall decision process.

Figure 29:
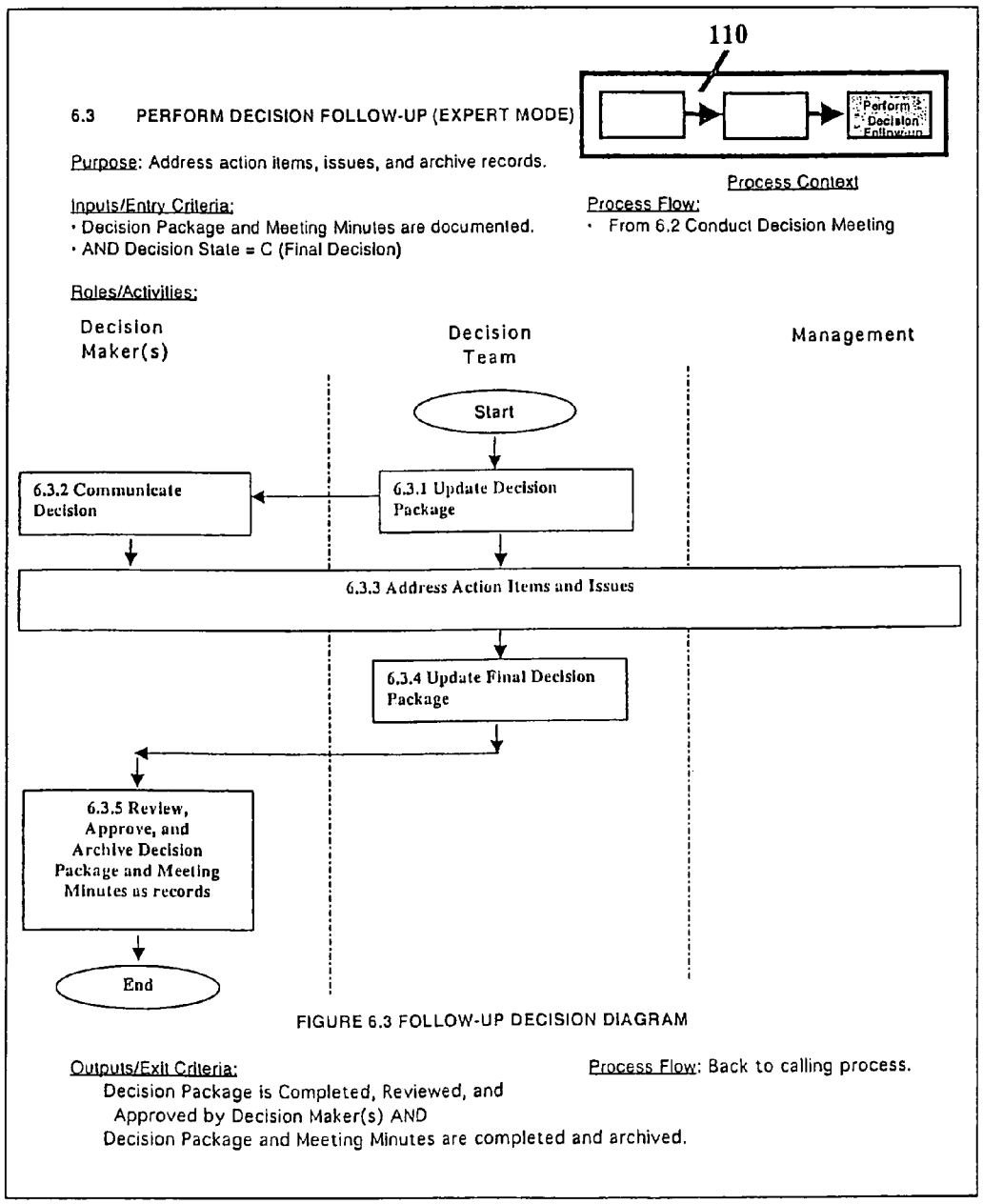

With reference to FIG. 29, an expert mode of activity 6.3 Perform Decision Follow-Up is provided in a swim lane process model format. Similar to FIG. 24, FIG. 30 illustrates an intermediate mode of activity 6.3 Perform Decision Follow-Up. FIGS. 29-30 further include all of the activities that have been chunked. It is noted that in FIG. 29, representation 110 is similar to representation 80 (FIG. 18) and identifies to the user the location of activity 6.3 in the overall decision process.

In FIG. 31, the process guide includes the relevant records, interfaces, metrics, forms and templates, training, and emergency decisions. In FIG. 32, a representative decision presentation standard is provided. The term "standard" refers to a process document that comprises sections or parts, and descriptions of those parts or descriptions of what goes into those sections. Standards usually describe what goes into a work product, but there can also be standards for policies, processes, and procedures. A list of just sections or parts is not a standard, but is a template. In FIG. 33, the representative decision matrix procedure (discussed above) is illustrated.

In FIG. 34, the representative decision matrix (discussed above) is illustrated. The decision matrix identifies the various criteria (e.g., mission objectives, return on investment, cost, schedule, measure of potential impact, risk, safety, supportability, etc.) considered and the weight assigned to the criteria. It further includes a ranking scale, various available options that are being considered that are ranked by criteria, and the sums of each.

In at least some embodiments of the present invention, at least portions of the methods and/or processes of the present invention are performed by a computer device. For example, information from process activity templates may be used to document activities or processes that are succinct and usable, and that are scalable to the complexity of the process and to abilities of the individual user.

Embodiments of the present invention embrace a variety of manners that enable documentation having succinct communication with scalability. With reference now to FIG. 35, a lean process documentation design procedure in accordance with a representative embodiment of the present invention is provided. As provided herein, a procedure refers to a process document that is a set of activities that describe the "how to". Accordingly, the procedure of FIG. 35 illustrates how to design lean process documentation in accordance with a representative embodiment of the present invention. In other words, the illustrated procedure documents the design phase for defining a process or sub-process in accordance with an embodiment of the present invention.

Specifically, as illustrated in FIG. 35, a process WAR template is utilized for the scope of the process. The work products, activities and roles are identified.

If any list in the WAR template has more than a particular maximum number of items, wherein the maximum number can be any established number, then the list is selectively chunked. Roles, work products and/or activities may be identified as needing to be chunked. Duplicates are consolidated. In chunking activities, some embodiments look for process chunks, such as planning, control and improvement. If a meeting or event is to occur, chunking may be associated with being prior to, during, or after the meeting or event. In at least some embodiments of the present invention, chunks are named descriptively.

The initial process model is updated to match the chunked activities. A block diagram may be used, wherein one box is provided for each chunked activity. Such activities may be sequential or concurrent.

A process activity template is completed for each chunked activity. In at least some embodiments, by completing a process activity template, all nine process elements (e.g., inputs, outputs, activities, process context, entry criteria, exit criteria, purposes, process flow, and roles) are identified for each chunked activity. Each process activity template is represented by a box in the initial process model. Those skilled in the art will appreciate that while some embodiments include nine process elements, other embodiments include less than nine or more than nine.

A process model representation is used to represent the processes. Embodiments of the present invention embrace a variety of representations and/or formats, including ETVX, SADT, Role/Flow, and other representations.

Additionally, all design decisions may be documented.

With reference now to FIG. 36, a lean process modeling and documentation procedure in accordance with a representative embodiment of the present invention is provided. As provided above, a procedure refers to a process document that is a set of activities that describe the "how to". Accordingly, the procedure of FIG. 36 illustrates how to model and document a lean process in accordance with a representative embodiment of the present invention. In other words, the illustrated procedure documents the process modeling and documentation for the modeling stage for defining a process or sub-process in accordance with an embodiment of the present invention.

Specifically, as illustrated in FIG. 36, the nine process elements (e.g., inputs, outputs, activities, process context, entry criteria, exit criteria, purposes, process flow, and roles) are defined on one page in a process model or diagram (expert mode) for each process activity template. Using one process activity template at a time, the nine process elements are mapped onto the process model diagram. The process modeling representation used is the one selected in the design stage. This is performed for each process activity template. If the process activity template was not used, the nine process elements may be defined on a single page (expert mode) using the process chunk identified in the process design stage.

For intermediate mode, an ordered process table is created with each step being mapped back to an activity in the process model. It is noted that each step in the process model diagram is in expert mode, and that each expert mode step may include more sub-steps or detailed explanations for an intermediate mode.

Information relating to guidance or lessons learned is included into the steps in the intermediate mode process table. A guidance label is used to document guidance and lessons learned, but is not required every step.

Once the expert mode process models or diagrams and intermediate mode tables are completed, they are verified and validated. Procedures are then followed for each policy, standard and procedure. Such representative procedures are for policies, standards and procedures are a procedure for developing a lean policy (FIG. 42), a procedure for developing a lean standard (FIG. 41), a procedure for developing a lean procedure (FIG. 35), and a procedure for developing a lean process guide (FIG. 43).

With reference now to FIG. 37, a procedure is provided for developing a lean procedure in accordance with a representative embodiment of the present invention. As provided above, a procedure refers to a process document that is a set of activities that describe the "how to". Accordingly, the procedure of FIG. 37 illustrates how to document the steps of the process modeling stage for defining procedures.

In accordance with at least some embodiments of the present invention, there are three types of procedures, namely (i) forms, (ii) checklists, and (iii) order tables. Each type of procedure provides benefits for use. Additionally, embodiments of the present invention embrace procedures that are in expert mode, intermediate mode and/or beginner mode.

A representative form is illustrated in FIG. 38 as a Meeting Minutes Template. A form enables the collection of information. Thus, the form of FIG. 38 allows for the collection of information relating to who (meeting attendance), what (meeting title), when (meeting date/time), where (meeting location) and why (meeting purpose). Additionally, the form of FIG. 38 allows for the collection of information relating to agenda items, action items, issues, and decisions/agreements.

A representative checklist is illustrated in FIG. 39. A checklist helps a user to not forget to perform any particular step or task. Additionally, the steps or tasks may be done in any order, which can allow for concurrency.

A representative order table is illustrated in FIG. 40. An order table provides a particular sequence for which steps or tasks are to be taken or performed.

Thus, with reference back to FIG. 37, the procedure for developing a procedure in accordance with the present invention includes providing a title for the procedure, starting with an action verb, wherein the title is focused on the output of the procedure. Descriptive language is used to name the procedure. A checklist, form and/or ordered table is used depending on the purpose of the procedure, namely to perform a collection of activities in any order, to collect information, and/or to perform activities in a particular order. The primary purpose of a procedure guides the selection of the procedure type. The procedure templates are used and descriptive language is employed when documenting procedure steps. The procedures are kept focused on a single usage scenario. The information is ordered in a logical flow or presentation as possible. In expert mode, the procedures are kept to one page. Additionally, the procedure is chunked into logical groups with the chunks labeled. Procedures are needed when repeatability is needed for "how to" steps. In at least some embodiments, procedures are not needed for every activity (only the vital few activities that require repeatability for a given set of "how to" steps).

With reference now to FIG. 41, a procedure is provided for developing a lean standard in accordance with a representative embodiment of the present invention. As provided herein, a standard refers to a process document that comprises sections or parts, and descriptions of those parts or descriptions of what goes into those sections. Standards make work products repeatable and identify a section number, a name and a description. While standards usually describe what goes into a work product, there can also be standards for policies, processes, and procedures. In accordance with at least some embodiments of the present invention, a standard provides an ability to provide uniformity to documentation. For example, a standard identifies particular sections and descriptions for such sections. In at least some embodiments, a standard is provided on one page. The format for a standard can include a table or other format. Moreover, embodiments of the present invention embrace standards that are in expert mode, intermediate mode and/or beginner mode.

In FIG. 41, the illustrated procedure documents the steps for the process modeling stage for defining standards on one page (expert mode). Specifically, the title of the standard is identified using a descriptive name. The sections are listed through utilization of a table or by listing the sections using section numbers that become section numbers in the work products. A description is provided for each section, wherein the description is concise and includes a repeatable definition. Industry standards are also utilized. Standards may be combined together into a lean standard (i.e., a one page, expert mode standard).

With reference now to FIG. 42, a procedure is provided for developing a lean policy in accordance with a representative embodiment of the present invention. As provided herein, a policy refers to a process document based upon principles that guide and constrain an organization. In accordance with at least some embodiments of the present invention, a policy provides an ability to map out a principle that has been established or otherwise determined. For example, in the business world the senior management determines principles for a particular company, wherein the principles are how the company will be run. In some embodiments, the policies are provided on one page. Moreover, embodiments of the present invention embrace policies that are in expert mode, intermediate mode and/or beginner mode.

The procedure of FIG. 42 documents representative steps of the process modeling stage for defining policies. Specifically, the policy is given a title using descriptive terms. The vital principles that the organization should follow are defined and chunked as needed. This can be done in a table or by listing the principles using numbers or bullets. Good sources for process principles come from industry standards and reference materials. Optionally, each principle may be labeled for summary purposes and ease of reading. An authorization/approval section may be added for the policies. Policies may have definitions, including operational definitions which are repeatable and measurable. Policies may be combined together into a policy document. Alternatively, the policy may be defined in the process guide along with the other process documentation.

With reference now to FIG. 43, a procedure is provided for developing a lean process guide in accordance with a representative embodiment of the present invention. The process guide is a manner to package or otherwise provide documentation. It is a succinct output or deliverable having scalability.

The procedure of FIG. 43 illustrates representative steps of the process modeling stage for defining a lean process guide. Specifically, the title of the process guide is determined using descriptive language. The process guide is similar to a user guide and is kept short and usable. It is the primary package used by a user/customer. The following is a checklist that is used to check the process guide:

Does the process guide match the process models?
Does the process guide match the process description tables?
Does the customer/user want the policies, standards and procedures combined in the process guide, or in separate documents?
Have each of the policies, standards and procedures been kept to a single page?
Has the process guide been verified?
Has the process guide been validated?
Has the grammar of the process guide been checked?
Has the spelling of the process guide been checked?
Have the process guide been edited, such as by a professional editor?
Has the process guide been backed up?

With reference now to FIG. 44, a procedure is provided for developing a process guide standard in accordance with a representative embodiment of the present invention. In FIG. 44, the goal with the process guide is to keep it as short and usable as possible. The process guide standard of FIG. 43 includes the purpose, scope, audience, usage, definitions/references, process models, records, interfaces, metrics, forms and templates, training, miscellaneous information, and appendixes.

FIGS. 10-34 provided a representative example relating to a representative decision process, wherein FIG. 10 illustrated a representative process work WAR template for the representative decision process, FIGS. 11-12 illustrated a representative process activity template for the chunked activity 6.1 entitled "Prepare for Decision" of FIG. 10, FIGS. 13-14 illustrated a representative process activity template for the chunked activity 6.2 entitled "Conduct Decision Meeting" of FIG. 10, FIGS. 15-16 illustrated a representative process activity template for the chunked activity 6.3 entitled "Perform Decision Follow-Up" of FIG. 10, and wherein FIGS. 17-34 illustrated a representative decision process guide, FIGS. 18-24 illustrating chunked activities of the decision process in a representative ETMX format and FIGS. 25-30 illustrating chunked activities of the decision process in a swim lane format.

FIGS. 45-74 provide another representative example that relates to a configuration management ("CM") process, wherein FIGS. 45-46 illustrate a representative WAR template for the representative CM process, FIGS. 47-48 illustrate a representative process activity template for the chunked activity 7.1 entitled "Perform CM Planning" of FIG. 45, FIGS. 49-50 illustrate a representative process activity template for the chunked activity 7.2 entitled "Perform Configuration Control" of FIG. 45, FIGS. 51-52 illustrate a representative process activity template for the chunked activity 7.3 entitled "Perform CSA" of FIG. 45, FIGS. 53-54 illustrate a representative process activity template for the chunked activity 7.4 entitled "Perform CM Audits" of FIG. 45, and where FIGS. 55-74 illustrate a representative CM process guide.

Thus, with reference now to FIGS. 45-46, the illustrated WAR template identifies the work products that are used and produced by the CM process as being (i) a baseline, (ii) a configuration control board ("CCB") meeting minutes, (iii) a change request ("CR"), (iv) a CM system, (v) a configuration audit report, (vi) a configuration identification report, (vii) a configuration item ("CI"), (viii) a change request/problem report ("CR/PR") trend report, (ix) an organizational CM plan, (x) a problem report ("PR"), (xi) a project CM plan, and (xii) a project plan.

As provided above, the term "work product" refers to a process building block that consist of any draft or final product (i.e., inputs and outputs) or service used or produced by a process or activity (i.e., the "what"). As illustrated, each work product is assigned an identification code.

The WAR Template of FIGS. 45-46 identifies the activities that are to be performed for the CM process. The term "activity" refers to a process building block and a process element that addresses the "what". An activity is an action or task that is taken to use or consume work products (e.g., inputs), to add value, and to produce work products (e.g., outputs) and services. An activity is any action, and can be as broad as organizational functions (e.g., accounting, legal, etc.), processes (e.g., configuration management, project planning, reviews, etc.), procedures (e.g., a checklist), or as specific as particular steps (e.g., sign your name and approve a document).

The activities are identified, chunked and a process activity template is created for each chunk. In the present embodiment, each chunk includes a maximum of 7±2 activities. However, as provided herein, those skilled in the art will appreciate that embodiments of the present invention embrace a maximum chunking value that is less than or greater than 7±2.

In the illustrated embodiment, the CM process is identified as identification code 7.0. The particular activities are identified as identification codes 7.1-7.4.6. The activities have been chunked into four chunks, specifically "Perform CM Planning" (7.1), "Perform Configuration Control" (7.2), "Perform Configuration Status Accounting" (7.3), and "Perform CM Audits" (7.4). Each activity chunk includes a corresponding process activity template, as illustrated in FIGS. 47-54. Each chunk is a sub-process. Those skilled in the art will appreciate that embodiments of the present invention may include sub-processes having their own sub-processes.

As illustrated, the WAR Template of FIGS. 45-46 further includes the particular roles (see FIG. 46). The term "role" refers to a process building block and a process element that can be manual or automated, and roles perform the activities in a process (i.e., the "who"). Specifically, the illustrated roles are the Configuration Control Board (CCB), the Configuration Management (CM) Auditor, the Configuration Management (CM) Lead, the developers, the project manager (PM), the quality assurance (QA), and the requester.

With reference now to FIGS. 47-48 a representative process activity template for the chunked activity 7.1 entitled "Perform CM Planning" of FIGS. 45-46 is illustrated. The process activity template of FIGS. 47-48 identifies the purpose, inputs, entry criteria, activities and who performs each activity, sub-processes and procedures, outputs, exit criteria, process flow, and process context of chunked activity 7.1.

FIGS. 49-50 illustrate a representative process activity template for the chunked activity 7.2 entitled "Perform Configuration Control" of FIGS. 45-46. The process activity template of FIGS. 49-50 identifies the purpose, inputs, entry criteria, activities and who performs each activity, sub-processes and procedures, outputs, exit criteria, process flow, and process context of chunked activity 7.2.

FIGS. 51-52 illustrate a representative process activity template for the chunked activity 7.3 entitled "Perform CSA" of FIGS. 45-46. The process activity template of FIGS. 51-52 identifies the purpose, inputs, entry criteria, activities and who performs each activity, sub-processes and procedures, outputs, exit criteria, process flow, and process context of chunked activity 7.3.

FIGS. 53-54 illustrate a representative process activity template for the chunked activity 7.4 entitled "Perform CM Audits" of FIGS. 45-46. The process activity template of FIGS. 53-54 identifies the purpose, inputs, entry criteria, activities and who performs each activity, sub-processes and procedures, outputs, exit criteria, process flow, and process context of chunked activity 7.4.

FIGS. 55-74 illustrate a representative CM process guide, wherein FIGS. 57-64 illustrate chunked activities of the decision process in a swim lane format. The CM process guide enables a user to perform the CM process and includes corresponding procedures, standards and policies. The following CM process guide is provided to illustrate the particular aspects of the representative process guide.

In FIG. 55, the process guide includes the purpose, the scope, audience, usage, acronyms, and references. In FIG. 56, a graphical representation of the CM process 120 is illustrated, which includes a phase for each chunked activity, namely 7.1 Perform CM Planning, 7.2 Perform Configuration Control, 7.3 Perform Configuration Status Accounting, and 7.4 Perform CM Audits. Additionally the dotted lines of the graphical representation of the CM process 120 illustrate concurrency.

Figure 57:
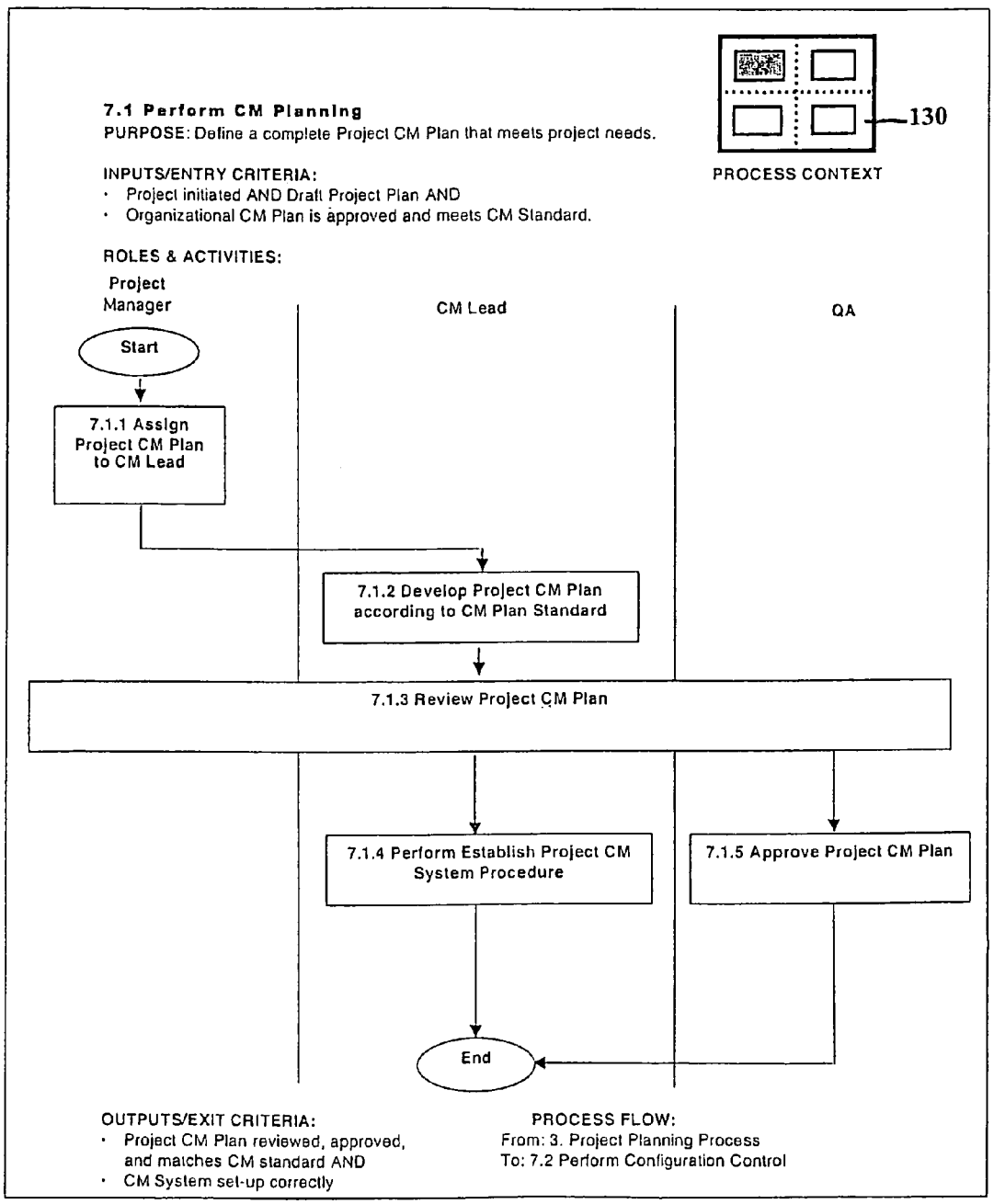

With reference to FIG. 57, an expert mode of activity 7.1 Perform CM Planning is provided in a swim lane format. FIG. 58 illustrates an intermediate mode of activity 7.1 Perform CM Planning. FIGS. 57-58 further include all of the activities that have been chunked. It is noted that in FIG. 57, representation 130 is similar to representation 120 (FIG. 56) and identifies to the user the location of activity 7.1 in the overall CM process.

Figure 59:
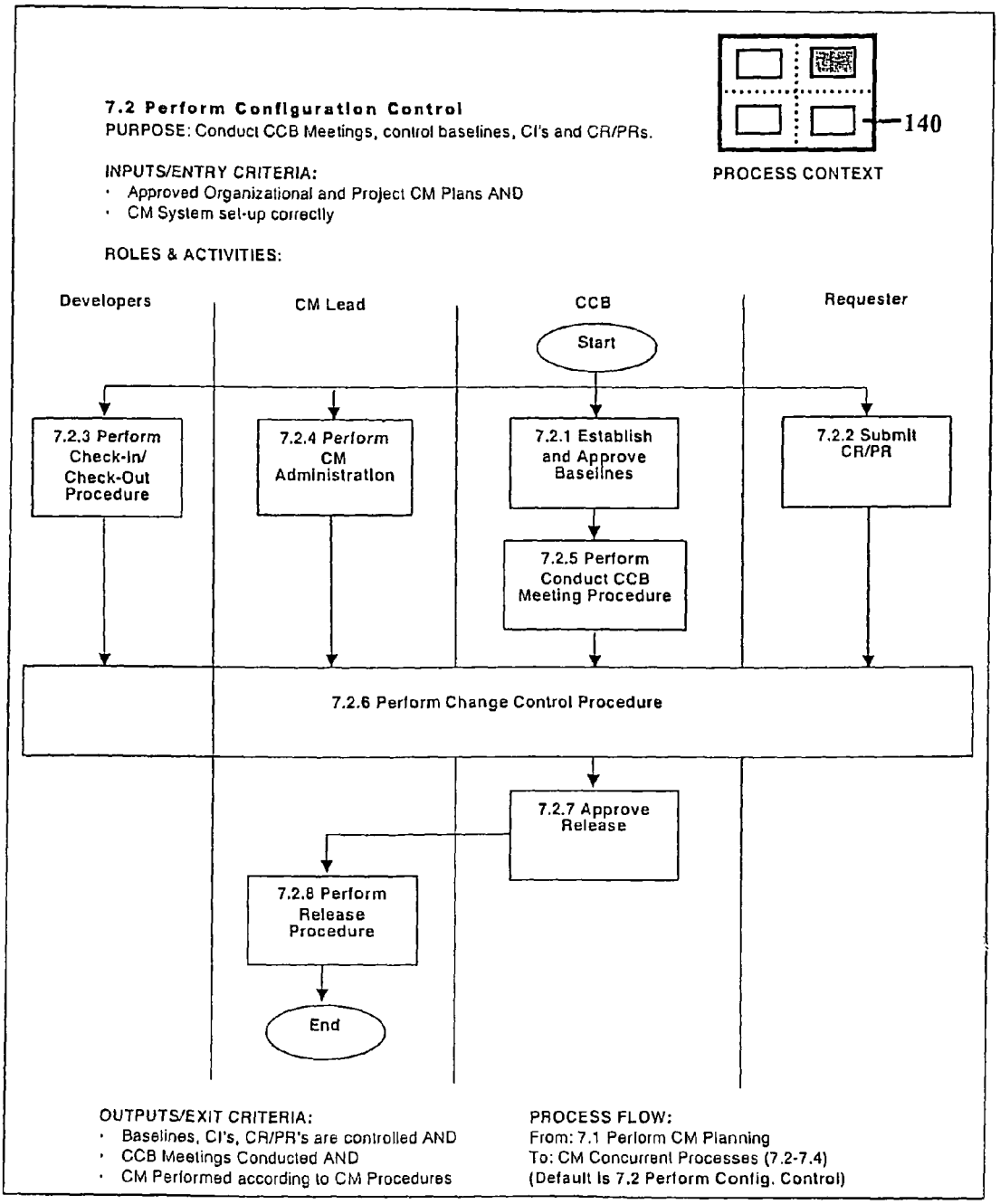

With reference to FIG. 59, an expert mode of activity 7.2 Perform Configuration Control is provided in a swim lane format. FIG. 60 illustrates an intermediate mode of activity 7.2 Perform Configuration Control. FIGS. 59-60 further include all of the activities that have been chunked. It is noted that in FIG. 59, representation 140 is similar to representation 120 (FIG. 56) and identifies to the user the location of activity 7.2 in the overall CM process.

Figure 61:
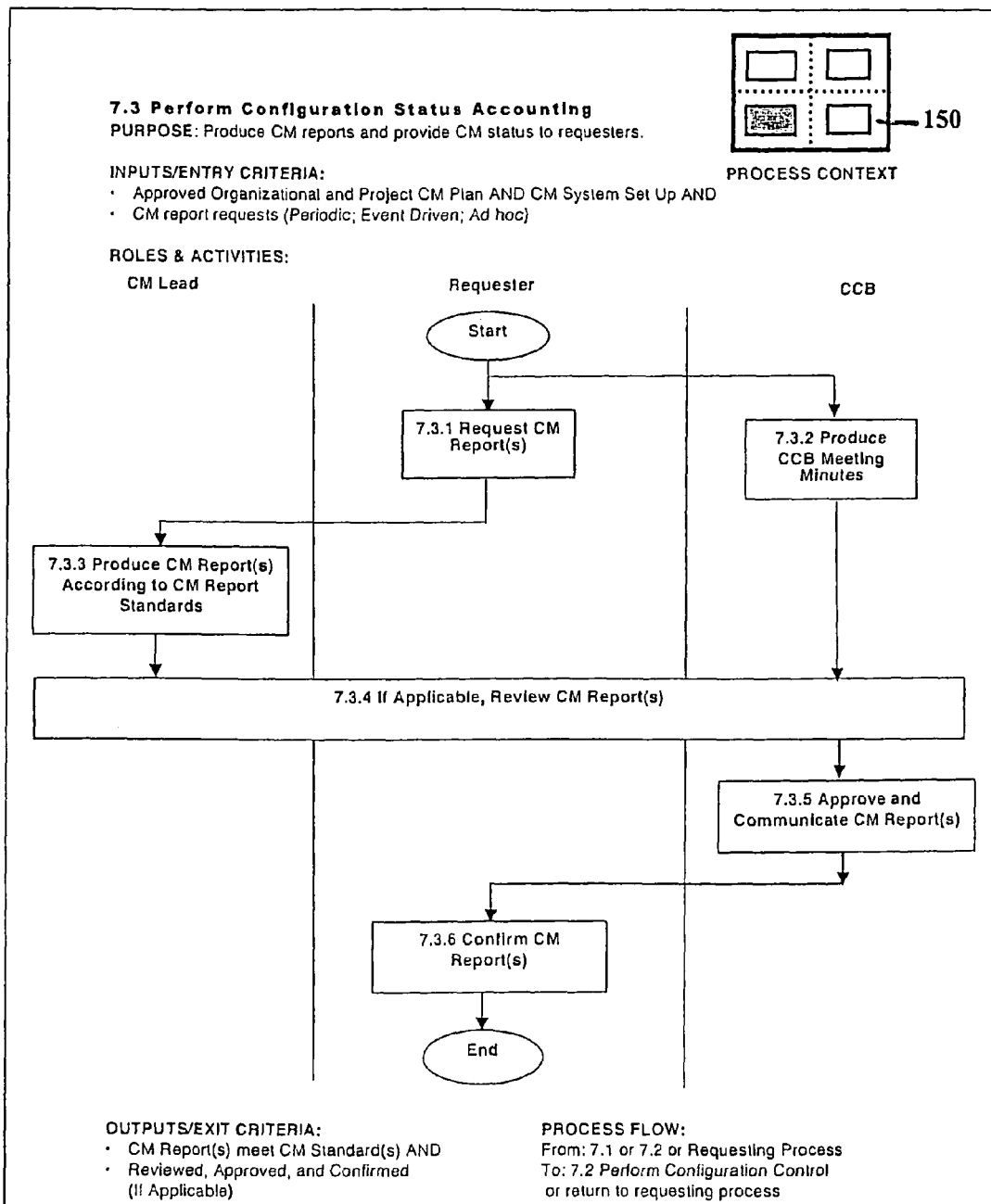

With reference to FIG. 61, an expert mode of activity 7.3 Perform Configuration Status Accounting is provided in a swim lane format. FIG. 62 illustrates an intermediate mode of activity 7.3 Perform Configuration Status Accounting. FIGS. 61-62 further include all of the activities that have been chunked. It is noted that in FIG. 61, representation 150 is similar to representation 120 (FIG. 56) and identifies to the user the location of activity 7.3 in the overall CM process.

Figure 63:
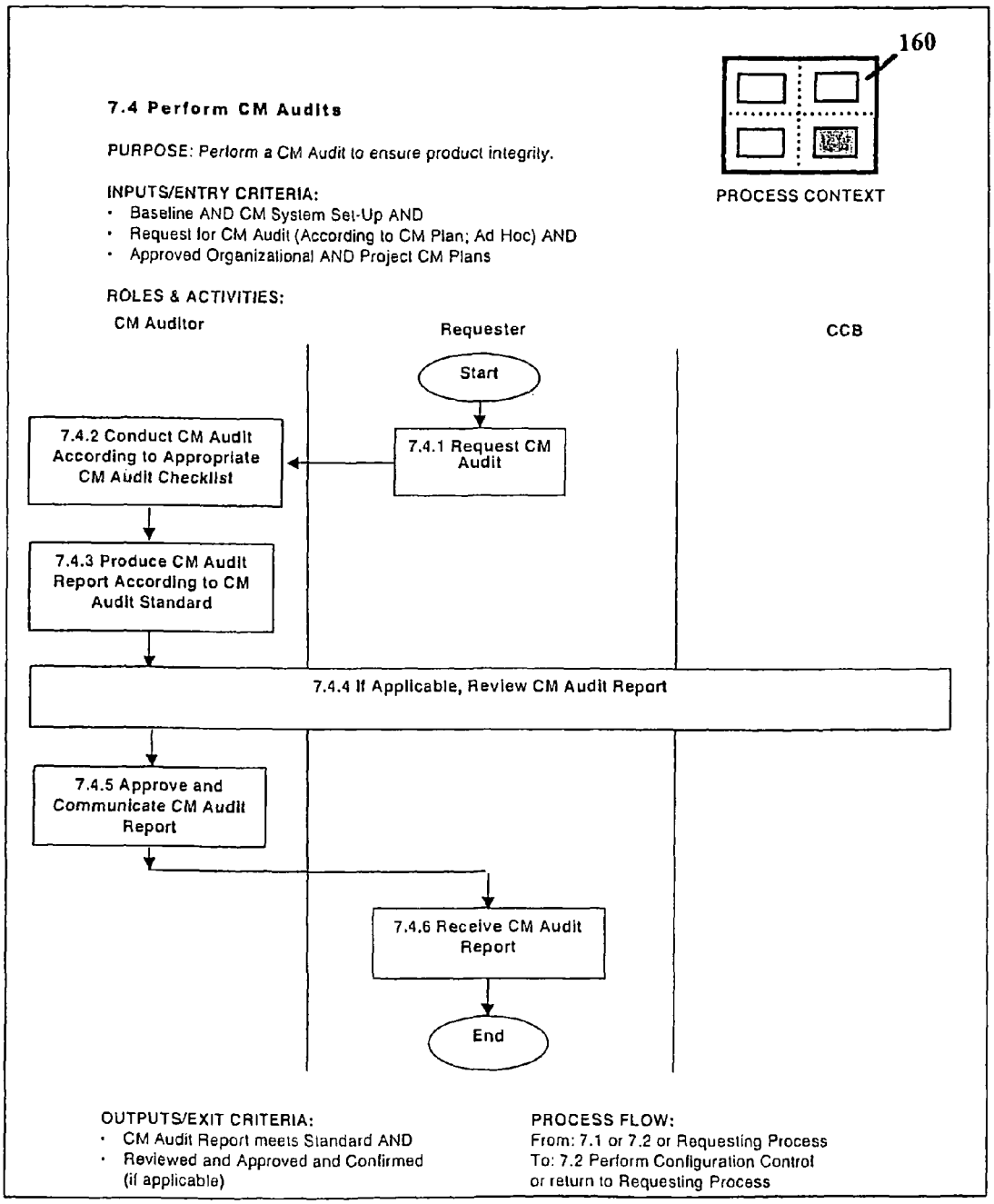

With reference to FIG. 63, an expert mode of activity 7.4 Perform CM Audit is provided in a swim lane format. FIG. 64 illustrates an intermediate mode of activity 7.4 Perform CM Audit. FIGS. 63-64 further include all of the activities that have been chunked. It is noted that in FIG. 63, representation 160 is similar to representation 120 (FIG. 56) and identifies to the user the location of activity 7.4 in the overall CM process.

In FIG. 65, the process guide includes the general exit criteria for the CM process, the relevant records, interfaces, metrics, standards, training, and maintenance of the process. In FIG. 66, a representative CM policy is provided. As provided herein, the term "policy" refers to a process document based upon principles that guide and constrain an organization. It specifically identifies the CM purpose, the policy scope, the individual CM policies, and the authorization.

In FIG. 67, a representative CM plan standard is provided. The term "standard" refers to a process document that comprises sections or parts, and descriptions of those parts or descriptions of what goes into those sections. Standards usually describe what goes into a work product, but there can also be standards for policies, processes, and procedures. A list of just sections or parts is not a standard, but is a template.

In FIG. 68, a representative CM report standards is provided, which identifies the required reports for the present embodiment. Specifically, the reports include (i) a configuration identification report standard, (ii) a change request and problem report standard, (iii) a CCB meeting minutes standard, and (iv) a CM audit report standard.

In FIGS. 69-70, representative CM audit checklists are provided. The checklists include (i) a requirements baseline audit checklist, (ii) a code baseline audit checklist, and (iii) a product baseline audit checklist.

FIG. 71 illustrates a representative establish CM system procedure. FIG. 72 illustrates a representative change control procedure. FIG. 73 illustrates a representative conduct CCB meeting procedure. FIG. 74 illustrates a representative release procedure.

As provided herein, at least some embodiments of the present invention embrace performing at least portions of the methods and/or processes of the present invention through the use of a computer device, including processes, procedures, standards and/or policies. Moreover, embodiments of the present invention embrace electronic and/or hardcopy documentation. Furthermore, embodiments of the present invention scale up to complexity, provide the ability to chunk onto a single page, and/or include all nine process elements (i.e., inputs, outputs, activities, process context, entry criteria, exit criteria, purposes, process flow, and roles). Moreover, at least some embodiments include all nine process elements on a single page.

Thus, as discussed herein, the embodiments of the present invention embrace providing documentation having succinct communication with scalability. In particular, embodiments of the present invention relate to systems and methods for defining and documenting processes, procedures, standards and policies that are succinct and usable, and that are scalable to the complexity of the process and to abilities of the individual user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, performed by a computer system, for generating a process model representation for each of a plurality of activity chunks in a process such that each process model representation is arranged to be displayed on a single page, the method comprising:
   receiving, by one or more processors of the computer system, a Work Product/Activities/Roles (WAR) template for a process, the WAR template defining each work product that is used by the process, each activity performed by the process, and each role that performs an activity in the process, each activity being associated with one of a plurality of activity chunks defined for the process;
   generating, by one or more processors of the computer system, and for each of the activity chunks, a process activity template, each process activity template defining:
     any inputs used by the activity chunk;
     entry criteria defining when the activity chunk is to be performed;
     which role is responsible for performing each activity in the activity chunk;
     any outputs produced by the activity chunk; and
     exit criteria defining when the activity chunk is completed;
   generating, by one or more processors of the computer system, and for each process activity template, a process model representation, each process model representation being arranged to be displayed on a single page, each process model representation comprising:
     a graphical representation of the flow between the activities in the represented activity chunk; and
     a graphical representation of the inputs, entry criteria, roles involved in performing the activities of the represented activity chunk, outputs, and exit criteria.

2. The method of claim 1, wherein each process model representation also includes an indication of which role performs each activity in the represented activity chunk.

3. The method of claim 2, wherein the indication of which role performs each activity is provided by defining a column for each role and arranging the graphical representation of the flow between the activities so that the activities performed by a particular role are arranged in the particular role's column and activities performed by multiple roles are arranged to span the columns of each of the multiple roles.

4. The method of claim 1, wherein each process model representation also includes a graphical representation of the location of the represented activity chunk within the process.

5. The method of claim 1, wherein each process model representation also includes an indication of the purpose of the represented activity chunk.

6. The method of claim 1, wherein the graphical representation of the flow between activities comprises a list of the activities.

7. The method of claim 1, wherein the graphical representation of the flow between activities comprises a diagram including a box for each activity and arrows indicating the flow from one activity to another.

8. The method of claim 1, wherein each process activity template includes an indication of which activity in the activity chunk uses each input defined in the process activity template.

9. The method of claim 1, wherein the entry criteria defined in each process activity template defines a state or condition within the process that will cause the process flow to transition to the activities in the activity chunk.

10. The method of claim 9, wherein the state or condition comprises Boolean logic applied to multiple states or conditions within the process.

11. The method of claim 1, wherein each process activity template includes an indication of which activity in the activity chunk generates each output defined in the process activity template.

12. The method of claim 1, wherein the exit criteria defined in each process activity template define a state or condition within the process that cause the process flow to transition to another activity chunk in the process.

13. The method of claim 12, wherein the state or condition comprises Boolean logic applied to multiple states or conditions within the process.

14. The method of claim 1, wherein each process activity template also defines a purpose and a process context of the activity chunk.

15. The method of claim 14, wherein the process context includes an identifier of any parent activity chunks, sibling activity chunks, or children activity chunks within the process.

16. The method of claim 14, wherein the process context defines an owner of the process.

17. The method of claim 14, wherein the process context defines where the process is performed.

18. The method of claim 1, wherein the process activity template defines the role responsible for a particular activity in the activity chunk as all roles responsible for any activity in the activity chunk.

19. The method of claim 1, wherein at least one of process model representations also comprises an indication of measurements made by the activities of the represented activity chunk.

20. The method of claim 1, further comprising:
   for each process activity template, generating an intermediate mode process model representation, each intermediate mode process model representation comprising:
     a listing of each activity in the represented activity chunk;
     a listing of which role performs each activity in the represented activity chunk; and
     a listing of an action that is performed for each activity in the represented activity chunk, wherein the listing of each action also includes guidance for performing each action.

21. The method of claim 20, wherein the guidance for at least one action includes an indication of an input required by the action or an output generated by the action.

22. One or more non-transitory computer storage media storing computer executable instructions which when executed by a computer system perform a method for generating a process model representation for each of a plurality of activity chunks in a process such that each process model representation is arranged to be displayed on a single page, the method comprising:

receiving, by one or more processors of the computer system, a Work Product/Activities/Roles (WAR) template for a process, the WAR template defining each work product that is used by the process, each activity performed by the process, and each role that performs an activity in the process, each activity being associated with one of a plurality of activity chunks defined for the process;

generating, by one or more processors of the computer system, and for each of the activity chunks, a process activity template, each process activity template defining:

any inputs used by the activity chunk;

entry criteria defining when the activity chunk is to be performed;

which role is responsible for performing each activity in the activity chunk;

any outputs produced by the activity chunk; and exit criteria defining when the activity chunk is completed;

generating, by one or more processors of the computer system, and for each process activity template, a process model representation, each process model representation being arranged to be displayed on a single page, each process model representation comprising:

a graphical representation of the flow between the activities in the represented activity chunk; and a graphical representation of the inputs, entry criteria, roles involved in performing the activities of the represented activity chunk, outputs, and exit criteria.

23. The one or more computer storage media of claim 22, wherein each process model representation also includes an indication of which role performs each activity in the represented activity chunk.

24. The one or more computer storage media of claim 23, wherein the indication of which role performs each activity is provided by defining a column for each role and arranging the graphical representation of the flow between the activities so that the activities performed by a particular role are arranged in the particular role's column and activities performed by multiple roles are arranged to span the columns of each of the multiple roles.

25. The one or more computer storage media of claim 22, wherein each process model representation also includes a graphical representation of the location of the represented activity chunk within the process.

26. The one or more computer storage media of claim 22, wherein each process model representation also includes an indication of the purpose of the represented activity chunk.

27. A computer system comprising:

one or more processors; and memory storing computer executable instructions which when executed by one or more of the processors of the computer system perform a method for generating a process model representation for each of a plurality of activity chunks in a process such that each process model representation is arranged to be displayed on a single page, the method comprising:

receiving, by one or more processors of the computer system, a Work Product/Activities/Roles (WAR) template for a process, the WAR template defining each work product that is used by the process, each activity performed by the process, and each role that performs an activity in the process, each activity being associated with one of a plurality of activity chunks defined for the process;

generating, by one or more processors of the computer system, and for each of the activity chunks, a process activity template, each process activity template defining:

any inputs used by the activity chunk;

entry criteria defining when the activity chunk is to be performed;

which role is responsible for performing each activity in the activity chunk;

any outputs produced by the activity chunk; and exit criteria defining when the activity chunk is completed;

generating, by one or more processors of the computer system, and for each process activity template, a process model representation, each process model representation being arranged to be displayed on a single page, each process model representation comprising:

a graphical representation of the flow between the activities in the represented activity chunk; and a graphical representation of the inputs, entry criteria, roles involved in performing the activities of the represented activity chunk, outputs, and exit criteria.

28. The computer system of claim 27, wherein each process model representation also includes an indication of which role performs each activity in the represented activity chunk.

29. The computer system of claim 27, wherein the graphical representation of the flow between activities comprises a list of the activities.

30. The computer system of claim 27, wherein the graphical representation of the flow between activities comprises a diagram including a box for each activity and arrows indicating the flow from one activity to another.

\* \* \* \* \*